(12) United States Patent
Routen et al.

(10) Patent No.: US 10,682,666 B2
(45) Date of Patent: Jun. 16, 2020

(54) CARTRIDGE TYPE FLUID DISPENSING APPARATUS AND METHODS

(71) Applicant: Nordson Corporation, Westlake, OH (US)

(72) Inventors: Jerry R. Routen, Westland, MI (US); William C. Paetow, II, Pinckney, MI (US); Jeffry J. Grana, Holland, OH (US); Justin E. Hall, Novi, MI (US); Thomas R. Tudor, Westland, MI (US)

(73) Assignee: Nordson Corporation, Westlake, OH (US)

( * ) Notice: Subject to any disclaimer, the term of this patent is extended or adjusted under 35 U.S.C. 154(b) by 0 days.

(21) Appl. No.: 15/179,576

(22) Filed: Jun. 10, 2016

(65) Prior Publication Data

US 2016/0361734 A1 Dec. 15, 2016

Related U.S. Application Data

(60) Provisional application No. 62/174,121, filed on Jun. 11, 2015, provisional application No. 62/276,647, filed on Jan. 8, 2016.

(51) Int. Cl.
| | | |
|---|---|---|
| *B05C 17/01* | (2006.01) | |
| *B05C 5/02* | (2006.01) | |

(Continued)

(52) U.S. Cl.
CPC ............ *B05C 11/1013* (2013.01); *B05C 5/02* (2013.01); *B05C 5/0233* (2013.01);
(Continued)

(58) Field of Classification Search
CPC .............. B05C 17/0103; B05C 17/015; B05C 17/0146; B05C 5/02
(Continued)

(56) References Cited

U.S. PATENT DOCUMENTS 1,555,711 A * 9/1925 Hershinger ............. F16N 37/02
222/327
1,709,445 A * 4/1929 Tomes .................. B05C 17/015
222/323

(Continued)

FOREIGN PATENT DOCUMENTS

DE 10313051 A1 10/2004
EP 0311256 A1 4/1989
(Continued)

OTHER PUBLICATIONS

PCT/US2016/036959; Int'l Preliminary Report on Patentability; dated Dec. 21, 2017; 8 pages.
(Continued)

*Primary Examiner* — Nicholas J. Weiss
(74) *Attorney, Agent, or Firm* — Baker & Hostetler LLP

(57) ABSTRACT

A dispensing apparatus having various features is described. The dispensing apparatus can receive a cartridge having a movable plunger configured to direct the fluid through a dispensing valve. The plunger can be movable under a force applied by air pressure. The cartridge can be inserted in the dispensing apparatus using a clamping and sealing mechanism and can be released using a cartridge ejector. The dispensing apparatus can include a ball valve having a ball defining an internal passageway that selectively aligns with a second internal passageway outside of the ball, a brush mounted via an elongating mechanism, and/or a gear train transmitting power from the elongating mechanism.

13 Claims, 49 Drawing Sheets

(51) Int. Cl.
 *B05C 17/015* (2006.01)
 *G01L 19/00* (2006.01)
 *B05C 11/10* (2006.01)

(52) U.S. Cl.
 CPC ........ *B05C 17/0103* (2013.01); *B05C 17/015* (2013.01); *B05C 17/0146* (2013.01); *G01L 19/003* (2013.01); *B05C 11/1031* (2013.01)

(58) Field of Classification Search
 USPC .................................... 222/165, 389, 327
 See application file for complete search history.

(56) References Cited

U.S. PATENT DOCUMENTS

| | | | |
|---|---|---|---|
| 3,443,725 A * | 5/1969 | Lawhorn | B05C 17/01 222/79 |
| 3,767,085 A * | 10/1973 | Cannon | A61C 9/0026 222/82 |
| 3,851,801 A | 12/1974 | Roth | |
| 4,641,764 A | 2/1987 | Faulkner, III | |
| 4,724,983 A | 2/1988 | Claassen | |
| 4,771,920 A | 9/1988 | Boccagno et al. | |
| 4,811,863 A | 3/1989 | Claassen | |
| 4,846,373 A | 7/1989 | Penn et al. | |
| 4,878,981 A | 11/1989 | Mizutani | |
| 4,932,094 A | 6/1990 | McCowin | |
| 4,974,752 A * | 12/1990 | Sirek | B05C 17/00533 222/146.5 |
| 5,069,365 A * | 12/1991 | Woodhouse | B05C 17/002 222/105 |
| 5,074,443 A | 12/1991 | Fujii et al. | |
| 5,318,207 A | 6/1994 | Porter et al. | |
| 5,435,462 A * | 7/1995 | Fujii | B05C 17/015 222/144.5 |
| 5,458,275 A | 10/1995 | Centea et al. | |
| 5,461,922 A | 10/1995 | Koen | |
| 5,467,899 A | 11/1995 | Miller | |
| 5,566,860 A | 10/1996 | Schiltz et al. | |
| 5,657,904 A | 8/1997 | Frates et al. | |
| 5,733,597 A | 3/1998 | Schmitkons et al. | |
| 5,799,578 A * | 9/1998 | Junghans | B41F 31/02 101/348 |
| 5,836,482 A | 11/1998 | Ophardt et al. | |
| 5,852,244 A | 12/1998 | Englund et al. | |
| 5,875,928 A * | 3/1999 | Muller | B05C 17/00553 222/137 |
| 5,906,682 A | 5/1999 | Bouras et al. | |
| 5,927,560 A | 7/1999 | Lewis et al. | |
| 5,944,226 A | 8/1999 | Schiltz et al. | |
| 5,984,147 A | 11/1999 | Van Ngo | |
| 6,036,106 A | 3/2000 | Peet | |
| 6,105,822 A | 8/2000 | Larsen et al. | |
| 6,131,770 A | 10/2000 | Allen | |
| 6,234,358 B1 | 5/2001 | Romine et al. | |
| 6,234,359 B1 | 5/2001 | Brown et al. | |
| 6,299,023 B1 | 10/2001 | Arnone | |
| 6,308,868 B1 * | 10/2001 | Hoffman | B05C 17/00576 222/153.01 |
| 6,311,868 B1 | 11/2001 | Krietemeier et al. | |
| 6,422,427 B2 | 7/2002 | Brown et al. | |
| 6,607,104 B2 | 8/2003 | McGuffey | |
| 6,651,849 B2 | 11/2003 | Schroeder et al. | |
| 6,715,506 B1 | 4/2004 | Ikushima | |
| 6,935,541 B1 * | 8/2005 | Campbell | B05C 17/015 137/557 |
| 6,957,751 B2 | 10/2005 | Ophardt | |
| 7,033,004 B2 * | 4/2006 | Ghisalberti | B41F 31/08 347/85 |
| 7,237,578 B2 | 7/2007 | Porter et al. | |
| 7,296,707 B2 | 11/2007 | Raines et al. | |
| 7,331,482 B1 | 2/2008 | Fugere | |
| 7,441,568 B2 | 10/2008 | Porter et al. | |
| 7,648,052 B2 | 1/2010 | Holm et al. | |
| 7,762,088 B2 | 7/2010 | Fiske et al. | |
| 7,896,200 B2 * | 3/2011 | Nakatsuji | B05C 5/0216 220/318 |
| 8,544,686 B2 * | 10/2013 | Williams | B05B 11/02 222/105 |
| 8,662,352 B1 | 3/2014 | Des et al. | |
| 9,027,796 B1 | 5/2015 | Leitch | |
| 9,095,872 B2 * | 8/2015 | Topf | B05C 11/1013 |
| 9,387,504 B2 * | 7/2016 | Paetow, II | B05C 5/0225 |
| 9,656,286 B2 * | 5/2017 | Aigner | B05C 17/00553 |
| 10,328,452 B2 * | 6/2019 | Levand | B05C 17/0123 |
| 2002/0043539 A1 * | 4/2002 | Pagel | B05C 5/0225 222/207 |
| 2002/0130141 A1 | 9/2002 | Gardos | |
| 2003/0044219 A1 | 3/2003 | Quintero | |
| 2003/0122095 A1 | 7/2003 | Wilson et al. | |
| 2004/0074927 A1 * | 4/2004 | Lafond | B05C 17/00503 222/327 |
| 2004/0226968 A1 * | 11/2004 | Lafond | B05C 17/00506 222/327 |
| 2006/0016510 A1 | 1/2006 | Porter et al. | |
| 2006/0193969 A1 | 8/2006 | Prentice et al. | |
| 2008/0302477 A1 | 12/2008 | Varga et al. | |
| 2010/0012743 A1 | 1/2010 | Nakazono et al. | |
| 2011/0049189 A1 * | 3/2011 | Strobel-Schmidt | B05C 17/00553 222/165 |
| 2012/0252242 A1 | 10/2012 | Beebe | |
| 2014/0138406 A1 * | 5/2014 | Sanfilippo | B65D 83/0072 222/95 |
| 2014/0197198 A1 | 7/2014 | Paetow et al. | |
| 2014/0326760 A1 | 11/2014 | Topf et al. | |
| 2015/0083751 A1 | 3/2015 | Aigner et al. | |
| 2016/0361734 A1 | 12/2016 | Routen et al. | |
| 2017/0106401 A1 * | 4/2017 | Pringle, IV | B25J 9/1692 |
| 2018/0221909 A1 * | 8/2018 | Tudor | B05C 5/0225 |

FOREIGN PATENT DOCUMENTS

| | | |
|---|---|---|
| EP | 2851133 A1 | 3/2015 |
| FR | 2556984 A3 | 6/1985 |
| JP | 01-115466 A | 5/1989 |
| JP | 2004-524143 A | 8/2004 |
| JP | 2006-043703 A | 2/2006 |
| WO | WO2003051526 | 6/2003 |
| WO | 2016/201277 A1 | 12/2016 |

OTHER PUBLICATIONS

Graco/Liquid Control, Dispensit(R) Model 1053 MicorMelt Programmable Precision Metering Valve, Brochure, 2006, 2 pgs.
Liquid Control, Dispensit(R), Model 1053 MicroMelt, http://www.liquidcontrol.com/products/dispensit1053MicroMelt.aspx, Dec. 21, 2005, 2 pgs.
Graco, Dispensit(R) Model 1053 MicroMelt Programmable Precision Metering Valve, Brochure, 2006.
International Patent Application No. PCT/US2016/036959; Int'l Search Report and the Written Opinion; dated Oct. 19, 2016; 14 pages.
Liquid Control, Press Room, http://www.liquidcontrol.com/pressroom/pressrelease.aspx, Aug. 4, 2004, 2 pgs.
Liquid Control, Dispensit(R), Model 1053 MicroMelt, http://www.liquidcontrol.com/products/lispensit1053MicroMell.aspx, Dec. 21, 2005, 2 pgs.
Liquid Control, Dispensit(R) Model 1053, Rod Positive Displacement Dispense Valve, Brochure, 2003, 2 pgs.
Liquid Control, Dispensit(R) Model 1053, http://www.liquidcontrol.com/products/dispensit1053. aspx, Nov. 29, 2005, 2 pgs.
Grago/Liquid Control, Dispensit(R) Model 1053 MicorMelt Programmable Precision Metering Valve, Brochure, 2006, 2 pgs.
European search report dated Oct. 5, 2018 for EP Application No. 18155425.

* cited by examiner

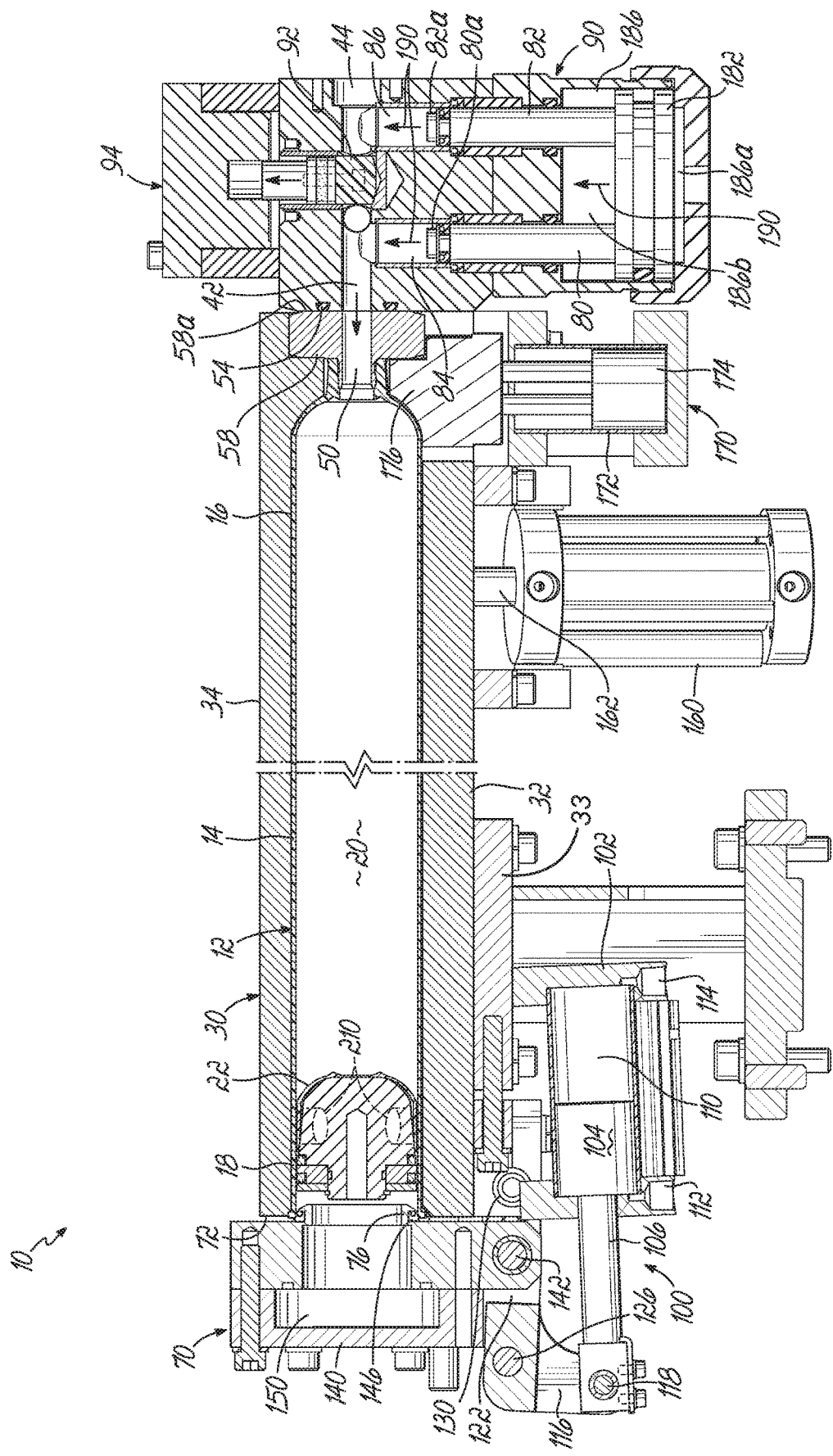

CARTRIDGE TYPE FLUID DISPENSING APPARATUS AND METHODS

RELATED APPLICATIONS

This application claims the benefit of U.S. Provisional Patent App. No. 62/174,121, filed Jun. 11, 2015, and U.S. Provisional Patent App. No. 62/276,647, filed Jan. 8, 2016, both of which are incorporated by reference in their entirety.

TECHNICAL FIELD

This disclosure generally relates to a fluid dispensing apparatus, and more particularly relates to dispensing fluid from a cartridge having a movable plunger configured to direct the fluid through a dispensing valve.

BACKGROUND

Various fluid dispensing apparatus are well known. However, these devices require extensive handling by an operator to load the fluid, which increases the risk of contamination. In addition, many well-known devices are not capable of dispensing both high and low viscosity material from a cartridge. Finally, many well-known devices do not include sensing and feedback control. Therefore, there is a need for a lightweight and compact dispensing system that has the ability to dispense high or low viscosity material from prefilled cartridge. The novel system can automatically open or close a space to receive the cartridge to reduce handling and can monitor and control the flow rates via feedback from sensing the plunger movement with the cartridge.

SUMMARY

In one embodiment, a system for protecting a pressure transducer includes an adapter dimensioned to receive a pressure transducer and attach the pressure transducer to a body; a barrier dimensioned and sized to cover a portion of the adapter and the pressure transducer and separate the pressure transducer from a flow path in the body, and the barrier is resilient and flexes to transmit a pressure associated with a pressure in the flow path to the pressure transducer; and a resilient seal located between the barrier and the adapter, wherein and the resilient seal encompasses a portion of the pressure transducer.

In an example embodiment, a dispensing apparatus includes a ball valve operatively connected to a power rotary actuator; a ball associated with the ball valve, the ball defining an internal passageway, wherein the internal passageway in the ball selectively aligns with a second internal passageway not in the ball, and wherein the ball with the ball compressed against a seat of the ball valve.

In an example embodiment, a dispensing apparatus includes a body; a brush mounted to the body via an elongating mechanism; a hose receptacle located on a side portion of the brush and configured to provide fluid communication from an interior portion of a hose connected to the hose receptacle to an interior portion of the brush; an outer shaft forming part of the elongating mechanism; an inner shaft forming part of the elongating mechanism and configured to slide within the outer shaft in a telescoping manner to allow the brush to move axially to the body.

In an example embodiment, a dispensing apparatus includes a body; a brush mounted to the body; a hose receptacle located on a side portion of the brush and configured to provide fluid communication from an interior portion of a hose connected to the hose receptacle to an interior portion of the brush; a motor attached to the body; a shaft operatively connected to the motor for transmitting power from the motor; a gear train operatively connected to the shaft for transmitting power from the shaft, the gear train including helical gears mounted adjacent to each other and the brush is mounted to the gear train for receiving power transmitted by the gear train, wherein the brush has rotating parts that rotate about an axis offset from a rotational axis of the motor.

In an example embodiment, a dispensing apparatus includes: a housing defining a void for receiving a cartridge containing a substance to be dispensed; a plunger moving into the cartridge to push the substance out of the cartridge into a dispensing flow path; and a cable cylinder having a cable attached to the plunger, wherein the cable cylinder is configured to retract the cable into the cylinder to move the plunger out of the cartridge.

In an example embodiment, a dispensing apparatus includes a housing defining a void for receiving a cartridge containing a substance to be dispensed; a plunger moving into the cartridge to push the substance out of the cartridge into a dispensing flow path; and a plunger operating mechanism including: a rack attached to the plunger; a pinion operatively connected to the rack; and a motor operatively connected to the pinion to rotate the pinion to move the rack to selectively move the plunger in and out of the cartridge.

In an example embodiment, a dispensing apparatus includes a housing; a cartridge holder base member within the housing, the cartridge holder base member defining a void for receiving a cartridge containing a substance to be dispensed; a cartridge mating member within the housing at one end of the void, the mating member including: a body; a projection attached to the body, the projection defining an axial pathway within both the projection and body; and an outer surface of the projection defining a retaining band protruding away from the outer surface of the projection.

In an example embodiment, a pressure relieving plunger includes a first member defining, in part, an internal space and a first groove; a second member defining, in part, the internal space and a second groove; a center member residing, at least in part, in the internal space, the center member defining a seal groove for containing a seal for sealing the internal space from a distal face of the piston; a spring located in the internal space biasing the center member to a first position; a retaining ring located in the first and second grooves holding the first member, the second member, and the center member in position; an attaching structure located on the center member allowing the center member to attach to an actuation mechanism, wherein when the actuation mechanism exerts a force on the center member below a threshold on the center member, the piston will move with the actuation mechanism and when the actuation mechanism exerts a force on the center member above the threshold, the center member will overcome a biasing force of the spring to move the center member with respect to the first and second members causing a seal contained within the seal groove of the center member to move to a non-sealing position.

In an illustrative embodiment, an apparatus is disclosed for dispensing fluid and including a fluid supply element having a supply passage for directing the fluid under pressure. The apparatus includes a dispense section with a discharge passage communicating with the fluid supply passage and further communicating with a discharge outlet. A dispense valve is mounted for movement relative to the discharge passage between an open position in which the fluid under pressure is adapted to be directed through the discharge passage and a closed position in which the fluid is prevented from being directed through the discharge passage. A first snuff back element communicates with the discharge passage at a location between the fluid supply element and the dispense valve. The first snuff back element is movable between a flow position and a snuff back position. A second snuff back element communicates with the discharge passage at a location between the dispense valve and the discharge outlet. The second snuff back element is movable between a flow position and a snuff back position. The first and second snuff back element elements are capable of being moved to the respective flow positions when the dispense valve is in the open position, and are capable of being moved to the respective snuff back positions when the dispense valve is in the closed position.

The apparatus may have additional or alternative aspects. For example, first and second snuff back passages communicate with the discharge passage. The first snuff back element may further comprise a first snuff back plunger mounted for reciprocation in the first snuff back passage and the second snuff back element may further comprise a second snuff back plunger mounted for reciprocating movement in the second snuff back passage. Moving the first and second snuff back plungers to the respective flow positions includes moving the first and second snuff back plungers toward the discharge passage and moving the first and second snuff back plungers to the respective snuff back positions includes moving the first and second snuff back plungers away from the discharge passage. Movement away from the discharge passage will draw fluid respectively away from a distal seal of the cartridge and inwardly away from the discharge outlet to prevent leakage of fluid at these locations. A snuff back actuator may be coupled to the first and second snuff back elements and operable to simultaneously move the first and second snuff back elements between the respective flow positions and snuff back positions. A dispense valve actuator may be coupled to the dispense valve and operable to move the dispense valve between the open position and the closed position. An electronic control may be operatively connected to the snuff back actuator and to the dispense valve actuator. To dispense the fluid, the electronic control directs the dispense valve actuator to move the dispense valve to the open position, and direct the snuff back element actuator to move the first and second snuff back elements to the respective flow positions. To stop dispensing the fluid, the electronic control directs the dispense valve actuator to move the dispense valve to the closed position, and to direct the snuff back element actuator to move the first and second snuff back elements to the respective snuff back positions.

In another illustrative embodiment, an apparatus is disclosed for dispensing fluid from a cartridge having a distal end, a proximal end adapted to receive air pressure and a cartridge body having a fluid space extending between the distal and proximal ends. The fluid space contains a plunger movable toward the distal end under a force applied by the air pressure. The apparatus comprises a cartridge holder including first and second clamshell members for receiving the cartridge in a cartridge holding space. At least one of the clamshell members is movable toward and away from the other clamshell member to allow the cartridge to be received in and removed from the space. The apparatus further includes a dispense section having a discharge passage and a discharge outlet. The discharge passage communicates with the cartridge holding space for receiving fluid from the distal end of the cartridge when the cartridge is received between the first and second clamshell members, and directs the fluid to the discharge outlet during a dispense operation.

In a more specific embodiment, the first clamshell member may be a stationary base member, and the second clamshell member may be a moveable clamshell member. A clamshell actuator may be coupled to the second, moveable clamshell member for moving the second clamshell member between an open position for loading and unloading the cartridge and a closed, sealed position for dispensing fluid from the cartridge. Additional or alternative features may be provided, such as a first seal surrounding the discharge passage. The seal is adapted to engage the distal end of the cartridge when the cartridge is clamped within the cartridge holder. The cartridge holder may further comprise a proximal end and a distal end, and the first seal may be positioned proximate the distal end of the cartridge holder. The apparatus may further include a clamping and sealing mechanism mounted at the proximal end of the cartridge holder. The clamping and sealing mechanism includes a second seal moveable between clamped and unclamped positions relative to the proximal end of the cartridge holder. The cartridge may be loaded into and unloaded from the cartridge holder when the seal is in the unclamped position and the cartridge is sealed by the first and second seals when the second seal is moved to the clamped position. The first seal may further comprise a face seal adapted to engage and seal against a sealing surface at the distal end of the fluid cartridge. The clamping and sealing mechanism may further comprises a linkage assembly that moves to an over-center orientation in the clamped position. A cartridge ejector also may be provided for ejecting the fluid cartridge from the cartridge holding space at the end of a dispense operation.

In another alternative embodiment, an apparatus is disclosed for dispensing fluid from a cartridge having a distal end, a proximal end adapted to receive air pressure and a cartridge body having fluid space extending between the proximal and distal ends. The fluid space contains a plunger movable toward the distal end under a force applied by the air pressure. The apparatus includes a cartridge holder having a proximal end, a distal end and a cartridge receiving space extending between the proximal end and the distal end for holding the cartridge. A first seal is located proximate the distal end of the cartridge holder for sealing against the distal end of the cartridge. A dispense section includes a discharge passage adapted to communicate with the fluid space, and further communicating with a discharge outlet for allowing the fluid to be directed from the discharge passage to the discharge outlet during a dispense operation. A clamping and sealing mechanism is mounted at the proximal end of the cartridge holder. The clamping and sealing mechanism includes a second seal moveable between a clamped, sealed position, and an unclamped, unsealed position relative to the proximal end of the cartridge holder. The cartridge may be loaded into and unloaded from the cartridge holder when the seal is in the unclamped, unsealed position and the cartridge is sealed by the first and second seals when the second seal is moved to the clamped position.

This embodiment may also or alternatively include other features. For example, the first seal may further comprise a face seal adapted to engage and seal against a surface at the distal end of the fluid cartridge. The second seal may be configured to extend into the fluid cartridge when the clamping and sealing mechanism is moved to the clamped, sealed position. The clamping and sealing mechanism may further comprise a linkage assembly that moves to an over-center orientation in the clamped position. The clamping and sealing mechanism may be adjustable to accommodate fluid cartridges of different lengths. For example, the cartridges usable with the apparatus may be designed with different lengths, or cartridges usable with the apparatus may vary only slightly in length due to tolerances during manufacture. In either situation this adjustment feature allows for a fluid tight seal to be established regardless of such differences in cartridge length. A clamp actuator may be coupled to the clamping and sealing mechanism to move the clamping and sealing mechanism between the clamped and unclamped positions.

In another embodiment, a fluid cartridge is disclosed for use in dispensing apparatus for dispensing fluids from the cartridge. The cartridge comprises a cartridge body having a distal end, a proximal end adapted to receive air pressure from the apparatus, and a cartridge body having a fluid space extending between the proximal and distal ends. A plunger is positioned in the fluid space and is movable toward the distal end under a force applied by the air pressure. A plurality of magnetic elements is coupled with the plunger. The magnetic elements are adapted to allow the apparatus to detect a position of the plunger in the fluid space. The magnetic elements may be carried at spaced locations around a periphery of the plunger such that the magnetic elements are also positioned around a longitudinal axis of movement of the plunger within the fluid space. In other embodiments, the plurality of magnetic elements may instead be a single magnetic element.

In another aspect, a method of operating a fluid dispensing apparatus including a dispense valve and a cartridge containing the fluid. The method includes opening the dispense valve and dispensing the fluid from the cartridge. The pressure of the fluid being dispensed is monitored until a stable pressure is reached. The dispense valve is then closed. To initiate a subsequent dispense cycle, the fluid in the cartridge is pre-pressurized while the dispense valve is closed, until the fluid in the cartridge reaches the stable pressure. The dispense valve is then opened and the fluid is dispensed from the cartridge at the stable pressure.

Various additional features and advantages will become more apparent to those of ordinary skill in the art upon review of the following detailed description of the illustrative embodiments taken in conjunction with the accompanying drawings.

BRIEF DESCRIPTION OF THE DRAWINGS

FIG. 3C is a cross sectional view similar to FIG. 3B, but illustrating the clamped and sealed position of the clamping and sealing mechanism.

DETAILED DESCRIPTION

Figure 1:
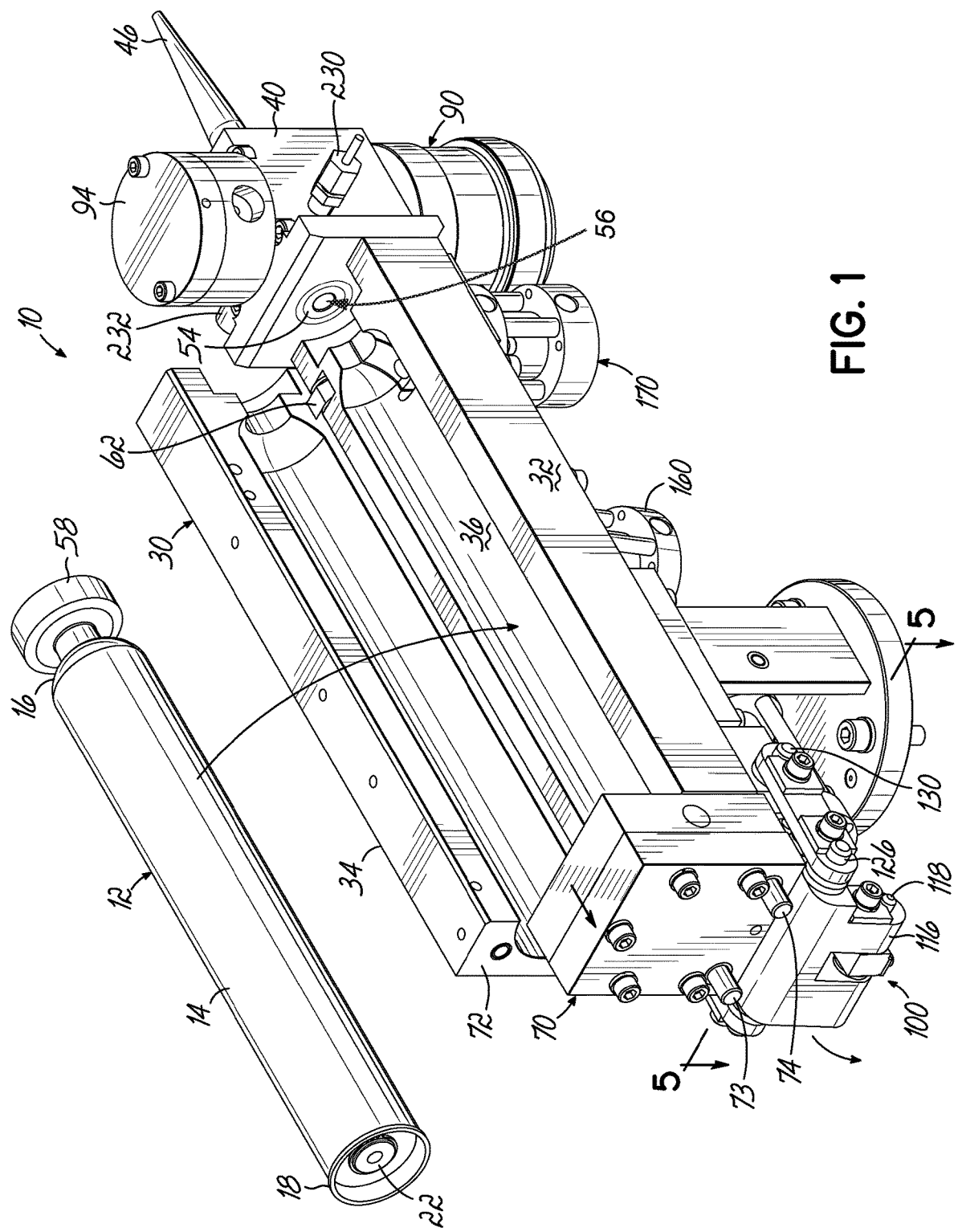
FIG. 1 is a perspective view of a dispensing apparatus in accordance with the disclosure.
Figure 2:
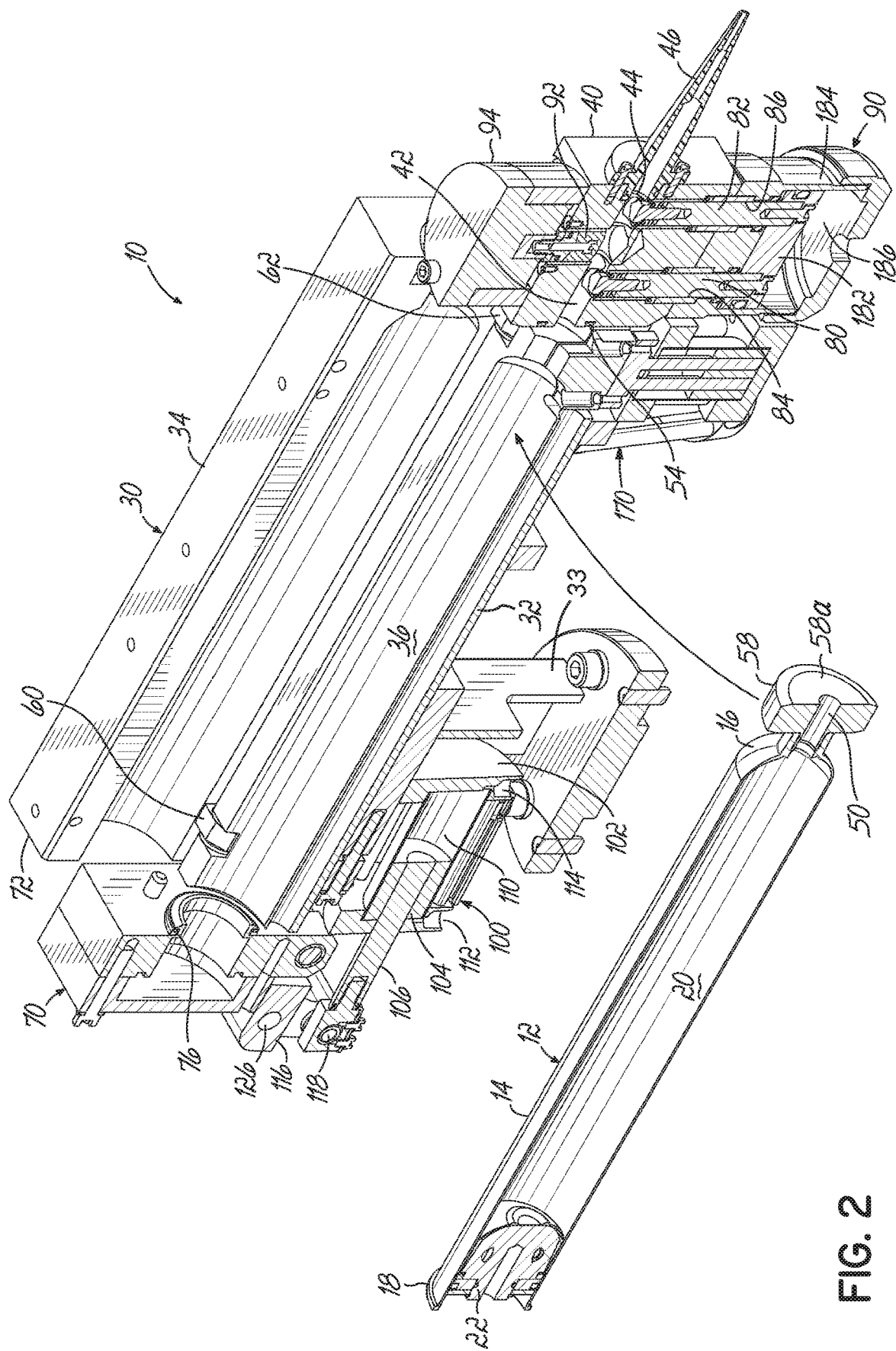
FIG. 2 is a perspective, cross section taken along the longitudinal center line of the dispensing apparatus shown in FIG. 1.

FIGS. 1 and 2 illustrate a dispensing apparatus 10, also referred to as a dispenser 10 for dispensing various types of fluids, including but not limited to polysulfides, urethanes, epoxies, adhesives, and silicones. In this embodiment, the dispensing apparatus 10 is a cartridge dispenser that utilizes a fluid cartridge 12 including a cartridge body 14 with a distal end 16, a proximal end 18 adapted to receive air pressure from the dispensing apparatus 10, and a fluid space 20 extending between the distal and proximal ends 16, 18. A plunger 22 is positioned in the fluid space 20 and is movable toward the distal end 16 under a force applied by the air pressure. The dispensing apparatus 10 comprises a cartridge holder 30 including first and second clamshell members 32, 34 for receiving the cartridge 12 in a cartridge holding space 36. At least one of the clamshell members 32, 34 is movable toward and away from the other of the clamshell members 32, 34 for allowing the cartridge 12 to be received in and removed from the space 36. The dispensing apparatus 10 further includes a dispense section 40 having a discharge passage 42 and a discharge outlet 44. A nozzle 46 is coupled to the discharge outlet 44 for further directing the discharged fluid from the dispensing apparatus 10. The discharge passage 42 communicates with a suitable fluid supply having a supply passage. In this embodiment the discharge passage 42 communicates with the cartridge holding space 36 such that the discharge passage 42 receives fluid from the distal outlet passage 50 of the fluid cartridge 12 when the fluid cartridge 12 is received between the first and second clamshell members 32, 34. Therefore, in this embodiment the distal outlet passage 50 is the supply passage to the dispense section 40. A first seal 54 is located in surrounding relation to an inlet 56 of the discharge passage 42. This seal 54 is a face seal that engages a distal tip element 58 of the fluid cartridge 12. Specifically, the seal 54 engages against a surface 58a that faces in the same direction as the fluid flow from the cartridge 12. The fluid is directed to the discharge outlet 44 during a dispensing operation.

Figure 3A:
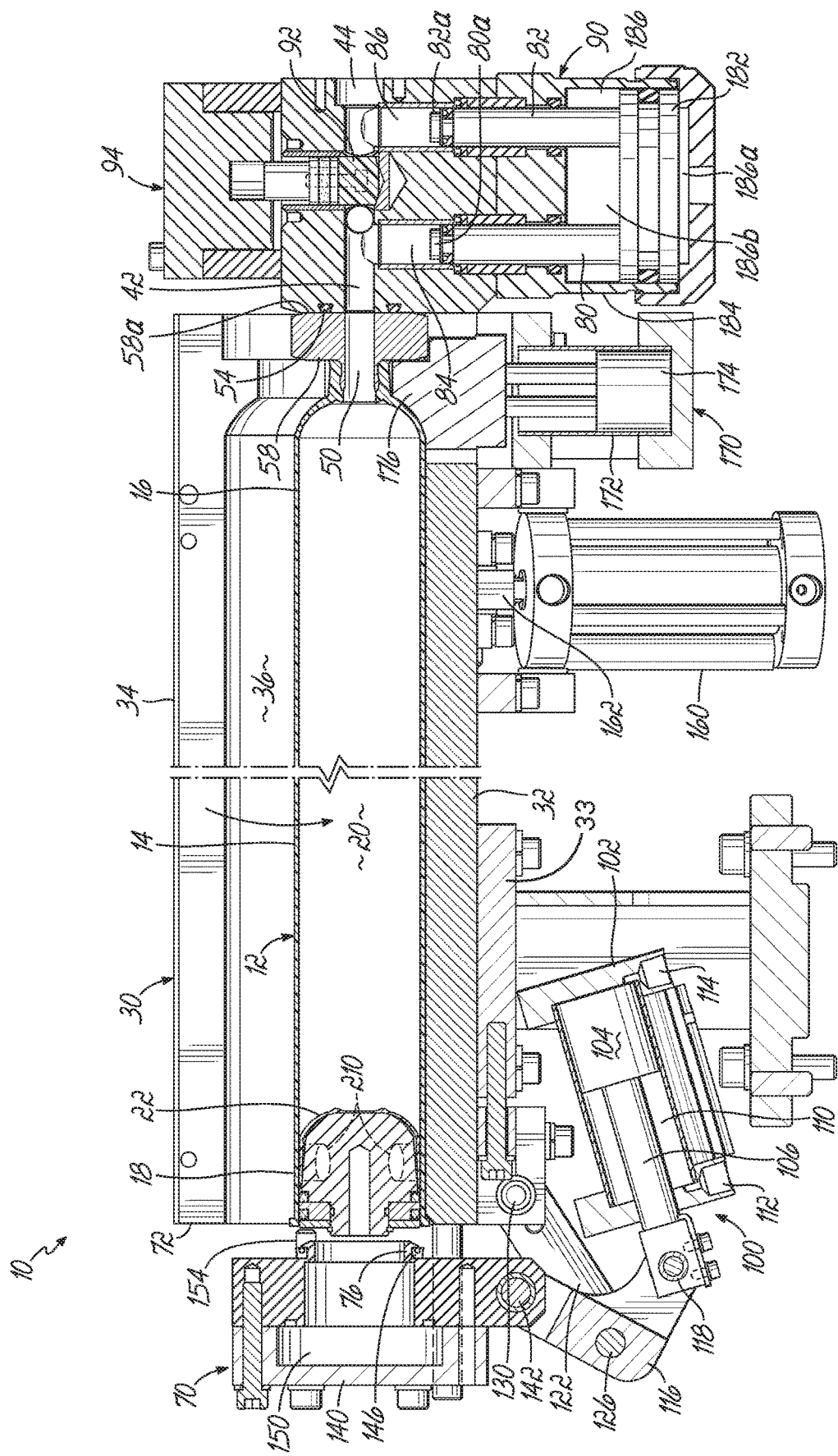
FIG. 3A is a longitudinal sectional view of the dispensing apparatus shown in FIG. 1, illustrating a fluid cartridge in place within a cartridge holder, and a clamshell half in an open position.

As more specifically shown in FIGS. 1, 2 and 3A, the first clamshell member 32 is a stationary base member, and the second clamshell member 34 is a movable clamshell member that is secured with pivots or hinges 60, 62 such that it may be moved between an open position and a closed position. The open position is for loading and unloading the cartridge 12 and the closed position is for dispensing fluid from the cartridge 12. The dispensing apparatus 10 further includes a clamping and sealing mechanism 70 mounted at a proximal end 72 of the cartridge holder 30. The clamping and sealing mechanism 70 is guided along a pair of rods 73, 74 rigidly fixed to the cartridge holder base member 33. The clamping and sealing mechanism 70 includes a second seal 76 movable between clamped and unclamped positions relative to the proximal end 72 of the cartridge holder 30. As will be further discussed below, the dispensing apparatus 10 further comprises a first snuff back element 80 and a second snuff back element 82. These snuff back elements 80, 82 preferably comprise respective plungers mounted for reciprocation in respective first and second snuff back passages 84, 86. The first and second snuff back passages 84, 86 intersect with, and therefore, communicate with the discharge passage 42. A snuff back actuator 90 is coupled to the first and second snuff back elements 80, 82 and simultaneously moves the first and second snuff back elements 80, 82 between respective flow positions and snuff back positions. The dispense section 40 further includes a dispense valve 92 coupled with a dispense valve actuator 94 for moving the dispense valve 92 between and an open position and a closed position. This facilitates on/off control of dispensing fluid from the cartridge 12 through the discharge outlet 44.

Figure 3B:
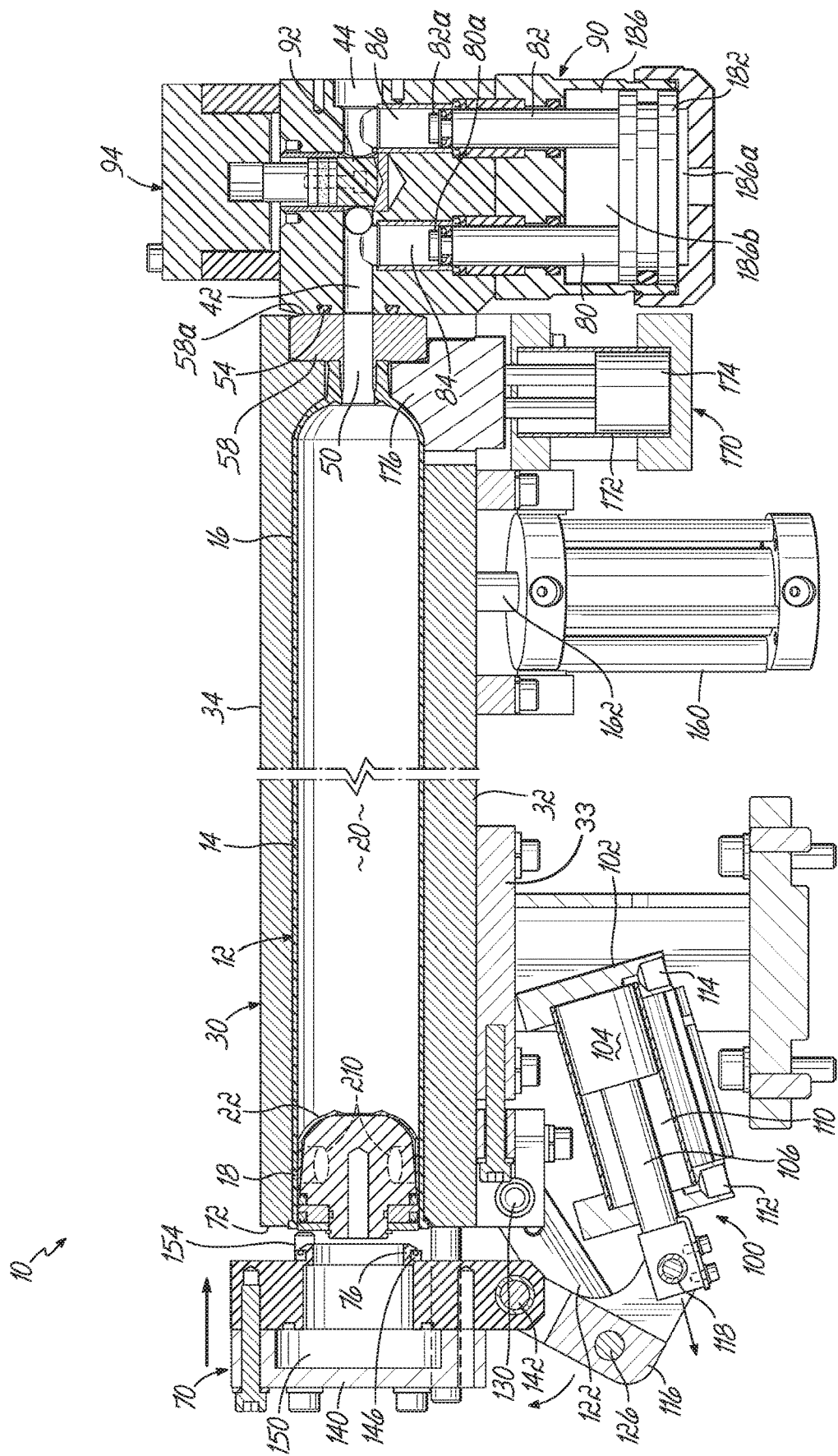
FIG. 3B is a cross sectional view similar to FIG. 3A, but illustrating the clamshell half closed and a clamping and sealing mechanism being moved to a clamped and sealed position.

Referring now to FIGS. 3A and 3B, the clamping and sealing mechanism 70 includes an actuator assembly 100 having a housing 102 that encloses a piston 104 coupled with a rod 106. The piston 104 and rod 106 are moved in a reciprocating fashion within a cylinder 110 of the housing 102 in, for example, a dual acting manner by introduction and exhaust of pressurized air through respective ports 112, 114. The rod 106 is coupled to a first linkage assembly 116 at a pivot 118 and the first linkage assembly 116 is further coupled to a second link 122 at a pivot 126. The second link 122 is pivotally coupled to the base of clamshell half 32 at another pivot 130. Another end of the linkage assembly 116 is pivotally coupled to a sealing and pneumatic supply structure 140 at a pivot 142. The second seal 76 is formed as a projecting, annular element having an annular, peripheral seal 146 that engages within the proximal end 18 of the fluid cartridge 12 after the clamping and sealing mechanism 70 is actuated from the open or unclamped position shown in FIG. 3B to the clamped and sealed position shown in FIG. 3C. Pressurized air is introduced into a chamber 150 within the sealing and pneumatic supply structure 140 and behind the plunger 22 of the fluid cartridge 12 in order to move the plunger 22 through the fluid cartridge 12 during a dispense operation, as will be described below. A dowel pin 154 is provided as a locking and positioning element received within a bore (not shown) of the movable clamshell half 34 when the clamshell half 34 is in the closed position shown in FIG. 3B. As further illustrated in FIG. 3C, the linkage assembly 116 of the clamping and sealing mechanism 70 achieves an over-center orientation in the clamped and sealed position in order to firmly lock the second seal 76 into its sealed position relative to the proximal end 18 of the fluid cartridge 12. In this regard, the pivot 126 is over-center with respect to the pivots 130, 142. This allows the sealing and pneumatic supply structure 140 to withstand large amounts of force when high pneumatic pressures are necessary during a dispense operation, for example, to dispense highly viscous fluids, or in other applications requiring very high pneumatic pressures. Such air pressures may be on the order of 300 psi to 400 psi, or higher. The movable clamshell half 34 is actuated between the open position shown in FIG. 3A and the closed position shown in FIG. 3B by an actuator 160 in the form of a pneumatic cylinder having a reciprocating rod 162 coupled to the clam shell half 34. As will be further described below, a cartridge ejector 170 is provided, including a pneumatic actuator 172 and an ejection member (or piston) 174 for ejecting the fluid cartridge 12 at the end of a dispense cycle and/or when the fluid cartridge 12 is empty and in need of replacement.

Figure 3D:
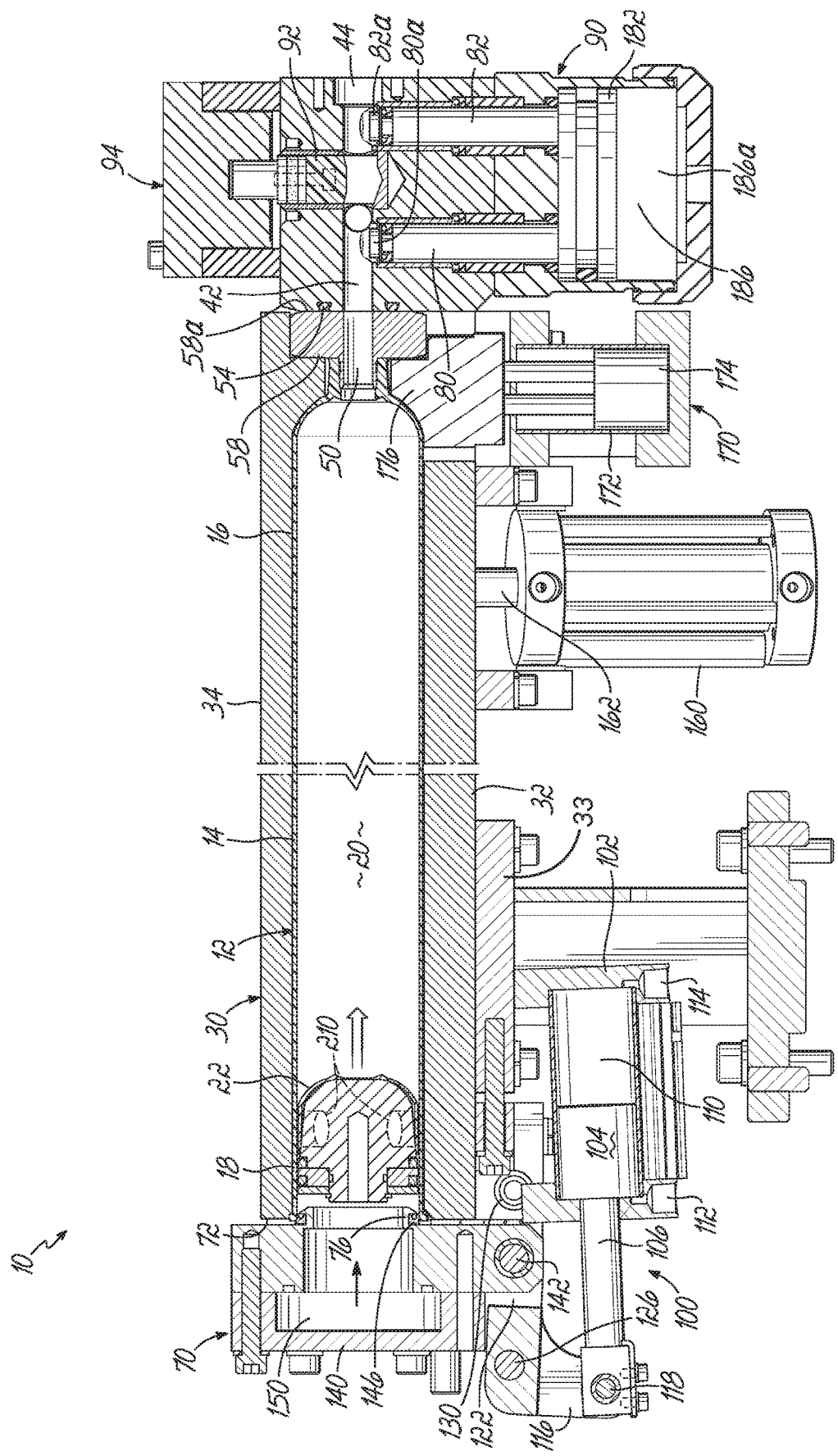
FIG. 3D is a cross sectional view similar to FIG. 3C, but illustrating a snuff back mechanism moved to a flow position, and a dispense valve opened for dispensing fluid from the apparatus.
Figure 3E:
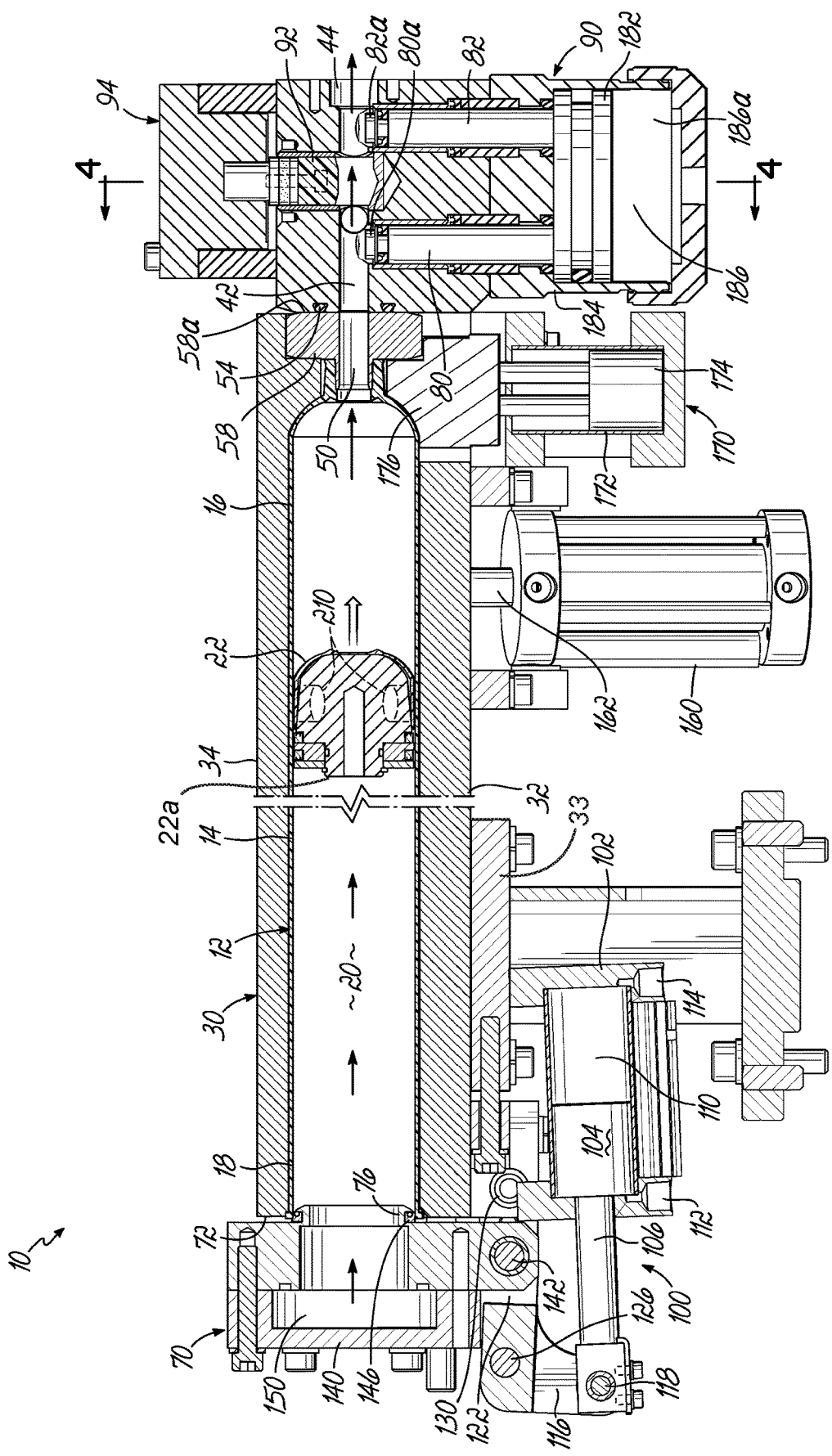
FIG. 3E is a cross sectional view similar to FIG. 3D, but illustrating movement of the plunger within the fluid cartridge for purposes of dispensing the fluid through the discharge passage and discharge outlet.

Referring to FIGS. 3C, 3D and 3E, the dispense valve 92 which is movable between a closed position (FIG. 3C) in which no fluid may flow from the fluid cartridge 12 through the discharge passage 42 to the discharge outlet 44, and an open position allowing such fluid flow (FIG. 3D). The dispense valve 92 is operated in a reciprocating manner between the open and closed positions by the valve actuator 94, in the form of a piston 180 operated in opposite direction, by pressurized air. The snuff back actuator 90 comprises a common pneumatic piston 182 housed within a snuff back actuator housing 184 and, more specifically, within a cylindrical bore 186. The bore 186 receives pressurized air on one side 186*a* of the piston 182 for moving the snuff back elements 80, 82 simultaneously in the direction of the arrows 190 shown in FIG. 3C and receives pressurized air on the opposite side 186*b* of the piston 182 to simultaneously move the snuff back elements 80, 82 in the opposite direction, for purposes to be described below. A flow or dispensing condition is shown in FIG. 3E, where the dispense valve 92 has been opened by the dispense valve actuator 94, and the first and second snuff back elements 80, 82 have been actuated toward the discharge passage 42, through the first and second snuff back passages 84, 86, such that distal ends 80*a*, 82*a* of the snuff back elements 80, 82 are positioned directly adjacent to the discharge passage 42. In this dispense condition, the plunger 22 of the fluid cartridge 12 is moved from left to right as shown in FIG. 3E, by the introduction of pressurized air into the supply chamber 150 the pneumatic supply and sealing structure 140 and against the proximal end 22*a* of the plunger 22. This forces the fluid in the fluid space 20 through the outlet passage 50 of the cartridge 12 and into the discharge passage 42, past the snuff back element 80, through the dispense valve 92, and finally past the snuff back element 82 and out of the discharge outlet 44. As further shown in FIG. 3E, the plunger 22 of the fluid cartridge 12 includes a plurality of spaced apart magnetic elements 210 positioned generally around the periphery of the plunger 22 and around the longitudinal central axis of the fluid cartridge 12. These magnetic elements 210 are preferably permanent magnets and are sensed by a suitable sensor (not shown) positioned along one of the clamshell halves 32, 34, or otherwise proximate the cartridge holder 30 such that the position of the plunger 22 may be accurately ascertained by the dispensing apparatus control. This allows various control functions, such as determining when the cartridge is empty.

Figure 3F:
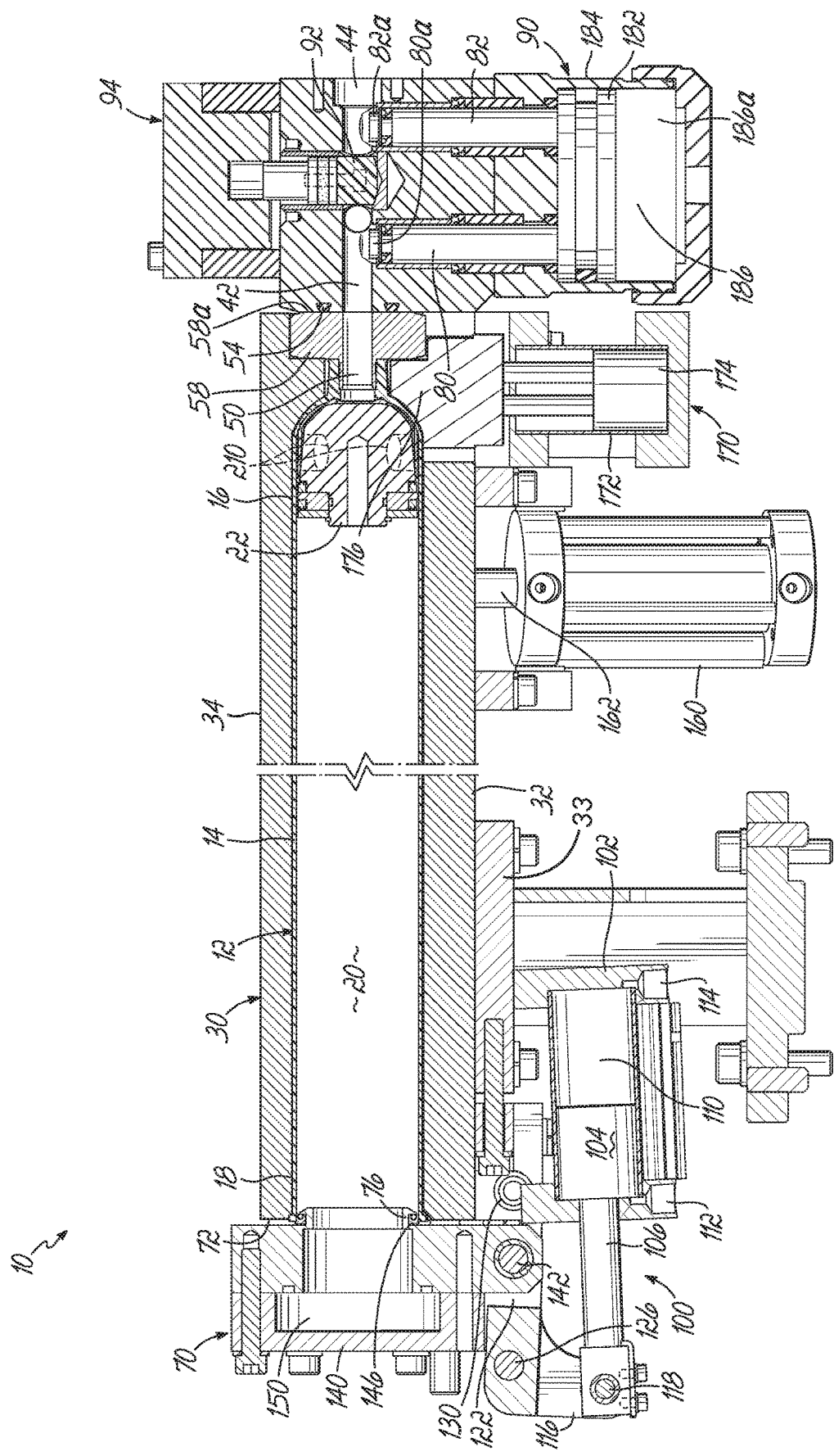
FIG. 3F is a cross sectional view similar to FIG. 3E, but illustrating the end of a dispense cycle and closure of the dispense valve.
Figure 3G:
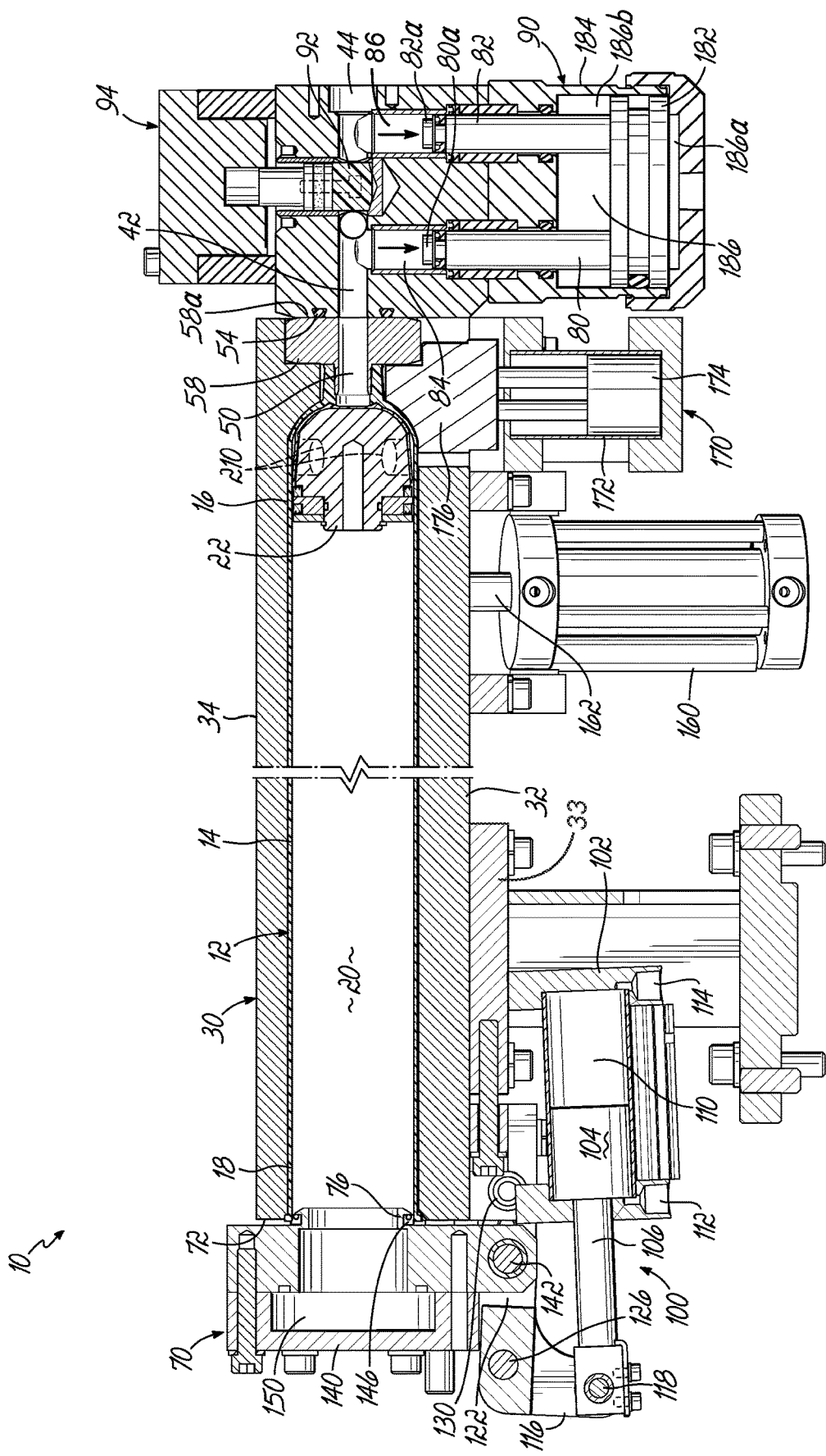
FIG. 3G is a cross sectional view similar to FIG. 3F, but further illustrating movement of the snuff back mechanism to the snuff back position to draw fluid away from the seal at the distal end of the fluid cartridge, as well as away from the discharge outlet.

Referring to FIGS. 3F and 3G, when the plunger 22 has reached the end of its travel, or otherwise when a dispense cycle or operation is complete, the dispense valve 92 is moved by the dispense valve actuator 94 to the closed position as shown in FIG. 3F. In a simultaneous fashion, or very shortly after closing the dispense valve 92, the pair of snuff back elements 80, 82 is moved from the flow position shown in FIG. 3F to the snuff back position shown in FIG. 3G, by introducing pressurized air on the top of the piston 182 and exhausting air from below the piston 182. This snuff back action is a dual action in that it will draw pressurized fluid from the discharge passage 42 into the snuff back passage 84 located on the cartridge side of the dispense valve 92 and also draw fluid from the discharge passage 42 into the snuff back passage 86 from the discharge passage 42 on the discharge side of the dispense valve 92. This dual action will reduce the fluid pressure experienced by the first seal 54 and therefore reduce the likelihood of any leakage at this location. The snuff back action will also draw fluid back from the discharge outlet 44, including any nozzle 46 (FIG. 1) or other dispensing element coupled to the discharge outlet 44 to prevent drooling of fluid from the dispensing apparatus 10 after a dispense cycle or operation is complete.

Figure 3H:
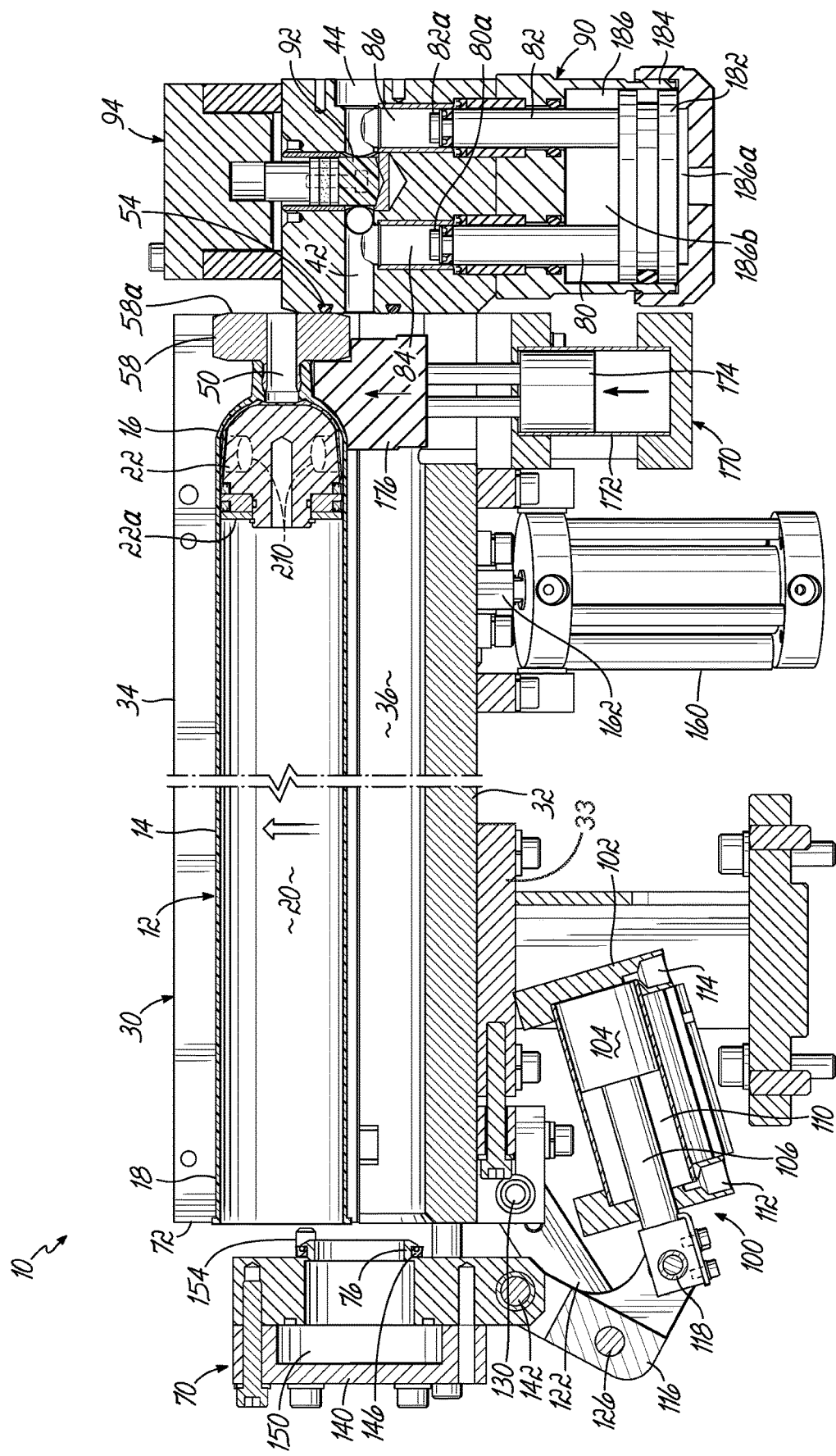
FIG. 3H is a cross sectional view similar to FIG. 3G, but further illustrating activation of the cartridge ejector.

FIG. 3H further illustrates the cartridge ejector 170 used to eject the fluid cartridge 12 at the end of a dispense operation, and after the clamping and sealing mechanism 70 has been actuated to the unclamped, unsealed position. The cartridge ejector 170 comprises a pneumatic cylinder 172 and a piston 174 mounted for reciprocation in the cylinder 172. The piston 174 is coupled to an ejecting element 176 that engages and lifts at least the distal end 16 of the cartridge 12. Although the entire cartridge 12 is shown as being lifted at least partially out of the cartridge holding space 36, it will be appreciated that only the distal end portion of the cartridge 12 may be lifted upward. In this ejected position, the cartridge 12 may be grasped either manually or in an automated manner, such as by a robotic mechanism (not shown).

Figure 4:
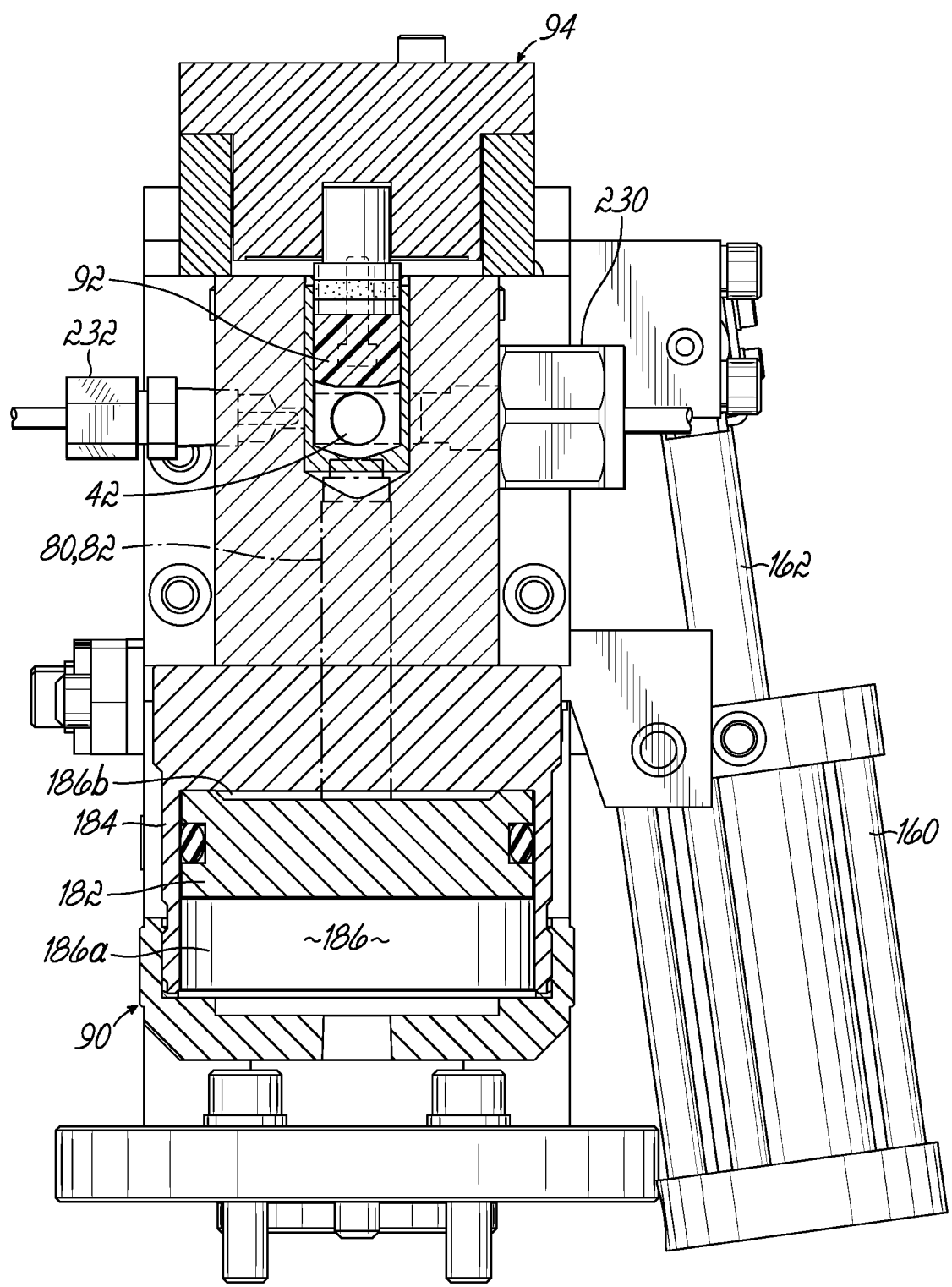
FIG. 4 is a cross sectional view taken along line 4-4 of FIG. 3E.

FIG. 4 further illustrates a pressure sensor 230 and flow rate sensor 232 that are incorporated into the dispense section 40 (shown in FIG. 1) and in communication with the discharge passage 42 in order to detect pressure in the discharge passage 42, as well as flow rate of fluid flowing through the discharge passage 42. The flow rate sensor 232 detects the flow rate of fluid and, in order to adjust the dispense flow rate, the air pressure directed against the plunger 22 may be adjusted as needed to adjust the fluid flow rate. Referring to FIG. 3E and FIG. 4, a method of fluid pressure control is also provided and includes opening the dispense valve 92 and dispensing the fluid from the cartridge 12 through the discharge passage 42 and discharge outlet 44. The pressure of the fluid being dispensed is monitored by the pressure sensor 230 until a stable fluid pressure is reached. The dispense valve 92 is then closed. To initiate a subsequent dispense cycle, the fluid in the cartridge 12 is pre-pressurized while the dispense valve 92 is closed, until the fluid in the cartridge 12 reaches the stable pressure. The dispense valve 92 is then opened and the fluid is dispensed from the cartridge 12 at the stable pressure.

Figure 5:
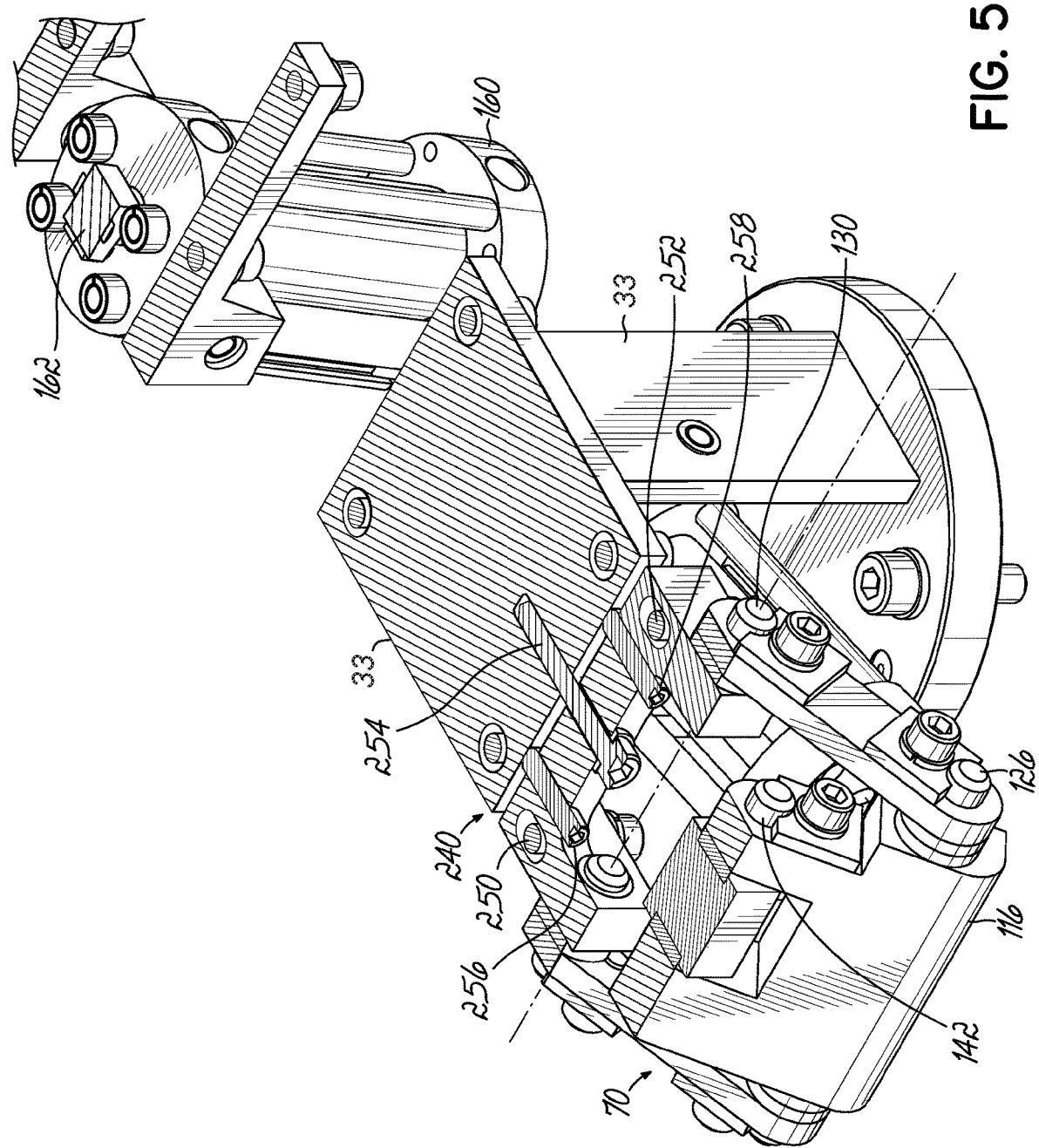
FIG. 5 is a cross sectional view taken along line 5-5 of FIG. 1.

FIG. 5 further illustrates an adjustment mechanism 240 of the clamping and sealing mechanism 70. This adjustment mechanism 240 allows the closed position of the second seal 76, shown in FIG. 3D, to be adjusted to accommodate fluid cartridges 12 of different lengths. This adjustment feature may be designed and used, for example, to accommodate fluid cartridges 12 purposely designed with different lengths, and different fluid volume capacities, or may be designed to accommodate for different lengths that occur due to tolerance variations for the fluid cartridges 12 during manufacture. In each case, the adjustment allows for optimum placement of the seal 76 with regard to the proximal end 18 of the fluid cartridge 12. The adjustment is made by first loosening two hold down screws 250, 252, and loosening the trapping screw 254. To set the distance that the second seal 76 will move, a pair of set screws 256, 258 are tightened or loosened by equal amounts. Then when the distance has been set as desired, the trapping screw 254 is tightened and the two hold down screws 250, 252 are tightened.

FIGS. 6A, 7A, 8A, and 9A illustrate a perspective view, right side, front view and a cross sectional view of a dispensing apparatus 10 in accordance with another embodiment of the present disclosure. FIGS. 6B, 7B, 8B, and 9B illustrate a perspective view, right side, front view and a cross sectional view of a dispensing apparatus 10 in accordance with an embodiment of the present disclosure. In the embodiment shown in FIGS. 6A, 7A, 8A, and 9A, an end effector assembly 303 includes a dispensing brush 310. In an alternate embodiment shown in FIGS. 6B, 7B, 8B, and 9B, a different end effector assembly 303a does not use a dispensing brush 310, but uses a nozzle 310b for dispensing the fluid or adhesive. The remaining parts of FIGS. 6B, 7B, 8B, and 9B are the same or similar to the parts of FIGS. 6A, 7A, 8A, and 9A.

Dispenser 10 of FIGS. 6A-9B include a pressure transducer 300. The pressure transducer 300 is attached to the dispensing apparatus 10 and configured to detect a pressure associated with a fluid in the interior passageway 307. The pressure transducer 300 is separated from the material or fluid in the interior passageway 307 by a barrier 408 which will be discussed in more detail later below with respect to FIGS. 22-26.

The dispensing apparatus 10 includes ball valve assembly 302 (also referenced as a rotary valve 302). The ball valve assembly 302 includes a ball valve 304. The ball 305 may be pre-compressed in order to better prevent leaks within the ball valve 302. The ball 305 may be placed within its seat 309 in a compressed manner. Because the ball 305 is compressed it will urge outwardly against the seat 309 to reduce the likelihood of fluid leaking (particularly in high pressure applications) between the ball 305 and the seat 309. For example, in some embodiments, the material flowing through the ball valve 304 may be at over 450 PSI.

The ball valve 304 may be configured to selectively allow fluid or material to flow through the interior passageway 307 of the tube 306. The ball valve 304 and/or any of its elements, the ball 305 or seat 309 may be made of any suitable material including steel, hardened steel or any other suitable substance. The ball 305 has an internal passageway 311 which may be selectably aligned (FIGS. 9A-9E) or misaligned (FIG. 9F) with the interior passageway 307 of the tube 306 to allow or disallow flow through the tube 306 in typical ball valve fashion.

Figure 9A:
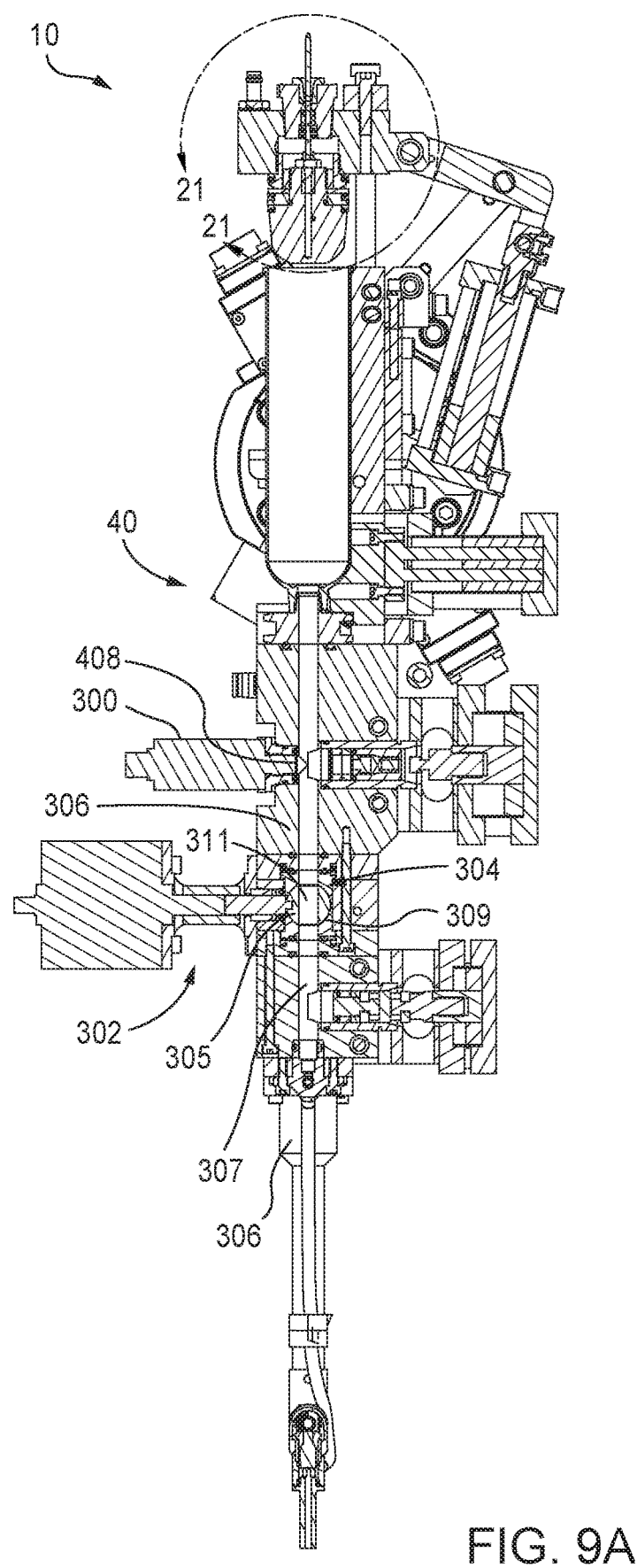
FIG. 9A is a cross sectional view of a dispenser in accordance with the disclosure.
Figure 9B:
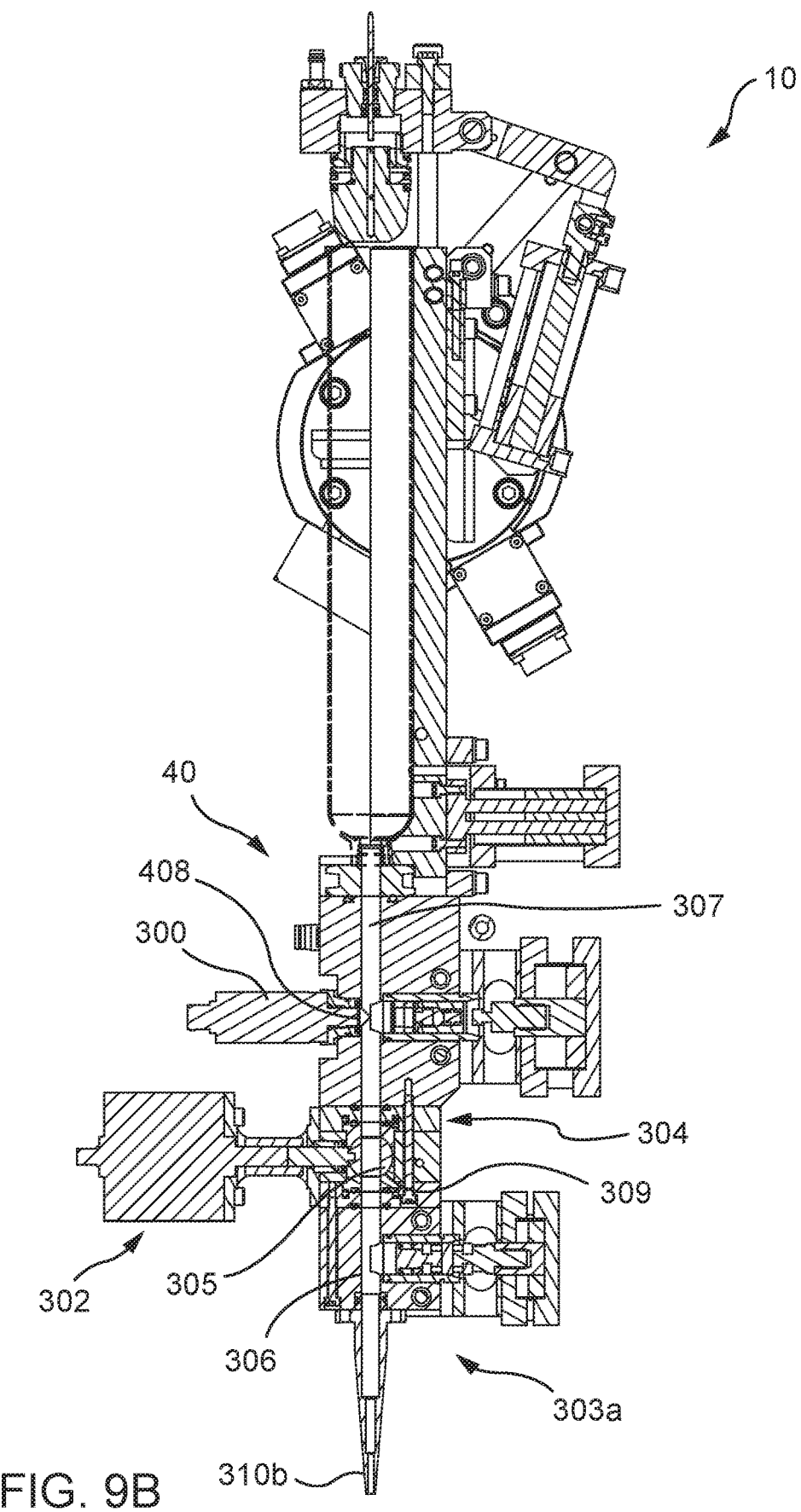
FIG. 9B is a cross sectional view of another embodiment of a dispenser in accordance with the disclosure.
Figure 9C:
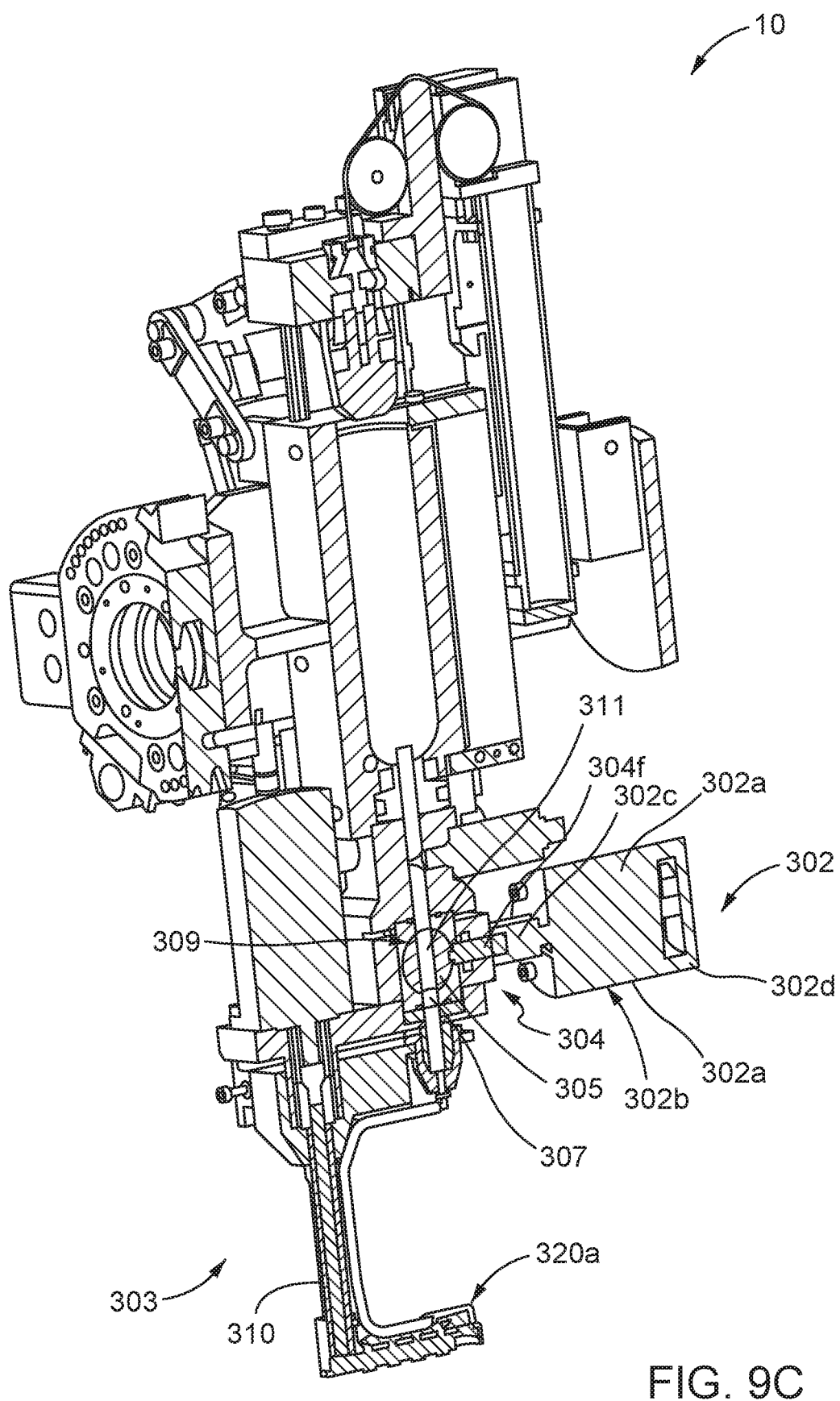
FIG. 9C is a cross sectional view of another embodiment of a dispenser in accordance with the disclosure.
Figure 9D:
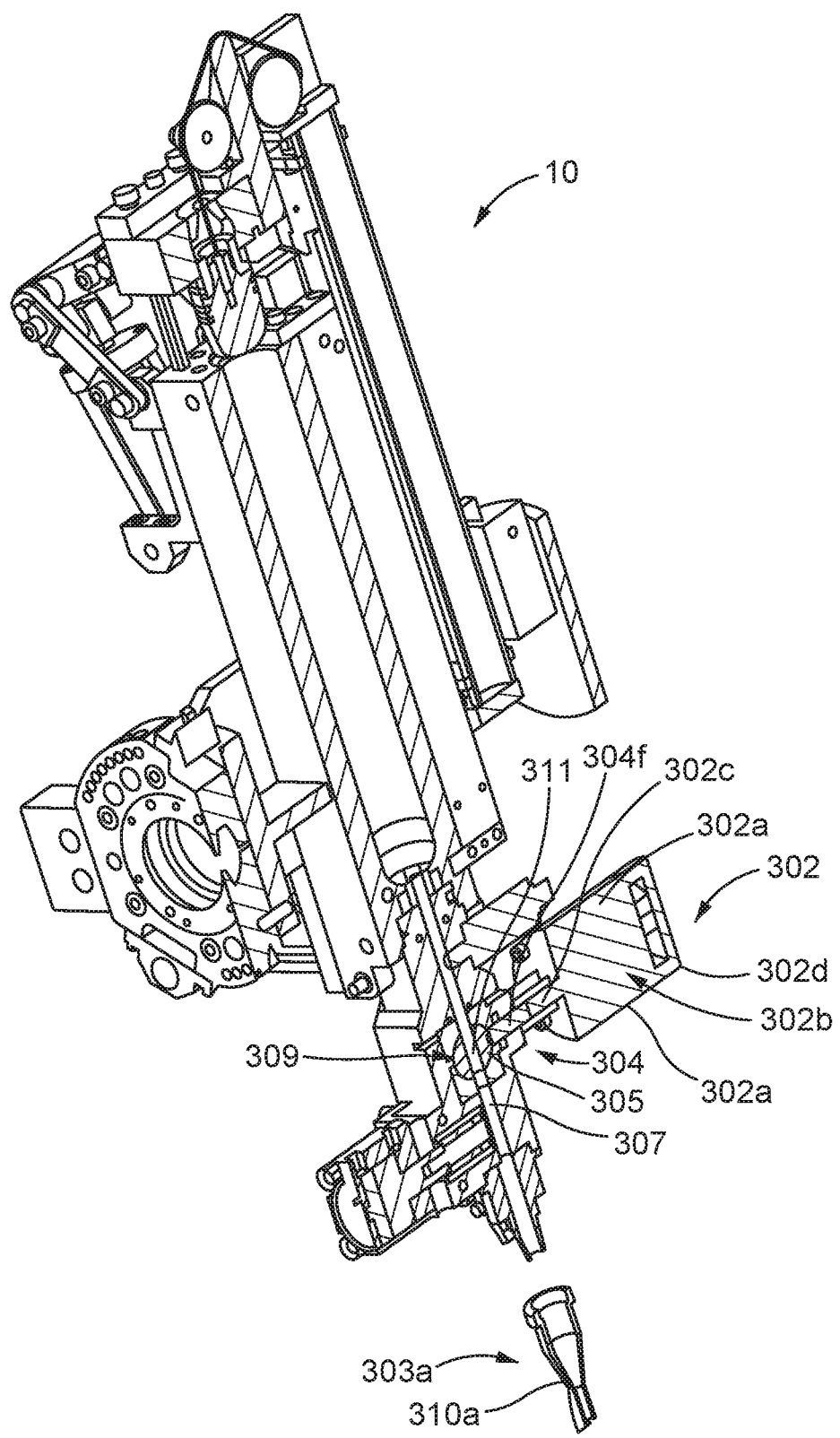
FIG. 9D is a cross sectional view of another embodiment of a dispenser in accordance with the disclosure.

FIGS. 9C and 9D have different end effectors 303 and 303a. The differences of these two end effectors 303 and 303a will be discussed below. Further, the dispenser 10 of FIG. 9C is sized for a 6 oz capacity cartridge 12 and the dispenser 10 of FIG. 9D is sized for a 12 oz capacity cartridge 12. Otherwise the ball valve assemblies 302 of the two FIGS. are similar. As shown in FIGS. 9C and 9D, the ball valve assembly 302 includes a ball valve assembly housing 302a which contains a ball valve actuator 302b. The ball valve actuator 302b controls the position of the ball 305 to allow the internal passageway 311 in the ball 305 to be aligned or misaligned with the interior passageway 307.

In some embodiments, the ball valve assembly 302 may be powered in order to operate the actuator 302b. In other embodiments, the actuator 302b may be pneumatically operated and connected to a pneumatic source to provide compressed air to actuate the ball valve assembly 302. In some embodiments, the actuator 302b may be electorally, mechanically or otherwise operated.

Figure 9E:
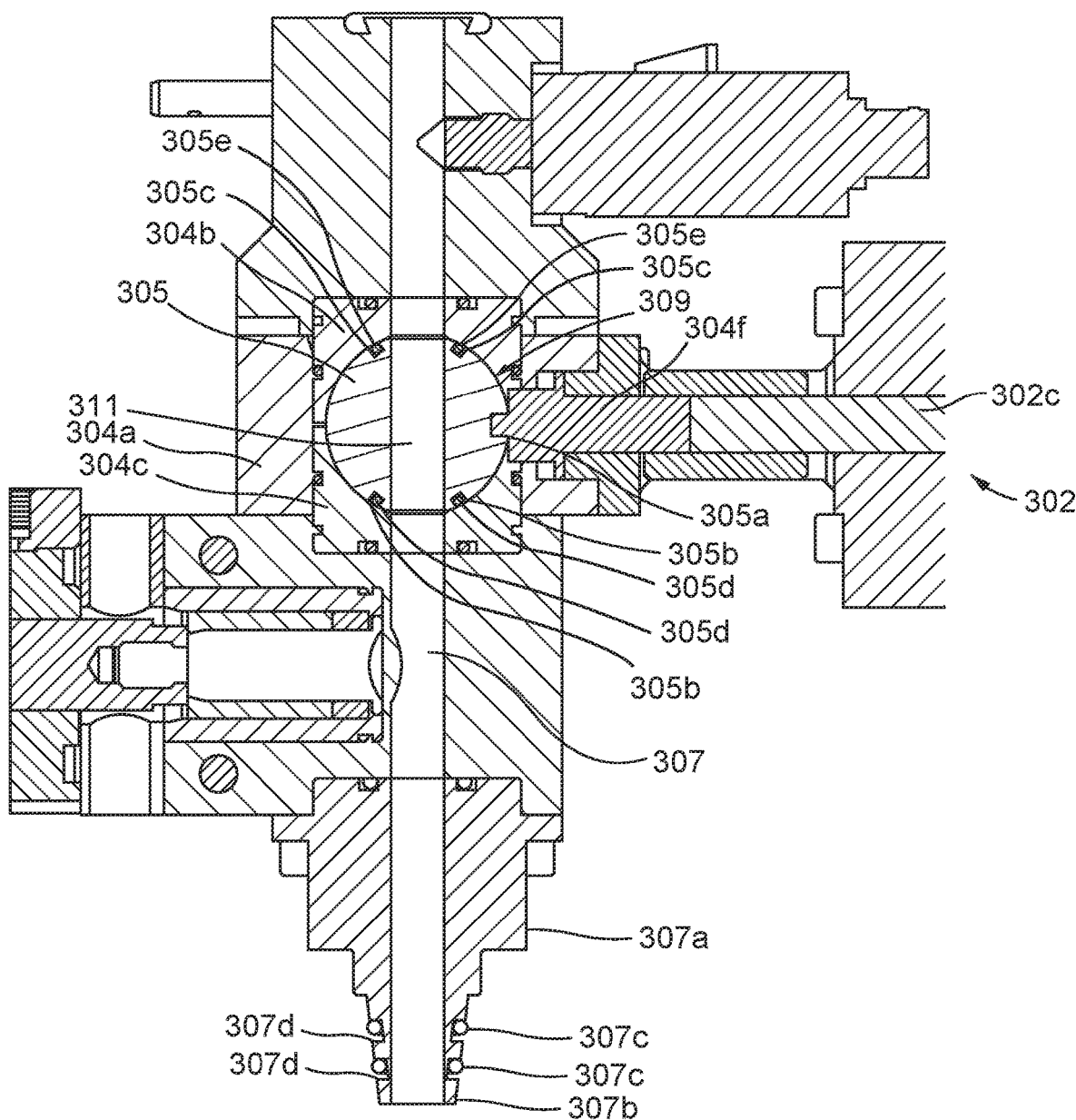
FIG. 9E is a partial, cross sectional view of another embodiment of a dispenser in accordance with the disclosure.

An actuator shaft 302c operatively connects the actuator 302b to the ball connecting shaft 304f (also shown in FIG. 9E). As shown in FIG. 9E, which is an enlarged partial view of the ball valve assembly 302, the ball connecting shaft 304f connects to the ball 305. As shown, the ball 305 has an attaching hole 305a into which the ball connecting shaft 304f extends. In some embodiments, the ball connecting shaft 304f may connect to the ball 305 via a slot and keyway configuration to lock the rotation of the ball 305 and ball connecting shaft 304f together. In other embodiments, the ball 305 and ball connecting shaft 304f may be threaded together. In other embodiments, the ball 305 and the ball connecting shaft 304f may be attached in some other suitable manner.

Figure 9F:
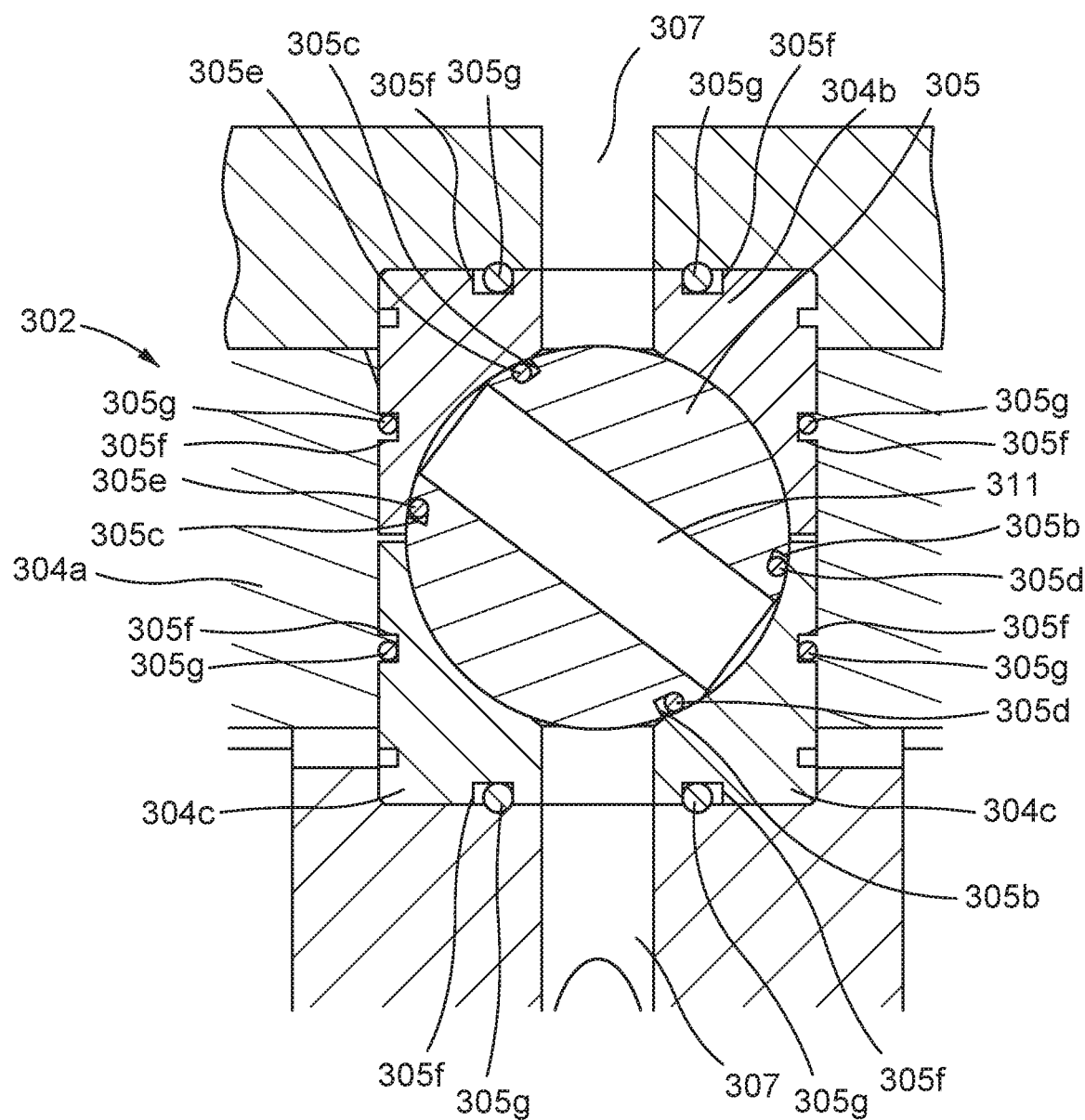
FIG. 9F is a partial, cross sectional view of another embodiment of a dispenser in accordance with the disclosure.

To reduce the likelihood that the fluid that flows through the interior passageway 307 seep into the ball seat 309, the ball 305 is equipped with seals 305d and 305e located in seal grooves 305b and 305c located in the ball 305. In some embodiments, the seals 305d may be resilient seals such as O-rings. As shown in FIGS. 9E and 9F, the ball seat 309 is defined by a first ball container 304b and a second ball container 304c. As mentioned above, the ball 305 may be located in the first 304b and second 304c ball containers in a compressed manner. The first 304b and second 304c ball containers are located in the ball valve housing 304a.

Figure 9G:
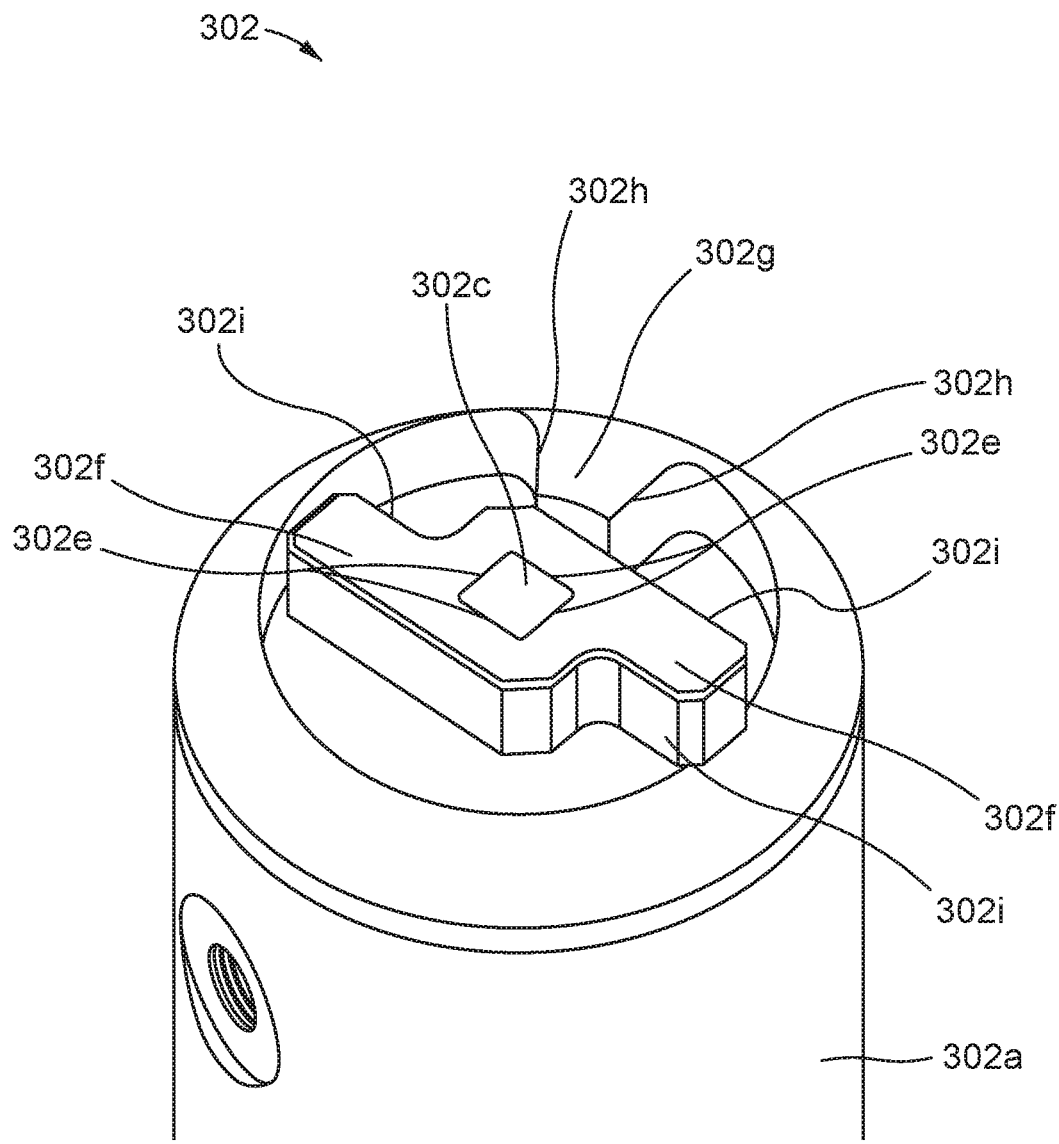
FIG. 9G is a partial, perspective view of a valve assembly portion of a dispenser in accordance with the disclosure.

As shown in FIG. 9G, first 304b and second 304c ball containers also have seal grooves 305f containing seals 305g in order to seal the ball 305 and the first 304b and second 304c ball containers from the ball valve housing 304a and the interior passageway 307 located both above and below the ball 305 and the first 304b and second 304c ball containers.

FIG. 9G shows a portion of the ball valve assembly 302 with the cap 302d removed to show how the actuator shaft 302c is limited in its rotation to limit the amount of rotation of the ball 305. As can be appreciated, limiting the rotation of the ball 305 may be desirable in order to avoid causing the internal passageway 311 (FIG. 9F) of the ball 305 to inadvertently align or partially align with the interior passageway 307 due to an over rotation of the ball 305.

As shown in FIG. 9G, the actuator shaft 302c has four flat surfaces 302e which form a connecting structure 302e to connect to a stop arm 302f. In other embodiments, the connecting structure 302e could include more or fewer flat surfaces or could be any other type of connecting structure to connect the actuator shaft 302c to the stop arm 302f. The ball valve assembly housing 302a includes a stop lug 302g. A stop surface 302h also butts against the stop surfaces 302i on the stop arm 302f to stop the rotation of the actuator shaft 302c and therefore the ball 305 (not shown in FIG. 9G). The stop lug 302g and the stop arm 302f are dimensioned and oriented to allow the ball 305 to move only in a desired range of motion. The stop lug 302g can limit the rotation of the actuator shaft 302c from moving in either direction.

Figure 9H:
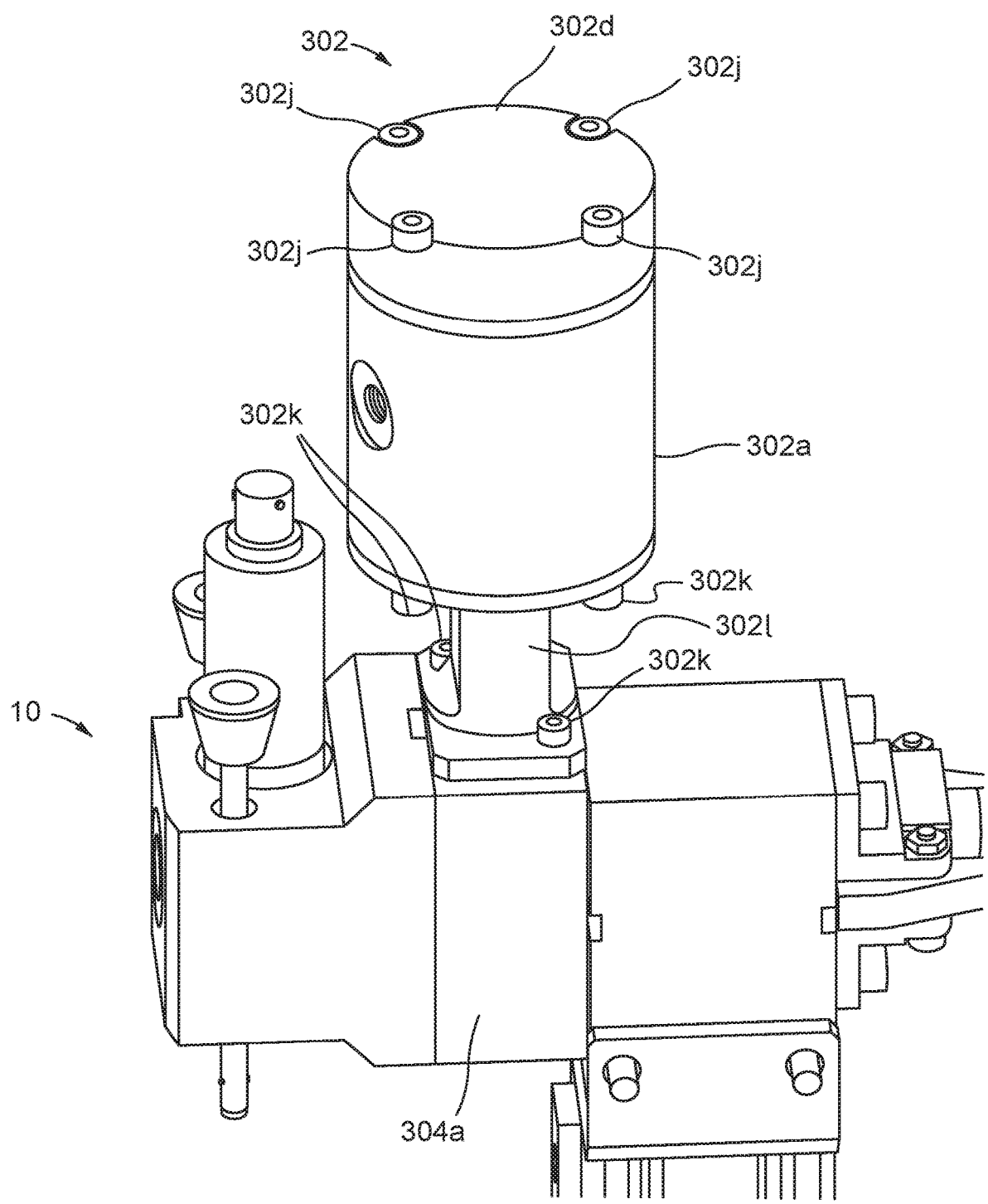
FIG. 9H is a partial, perspective view of a valve assembly portion of a dispenser in accordance with the disclosure.

FIG. 9H is a perspective view of the ball valve assembly 302 portion of the dispenser 10. The cap 302d is attached to the ball valve assembly housing 302a via cap fasteners 302j. The ball valve assembly housing 302a is attached to the ball valve housing 304a via a connecter 302l and assembly fasteners 302k. The ball valve assembly housing 302a may be attached or connected to the ball valve housing 304a in other suitable ways.

Figure 6A:
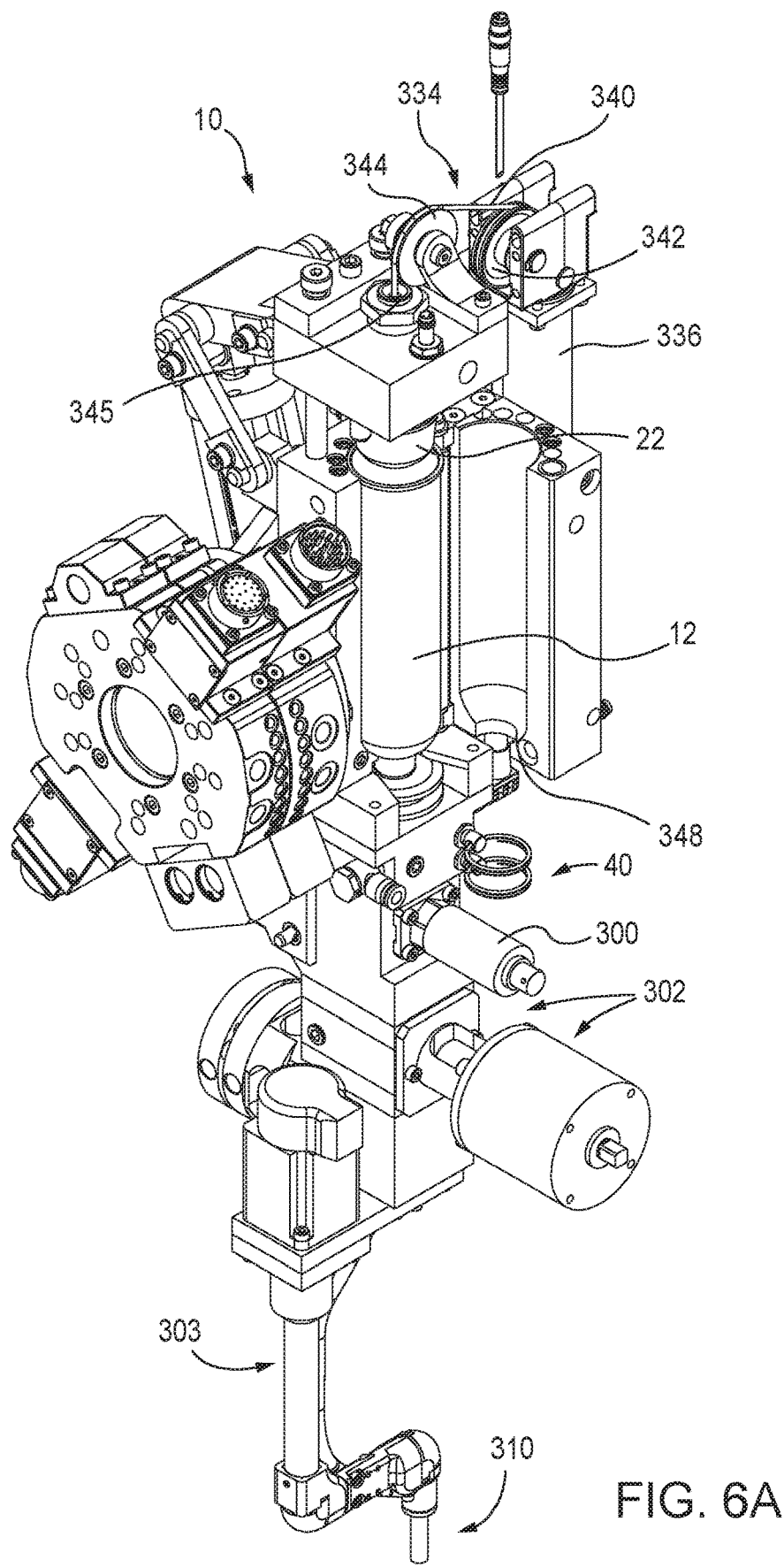
FIG. 6A is a perspective view of a dispenser in accordance with the disclosure.
Figure 6B:
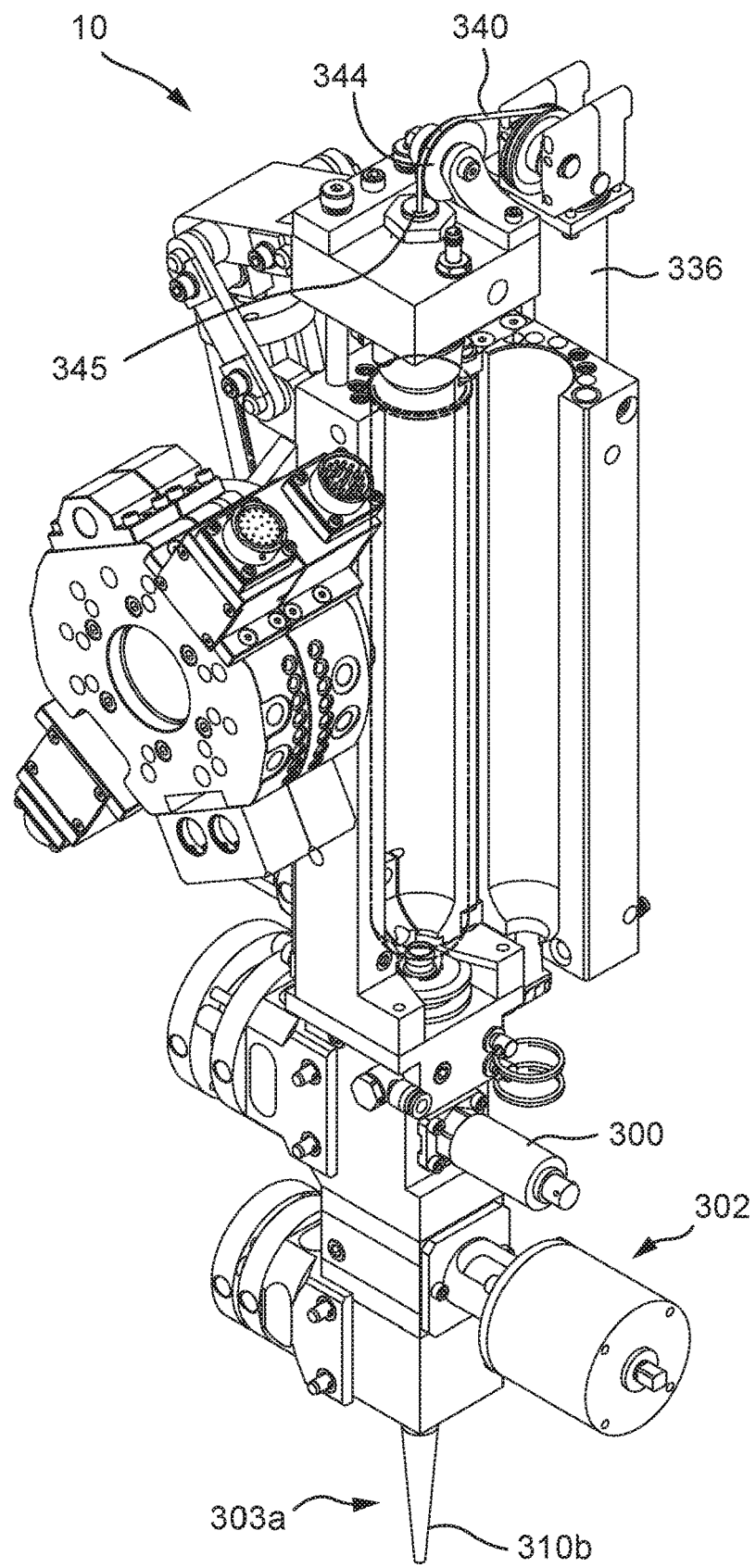
FIG. 6B is perspective view of another embodiment of a dispenser in accordance with the disclosure.
Figure 7A:
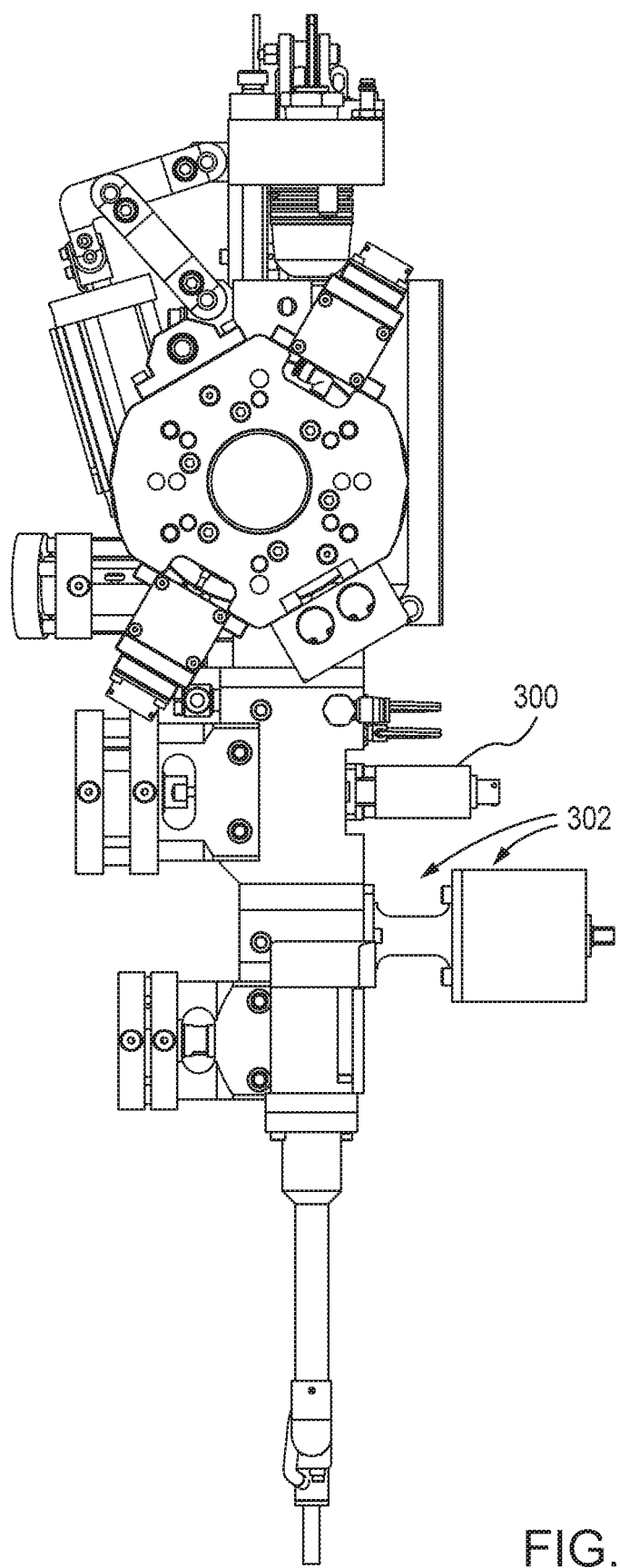
FIG. 7A is a side view of a dispenser in accordance with the disclosure.
Figure 7B:
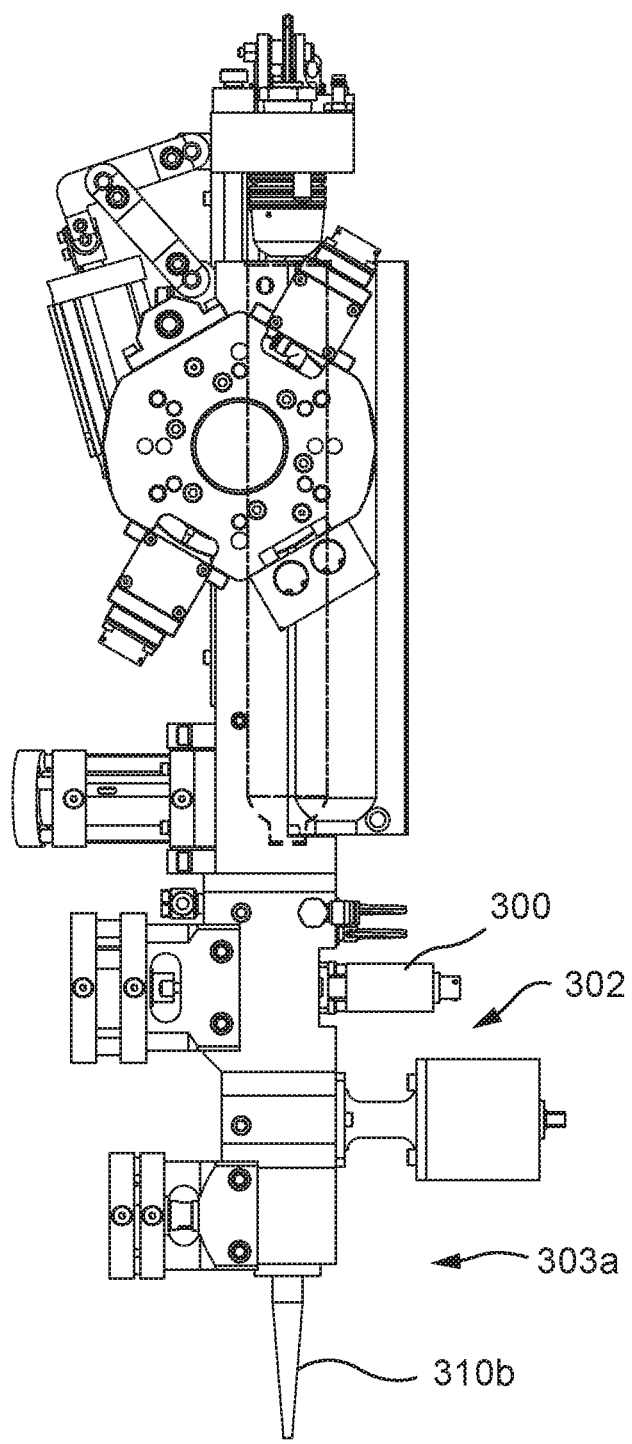
FIG. 7B is a side view of another embodiment of a dispenser in accordance with the disclosure.
Figure 8A:
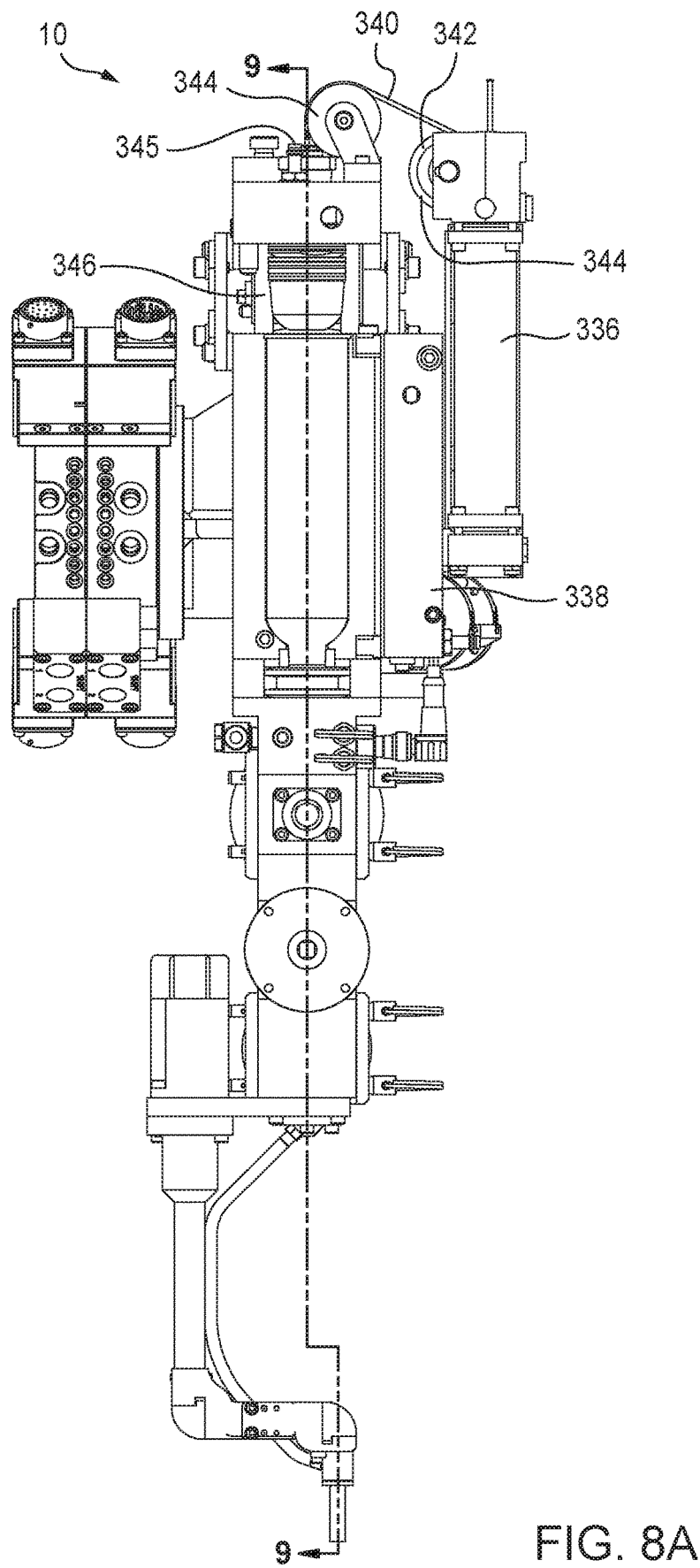
FIG. 8A is a front view of a dispenser in accordance with the disclosure.
Figure 8B:
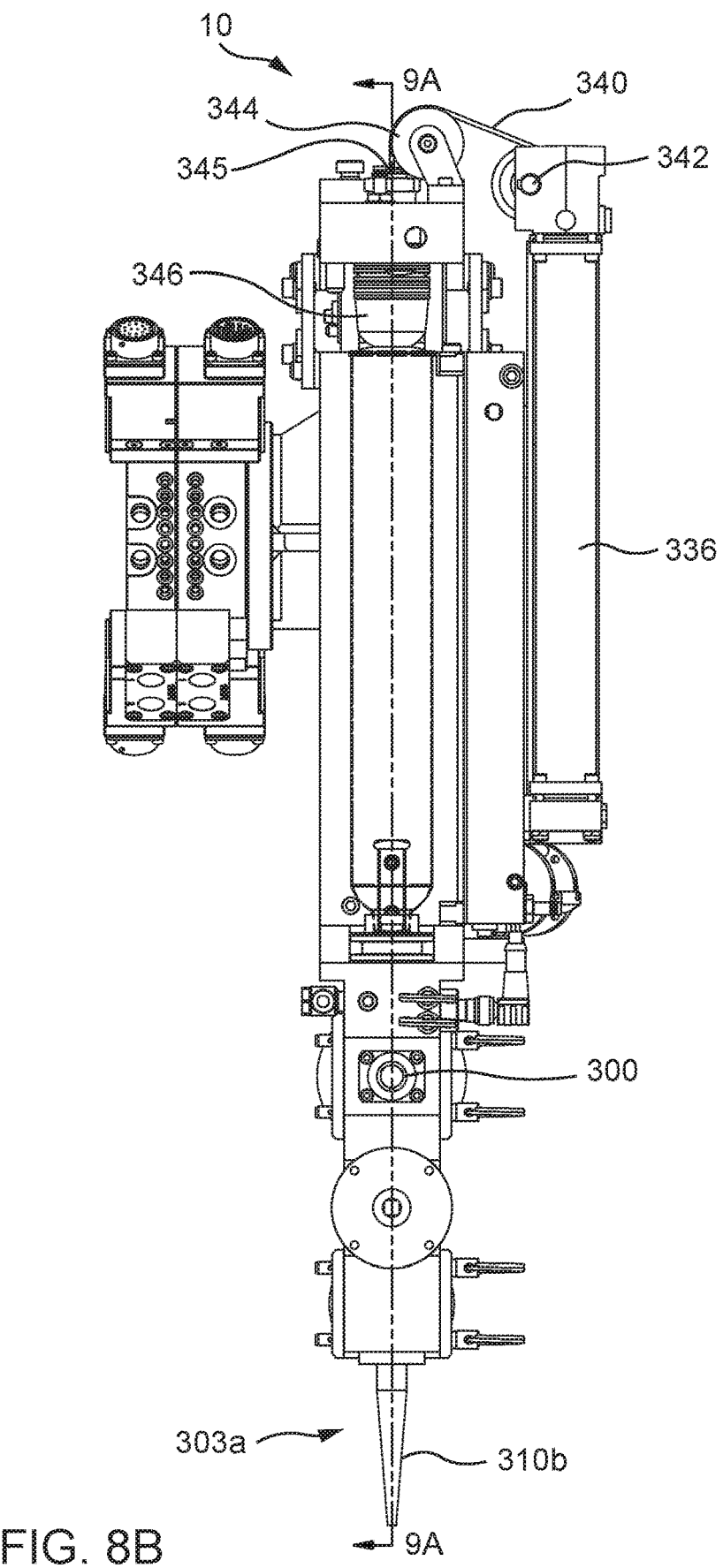
FIG. 8B is a front view of another embodiment of a dispenser in accordance with the disclosure.
Figure 10:
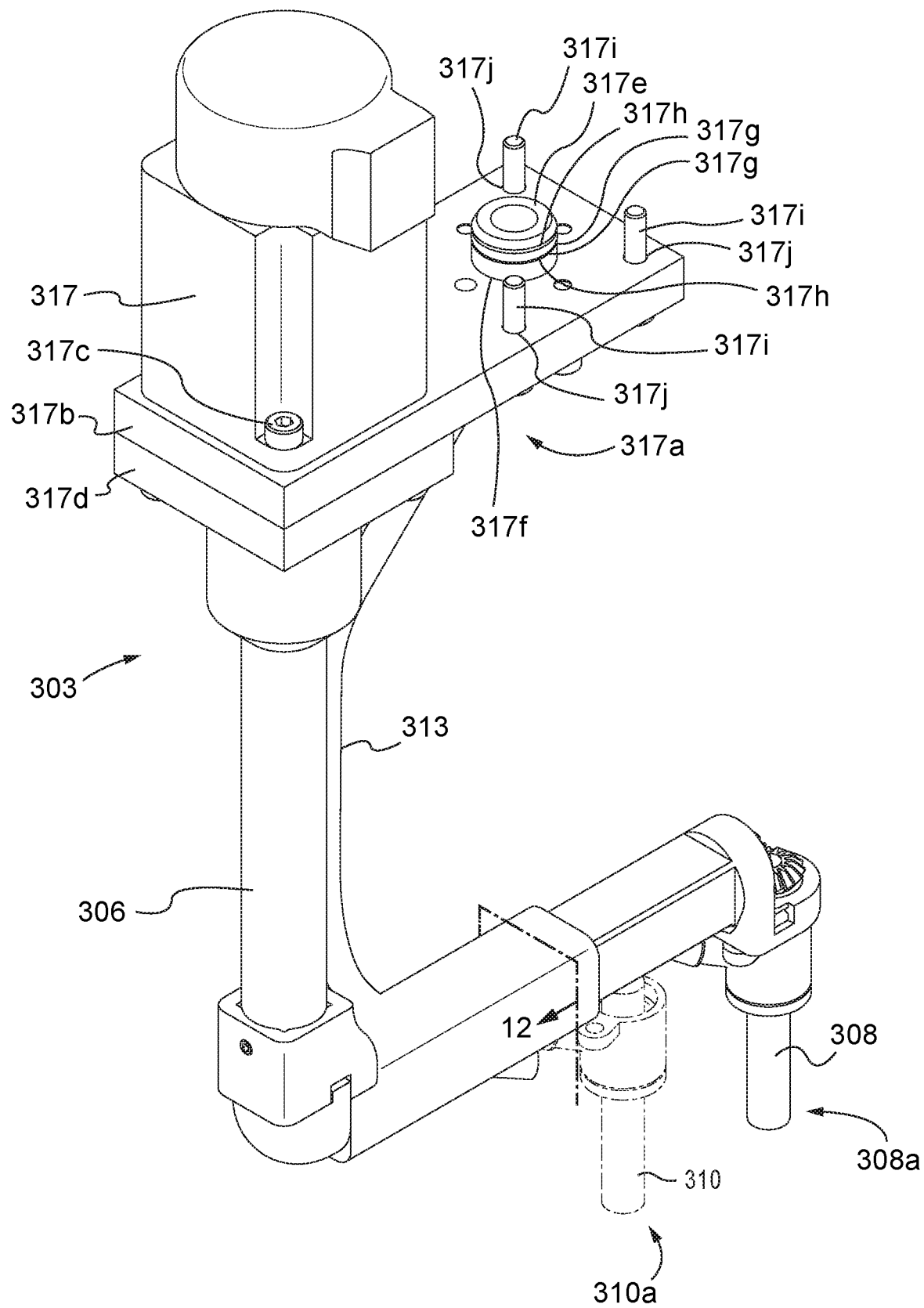
FIG. 10 is a partial, perspective view of a portion of a dispenser in accordance with the disclosure.
Figure 11A:
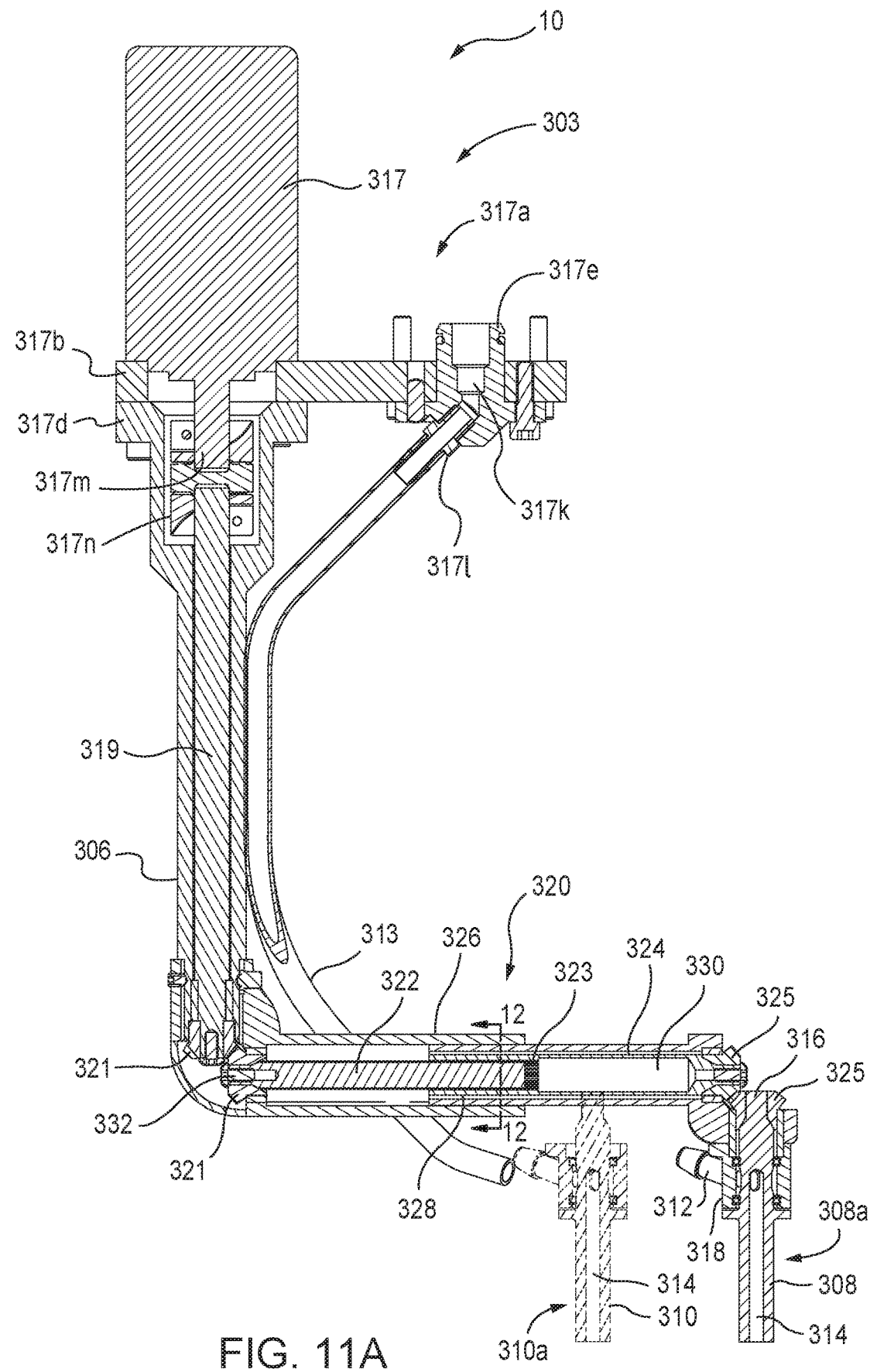
FIG. 11A is a cross sectional view of the dispenser of FIG. 10.

FIGS. 10 and 11A are respectively perspective and cross sectional views illustrating an embodiment showing one example structure for attaching the end effector assembly 303 to the dispenser 10 (FIG. 6A shows the dispenser 10 equipped with the end effector assembly 303). Mounting plate 317a includes motor mounting fasteners 317c attaching a motor 317 to a motor mounting plate 317b. An end effector mounting plate 317d is attached to the motor mounting plate 317b. The tube 306 and hose 313 may also be mounted to the end effector mounting plate 317d. A fluid mating receiver 317e extends through hole 317f in the motor mounting plate 317b. Fluid mounting member seals 317g may reside in fluid mounting member seal grooves 317h. Fluid mounting fasteners 317i extend through fluid mounting faster holes 317j in the motor mounting plate 317b.

As shown in FIG. 11A, the fluid mating receiver 317e defines an internal fluid passageway 317k and a hose connection 317l provides a way to connect the hose 313 to the fluid mating receiver 317e and provide fluid communication between the internal fluid passageway 317k and the hose 313. The fluid mating receiver 317e of FIG. 11A is configured to attach in a sealing manner to the fluid mating projection 307a of FIG. 9E.

As shown in FIG. 9E the fluid mating projection 307a is in fluid communication with the interior passageway 307. The fluid mating projection 307a includes a tapered surface 307b which is dimensioned to fit into a correspondingly dimensioned fluid mating receiver 317e (FIG. 11A). The fluid mating projection 307a may include seals 307c located in seal grooves 307d, to ensure that when the end effector assembly 303 is attached to the dispenser 10, the fluid mating projection 307a is sealed to the fluid mating receiver 317e. The seals 307c may be a resilient seals 307c and, in some embodiments, may be O-rings.

Returning to FIG. 11A, the motor 317 includes an output shaft 317m which connects to the power transmitting shaft 319 via a power transmission mechanism 317n. The power from the motor 317 is eventually transmitted to the dispensing brush 308, 310.

A dispensing brush 308, 310 is illustrated in both isometric and cross sectional views of FIGS. 10 and 11A. The dispensing brush 308, 310 may be associated with a telescoping mechanism 320. When the telescoping mechanism 320 is in a first position 308a, as shown by the distally located dispensing brush 308, the telescoping mechanism 320 is fully extended, putting the dispensing brush 308 in an extended position 308a. The dashed line dispensing brush 310 illustrates where the dispensing brush 310 will be located when the telescoping mechanism 320 is a retracted position 310a. The dispensing brush 310 is then in a proximate, non-extended position 310a. It should be noted that the hose 313 will be attached to the hose receptacle 312 whether the dispensing brush is in the first position 308a or in the second position 310a (see for example FIG. 15). The hose 313 is disconnected in FIGS. 10 and 11A merely to better illustrate the receptacle 312.

The dispensing brush 308, 310 includes a receptacle 312 located on its side 318 to receive the hose 313. Material flows through the hose 313 through the receptacle 312 and into an axial opening 314 and then out of the axial opening 314 in the dispensing brush 308, 310. In some implementations, the receptacle 312 may be located at a top portion 316 of the dispensing brush 308.

In some embodiments, the dispensing brush 308, 310 may be made of ABS-M30 white housings, epoxy set with white horsehair. In other embodiments, the dispensing brush 308, 310 may made of injection molded white acetyl housing, epoxy set with white horsehair. In other embodiments, the brush 308, 310 may be plastic made or other suitable material. Other materials may also be used.

Figure 13A:
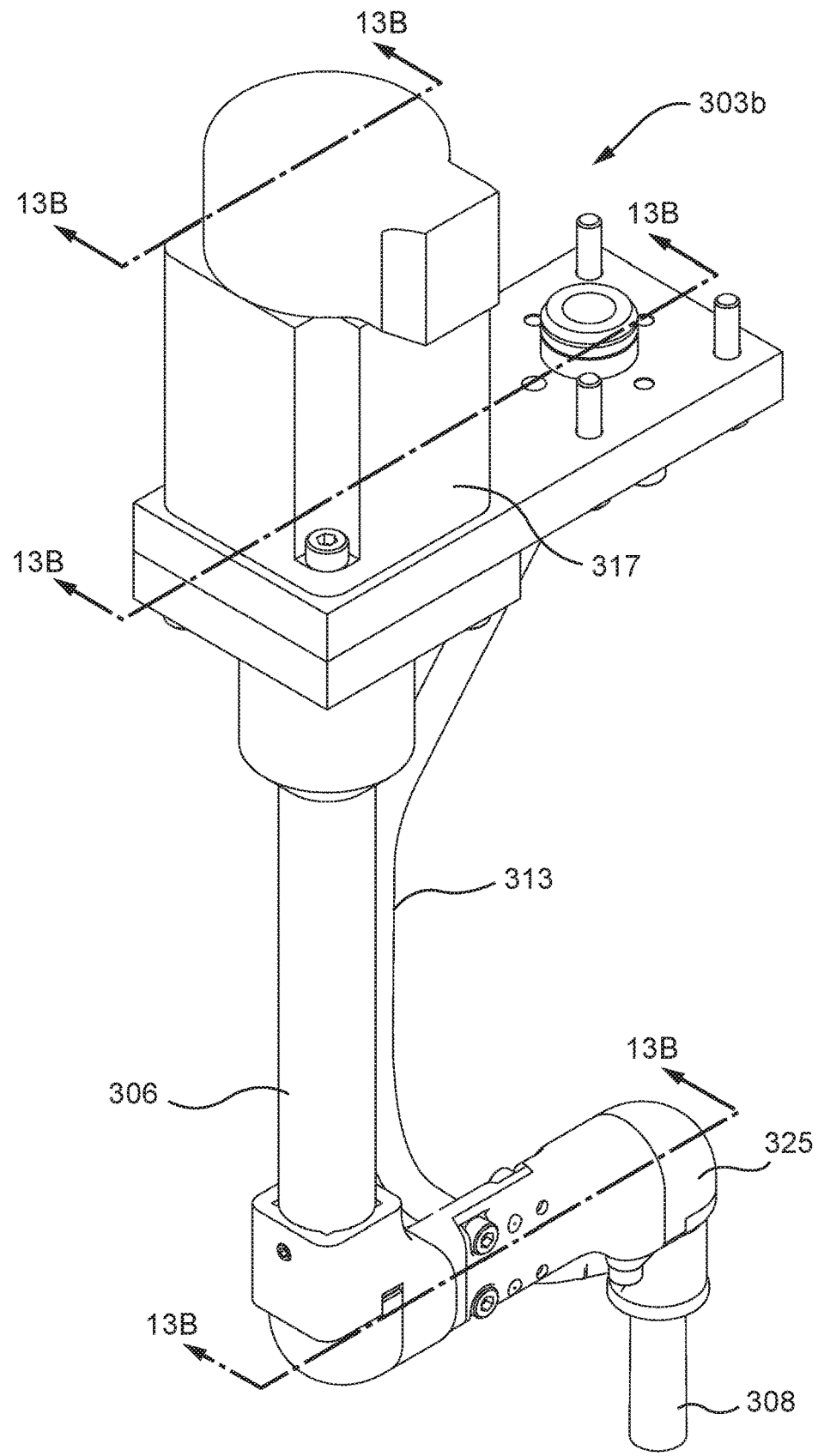
FIG. 13A is a perspective view of a brush end effector assembly in accordance with the disclosure.
Figure 13B:
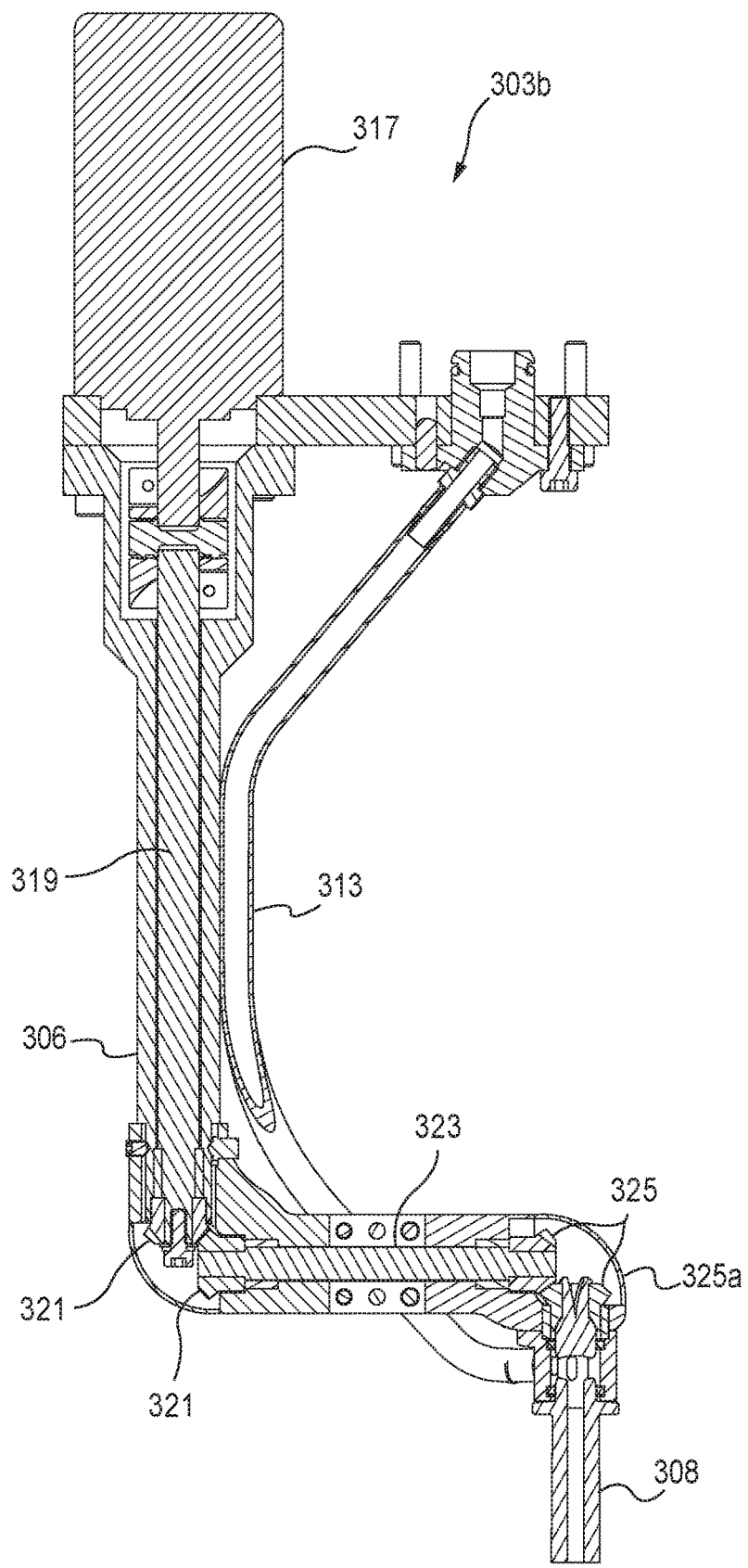
FIG. 13B is a cross sectional view of a brush end effector assembly accordance with the disclosure.

FIGS. 10, 11A, 13A and 13B illustrate an end effector assembly 303 of a dispenser 10 that has a motor 317 that transmits power via a power output shaft 319 through mitered gears 321 to shaft 323 which uses a second set of beveled gears 325 to rotate a portion of the brush 308, 310. FIG. 11A is a cross-sectional view of the end effector assembly 303 shown in FIG. 10 and FIG. 13B is a cross-section taken along the line 13B-13bB of FIG. 13A. The shaft 323 can be of fixed length, as shown in FIGS. 13A and 13B. However, in some embodiments, such as shown in FIG. 11A, an adjustable length mechanism 320 can be used. The adjustable mechanism 320 can be a telescoping mechanism that allows for the brush 308, 310 to be adjusted at different distances.

Figure 12:
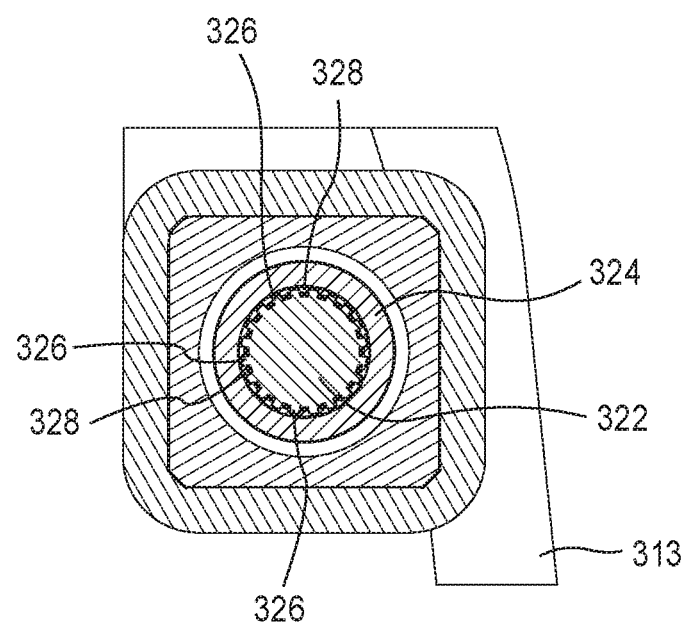
FIG. 12 is a cross sectional view taken along the line 12-12 in FIG. 11A.

FIG. 12 illustrates the telescoping adjustable mechanism 320 at taken along line 12-12 shown in FIG. 11A. The telescoping adjustable mechanism 320 includes an inner shaft 322 and outer shaft 324. The inner shaft 322 contains inner shaft splines 326 located radially about the inner shaft 322. The outer shaft 324 also contains splines 328 sized to fit between the inter-shaft splines 326. The inter-shaft splines 326 and outer shaft splines 328 are configured to lock the inner shaft 322 to the outer shaft 324 such that when one of the two shafts 322 and 324 rotate about its longitudinal axis, the other shaft 322 and 324 will also rotate about its longitudinal axis.

The outer shaft splines 328 are located in an interior cavity 330 of the outer shaft 324. As seen in FIG. 11A, the inner shaft 322 is configured to slide axially and move in or out of the interior cavity 330 of the outer shaft 324. Relative axial movement of the inner shaft 322 with respect to the outer shaft 324 provides the telescopic function and allows the location of the brush 308, 310 to be modified via the telescoping adjustable mechanism 320.

As seen in FIG. 11A, the outer shaft splines 328 may only extend lengthwise along a portion of the interior cavity 330. In some embodiments, the outer shaft splines 328 may extend along the entire length of the interior cavity 330. In some embodiments, the inner shaft 322 may be fixed to the mitered gear 321 via a screw 332. The screw 332 can axially fix the inner shaft 322 so that it is the outer shaft 324 that moves axially with respect to the inner shaft 322.

In some embodiments, the telescoping adjustable mechanism 320 uses a twenty point spline. In other words, there are twenty inner shaft splines 326 and twenty outer shaft splines 328. In other embodiments, there may be greater or fewer splines 326 and 328. The splines 326, 328 may be squared off, rounded or have any other desirable shape in cross-section. In some embodiments, the telescoping adjustable mechanism 320 is dimensioned so that the mechanism 320 can experience an offset of about 3.5 inches to about 5 inches. In some embodiments, the inner shaft 322 and/or outer shaft 324 may be made of hardened steel or other suitable material.

Figure 11B:
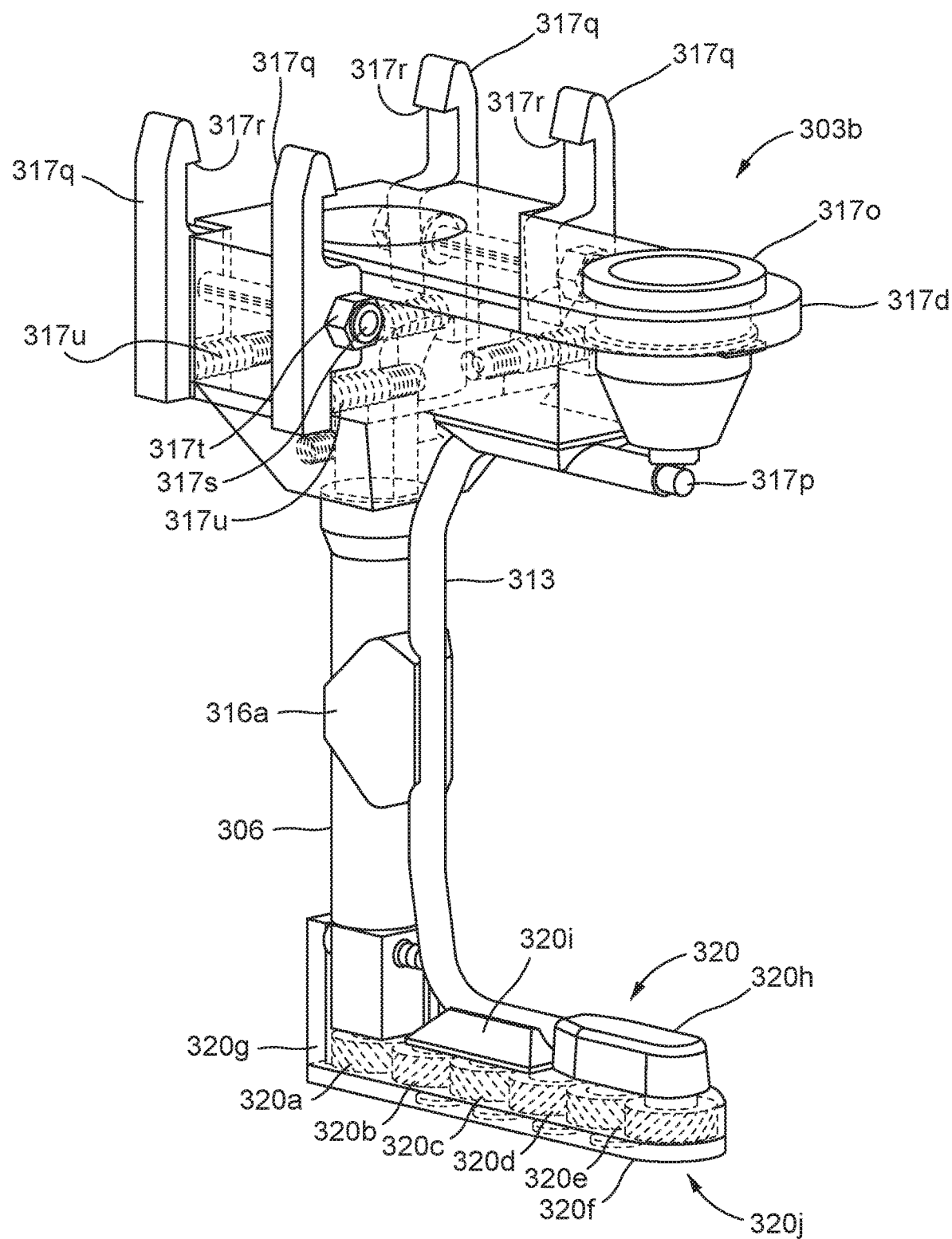
FIG. 11B is a partial, perspective view of a dispenser in accordance with the disclosure.
Figure 11C:
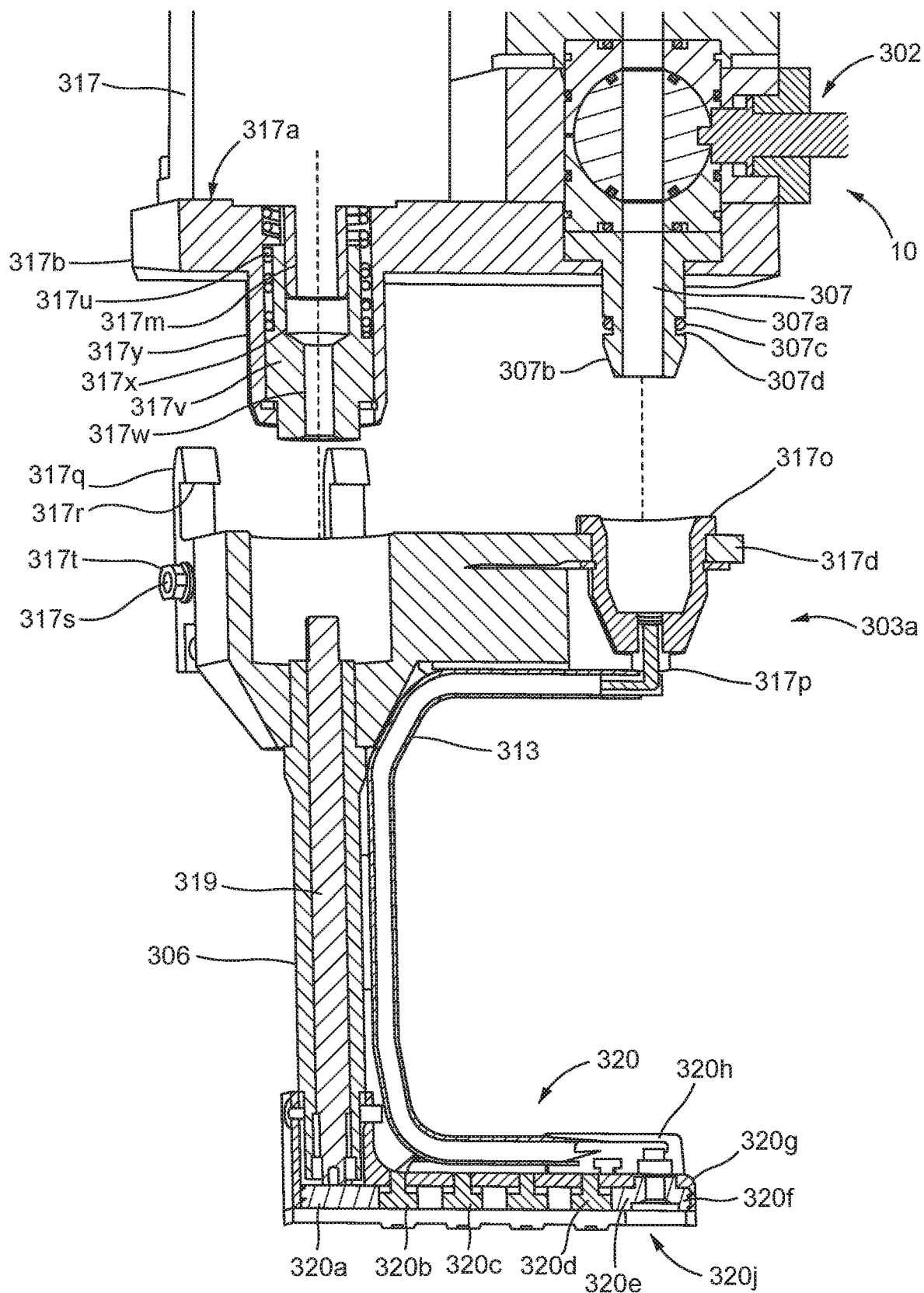
FIG. 11C is a partial, cross sectional view of a dispenser in accordance with the disclosure.

FIGS. 9C, 11B, and 11C, illustrate an alternate adjustable mechanism 320. The alternate elongating mechanism 320 uses sets of helical gears 320a, 320b, 320c, 320d, 320e, and 320f. In some embodiments, each set of helical gears may add about 1.06 inches to the length of the adjustable mechanism 320. A user may select how many sets of helical gears are to be used to achieve a desired length for the adjustable mechanism 320. Like the telescoping adjustable mechanism 320, the brush 308, 310 (not shown in FIGS. 11B and 11C) is located and attached to the end of the adjustable mechanism 320 and configured to rotate. While the telescoping adjustable mechanism 320 may use beveled gears 325 to transmit the rotating motion to the brush 308, 310 the adjustable mechanism 320 that uses helical gears and may attach the brush 308, 310 to the final helical gear 320f and allow the brush 308, 310 to rotate. In both cases, the hose 313 will transmit fluid to the axial opening 314 of the brush 308, 310 either via the receptacle 312 in the case of the telescoping adjustable mechanism or the hose connection 320k which is part of the brush mounting assembly 320j which allows the brush 308, 310 to be connected to the helical gear 320f In the embodiment illustrated in FIGS. 11B and 11C, the helical gears 320a, 320b, 320c, 320d, 320e, and 320f, may be covered with a gear housing 320g. A hose housing 320h may provide some protection for the hose 313 and a hose clip 306a may attach the hose 313 to the tube 306.

The tube 306 of FIGS. 11B and 11C may be octagon, hexagon or other suitable shape in cross section and fit into a correspondingly shaped hole in the end effector mounting plate 317d so that the gears 320a, 320b, 320c, 320d, 320e, and 320f and the brush 308 (not shown in FIGS. 11B and 11C) may be oriented at different angular positions with respect to the end effector mounting plate 317d. Further, the tube 306 may also be of different lengths as desired to put the brush 308 in a desired position.

Figure 11D:
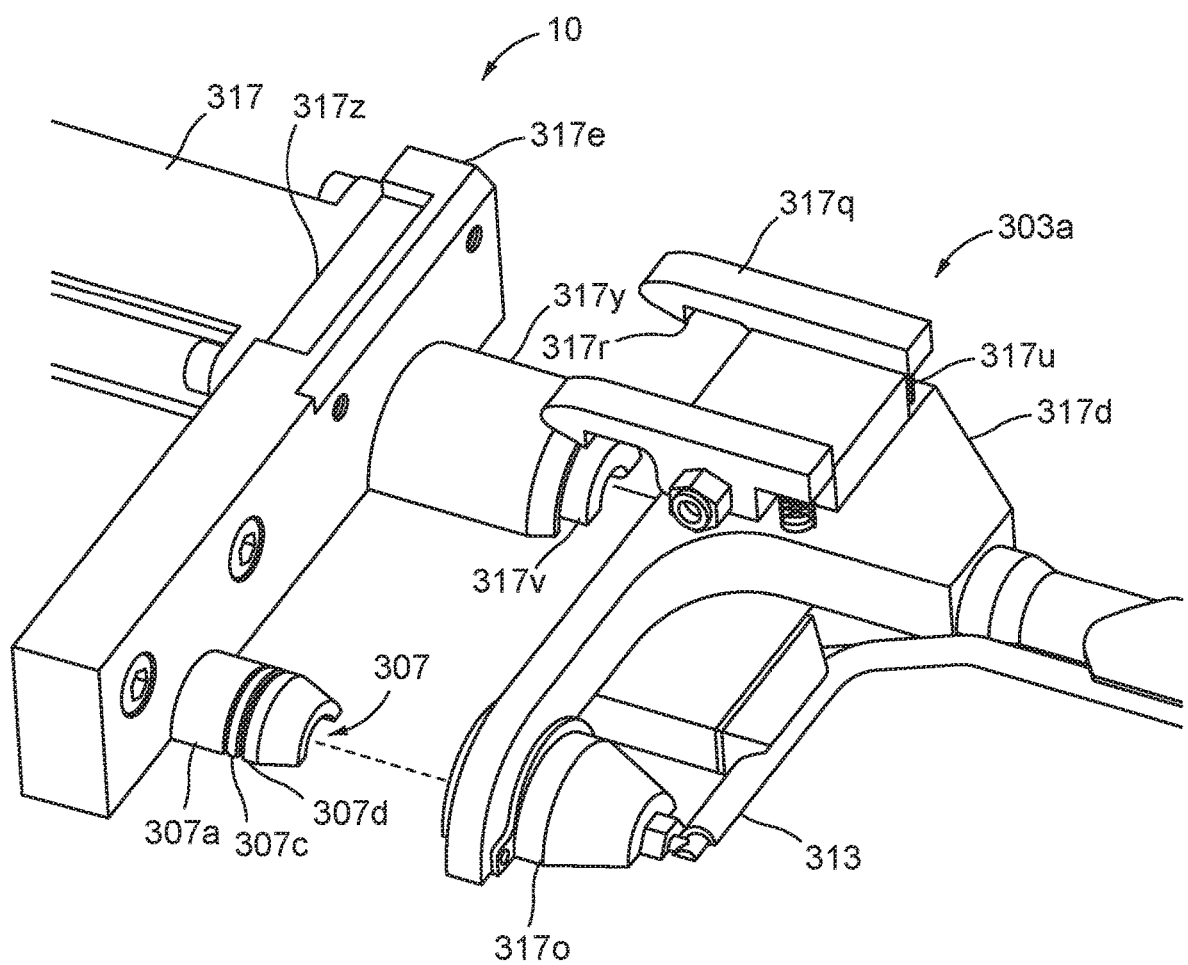
FIG. 11D is a partial, perspective view of a dispenser in accordance with the disclosure.

FIGS. 11B, 11C, and 11D illustrate an alternate way and structure for attaching an end effector assembly 303b to the dispenser 10 than what is shown and described with respect to FIGS. 10 and 11A. The end effector assembly 303b is equipped with attaching fingers 317q. The attaching fingers 317q are hook shaped and define an attaching surface 317r. The attaching fingers 317q are pivotally mounted on pivot shafts 317s contained in the end effector mounting plate 317d and held in place by pivot shaft bolts 317t. The attaching fingers 317q are biased toward the end effector mounting plate 317d by pivot springs 317u.

A fluid mating member receiver 317o is located in the end effector mounting plate 317d. In some embodiments, the fluid mating member receiver 317o is mounted loosely to the end effector mounting plate 317d so the end effector mounting plate 317d can "float" and move radially within the end effector mounting plate 317d to align and position itself during a mating operation. The fluid mating member receiver 317o connects to the hose 313 via a hose connection 317p and allows the inside of the fluid mating member receiver 317o to fluidly communicate with the interior of the hose 313.

As shown in FIGS. 11C and 11D, the dispenser 10 has mounting structure on the motor mounting plate 317a to connect to the end effector assembly 303a. The motor 317 has a power output shaft 317m that connects to a power coupler 317v. The power coupler 317v has a large axial hole 317x in which the power output shaft 317m extends. The exterior of the power output shaft 317m and the interior of the large axial hole 317x may be hexagon, octagon, or some other suitable shaped cross section to allow the power output shaft 317m to grip the walls of the large axial hole 317x without spinning with respect to the power coupler 317v.

The power coupler 317v also has a small axial hole 317w which also may be be hexagon, octagon, or some other suitable shaped cross section to allow the power coupler 317v to attach to the power transmitting shaft 319 which may have a corresponding hexagon, octagon, or other suitable shaped cross section in order to allow the power coupler 317v rotate with and transmit torque from the motor 317 without slipping with respect to the power transmitting shaft 319. A spring 317u biases the power coupler 317v toward the power transmitting shaft 319. The power transmitting shaft 319 aids in transmitting rotational energy and torque from the motor 317 to the helical gears 320a, 320b, 320c, 320d, and 320e.

The fluid or adhesive in the interior passageway 307 is transmitted through the fluid mating projection 307a to the fluid mating member receiver 317o. The fluid mating projection 307a has a tapered surface 307b that is dimensioned to fit inside the fluid mating member receiver 317o. A fluid mating seal 307c residing in a seal groove 307d will assist in sealing the connection of the fluid mating projection 307a with the fluid mating member receiver 317o. The seal 307c may be a resilient seal 307c and, in some embodiments may be an O-ring.

The end effector assembly 303a attaches to the rest of the dispenser 10 by the attaching fingers 317q. When the end effector assembly 303a moves toward the mounting plate 317a, the attaching fingers 317q will pivot and cam over the motor mounting plate 317b until the motor mounting plate 317b is moved close enough to allow the attaching fingers 317q to snap back due to the urging of the springs 317u and place the attaching surfaces 317r on the attaching fingers 317q in position on the attaching surface 317z on the mounting plate 317b. To remove the end effector assembly 303a, the attaching fingers 317q are pivoted against the urging of the springs 317u thereby moving the attaching surfaces 317r on the attaching fingers 317q from the attaching surface 317z on the mounting plate 317b. The end effector assembly 313a may then be separated from the rest of the dispenser 10.

Figure 14:
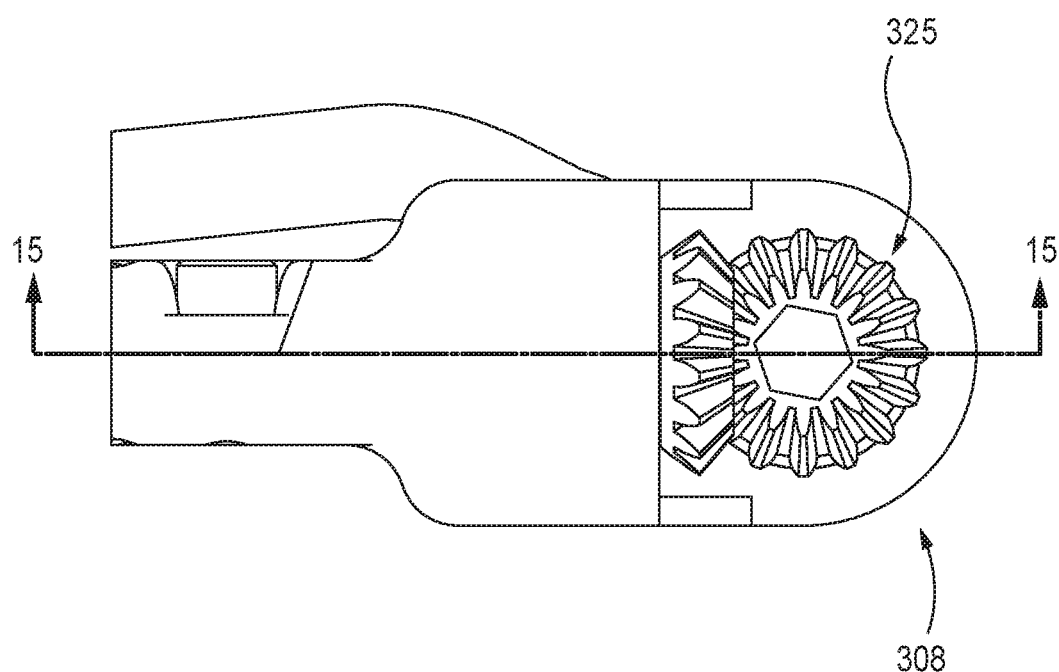
FIG. 14 is a partial, top view of a portion of a brush end effector assembly in accordance with the disclosure.
Figure 15:
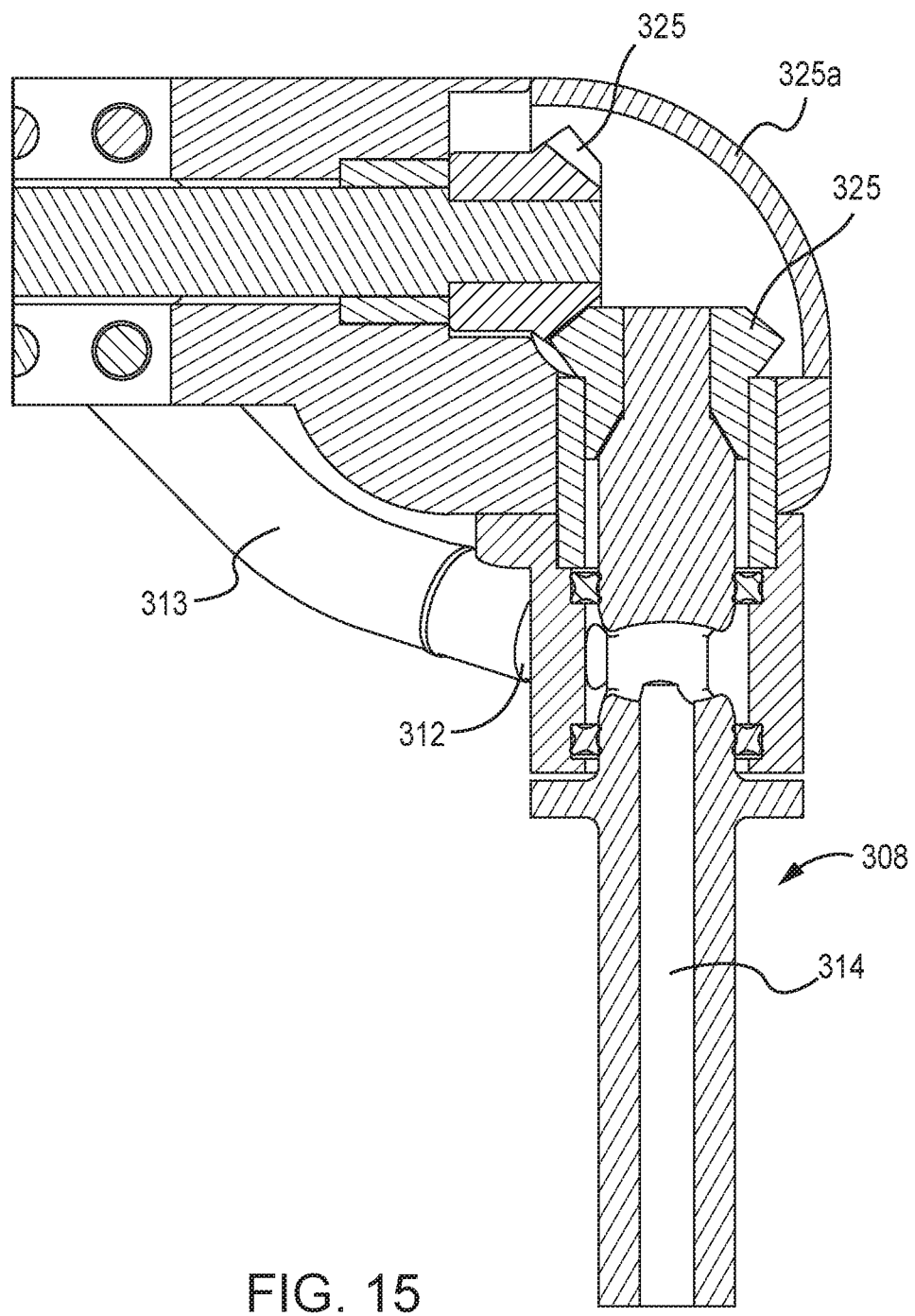
FIG. 15 is a partial, cross-cross sectional view of a portion of a brush end effector assembly in accordance with the disclosure.

FIGS. 14 through 17 illustrate an example brush 308 that uses bevel gears 325 as shown in the embodiments of FIGS. 11A, 13A, and 13B. FIG. 14 is a top view of the brush 308 with the gear cover 325a (see FIGS. 13B, 15 and 17) to better show the gears 325. FIG. 15 is a cross-section view along the line 15-15 in FIG. 14. The hose 313 is shown connected to the hose receptacle 312 illustrating a pathway for fluid or adhesive to flow through the hose 313 to the axial opening 314 in the brush 308.

Figure 16:
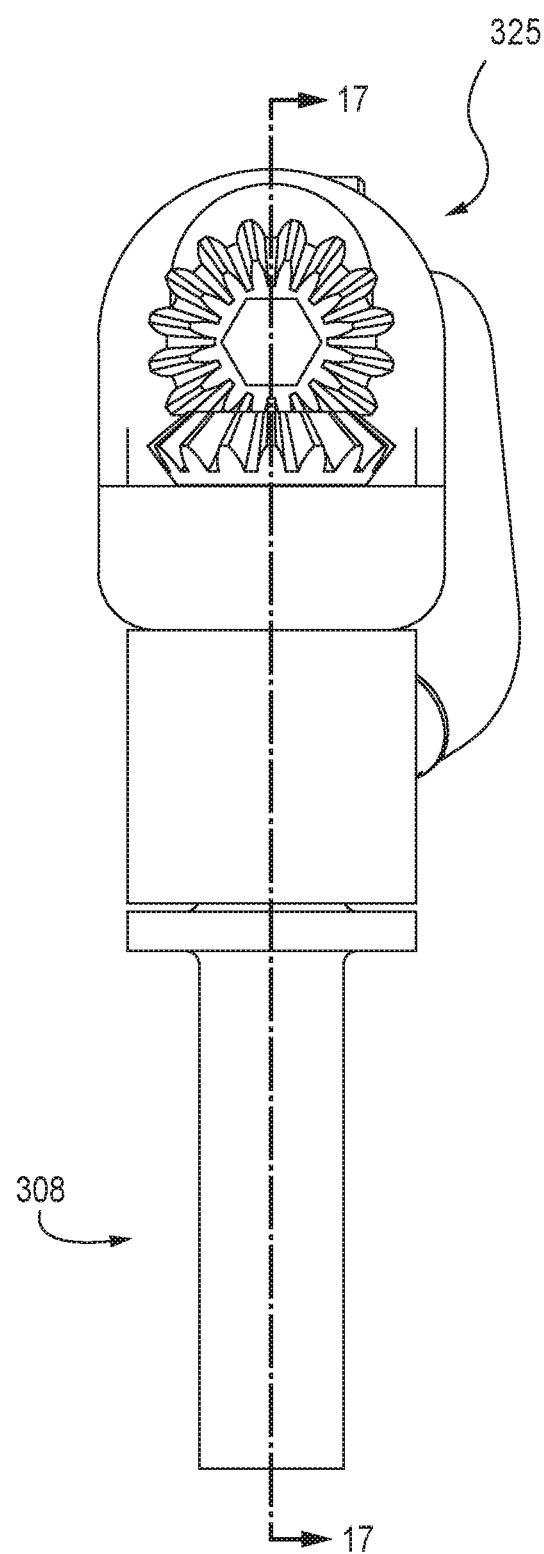
FIG. 16 is a partial, bottom view of a portion of a brush end effector assembly in accordance with the disclosure.
Figure 17:
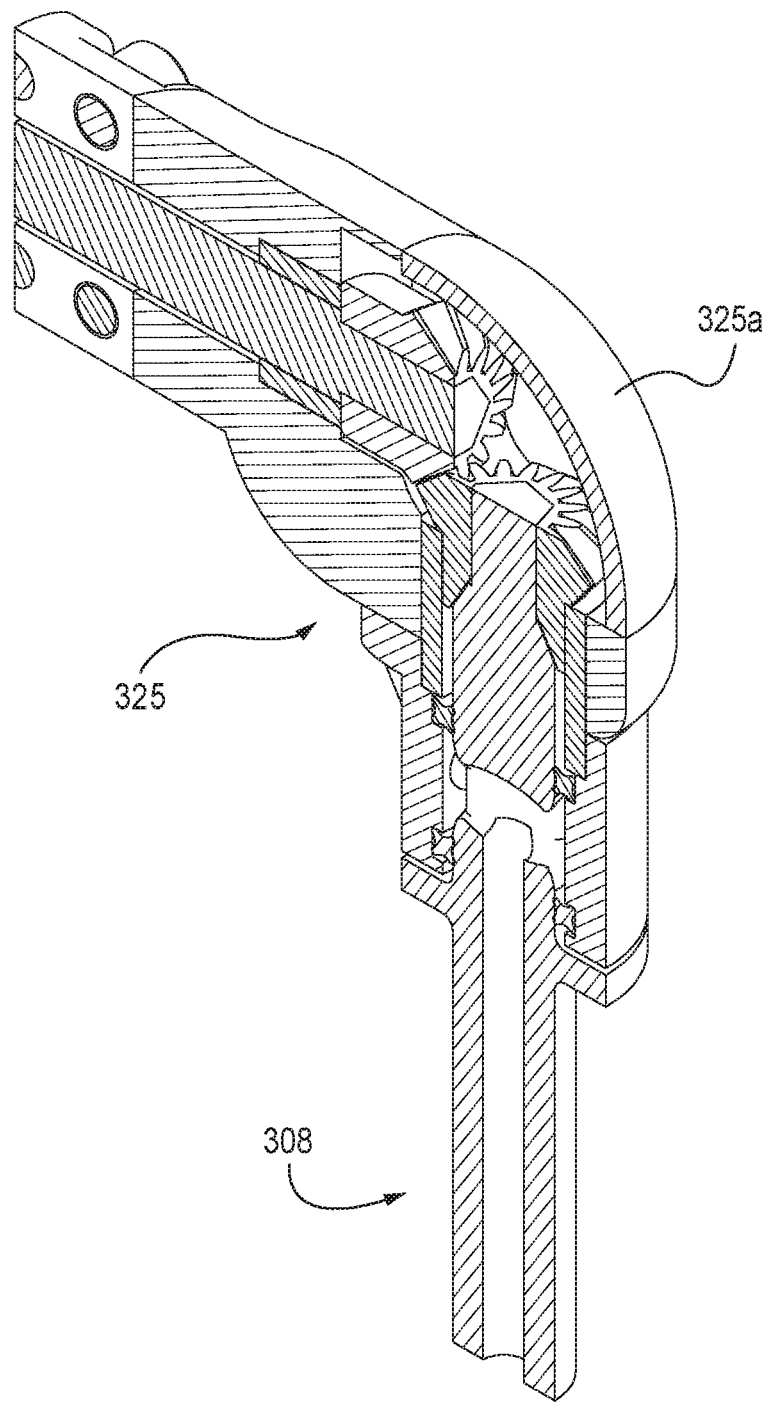
FIG. 17 is a partial, cross-cross sectional view of a portion of a brush end effector assembly in accordance with the disclosure.

FIG. 16 is a front view of the brush 308 with the gear cover 325a removed to show the bevel gears 325. FIG. 17 is a perspective, cross sectional view taken along the line 17-17 in FIG. 16 of the brush 308 illustrating the beveled gears 325 and the gear cover 325a.

Actuation of the plunger 22 (sometimes referred to as a piston 22) to move a fluid and/or adhesive out of the cartridge 12 has been described above. The plunger 22 or piston 22 can be moved out of the cartridge 12 in the embodiment of FIGS. 6A-9A and 20-21, described below. The plunger 22 may move into the cartridge 12 and move material out of the cartridge 12 as described above. However, when the piston 22 is at the bottom of the cartridge 12, various systems may be used for removing the piston 22. One system includes a cable mechanism 334 described further below with respect to FIGS. 6A-9A and 20-21.

The cable mechanism 334 may include a cable cylinder 336. The cable cylinder 336 may be pneumatically operated, hydraulically operated, electrically operated, or by any other suitable mechanism. The cable cylinder 336 may be attached to the housing 338 of the dispensing apparatus 10 (see FIG. 8A for example). The cable cylinder 336 may be operated to allow a cable 340 to retract into the cable cylinder 336 and to remove the cable 340 out of the cable cylinder 336.

The cable 340 may wind around a first pulley 342 which may be attached to the cable cylinder 336 and around a second pulley 344 which may be attached to the housing 338 of the dispenser 10. One purpose of the first pulley 342 and the second pulley 344 is to align the cable 340 through an axial hole 345 (see FIG. 21) through which the cable 340 is attached to the piston 22. As the piston 22 extends into the cartridge 12, the piston 22 will eventually bottom out into the cartridge 12. When the piston 22 is in the cartridge 12, it may be desired to move the piston 22 out of the cartridge 12. This may be accomplished by actuating the cable cylinder 336 to cause the cable 340 to retract into the cable cylinder 336 which will, in turn, pull the piston 22 up through the cartridge 12 and out of the cartridge 12. Once the piston 22 has been removed from the cartridge 12, the cartridge 12 may be removed and a new cartridge 12 placed in the dispensing apparatus 10.

In some embodiments, it may be found that an initial force required to move the piston 22 from a stopped condition to a moving condition is much greater than a force required to keep the piston 22 moving through the cartridge 12. In such instances, it may be desirable to have an apparatus that allows the cable mechanism 334 to exert a much greater initial force on the piston 22 and then the residual force can be used to move the piston 22 through the cartridge 12. In some embodiments, the apparatus may include a proportional regulator which may be configured to provide a higher amount of force which, in some embodiments may be pneumatic force, to break the piston 22 free and then use a much reduced force to have the cable 340 move the piston 22 once the piston 22 has started moving.

Figure 21:
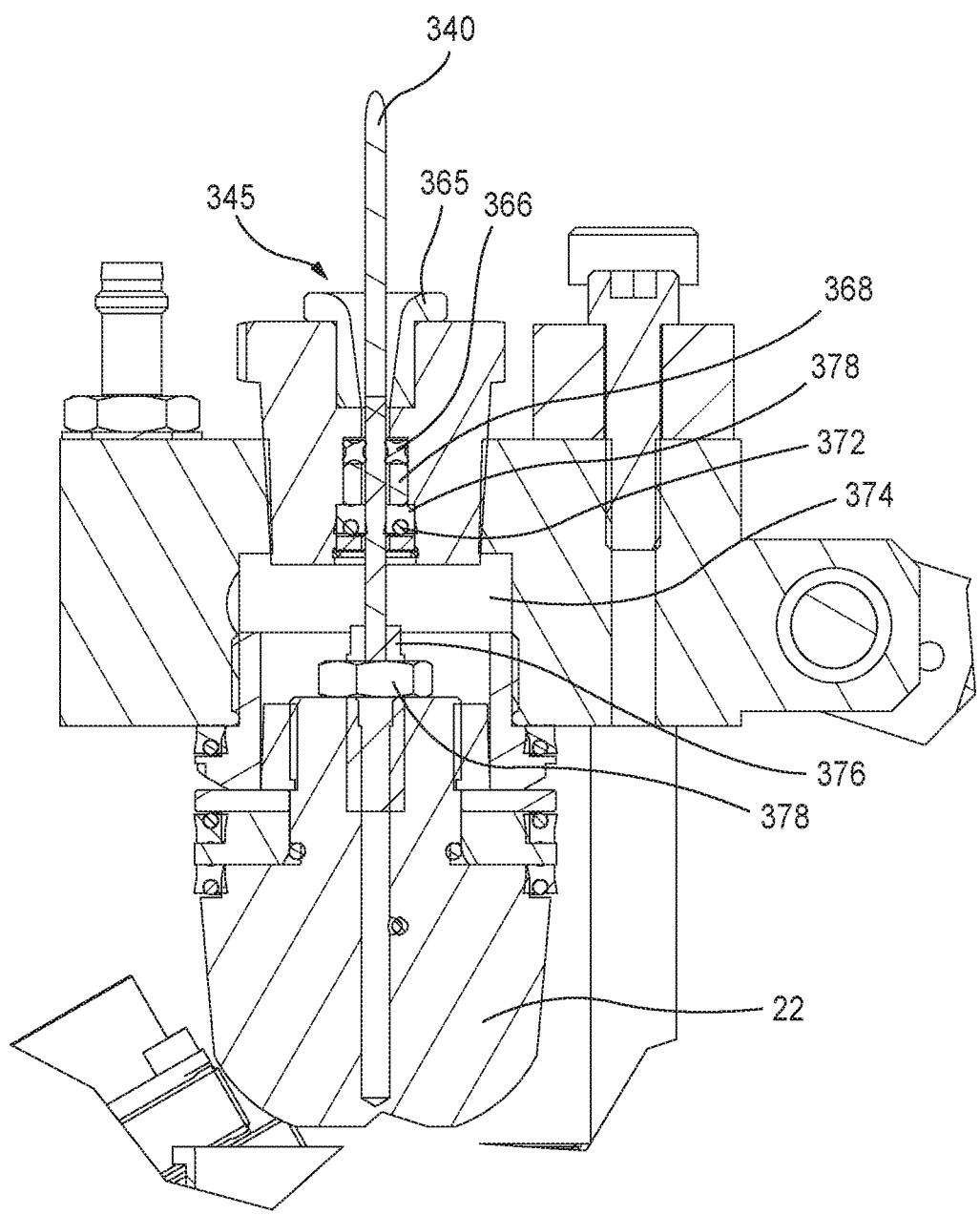
FIG. 21 is a partial, cross-cross sectional view of a portion of a dispenser in accordance with the disclosure.

FIG. 21 is an enlarged partial cross sectional view showing the cable 340 attaching to the piston 22. In some instances, seals 366 may be used along the cable 340. This is particularly true in instances where the fluid space 20 in which the piston 22 resides is subject to high pressure. For example, in some embodiments, the piston 22 may exist in a high-pressure environment such as around 400 PSI. Meanwhile, the cable cylinder 336 may operate around 150 PSI. Various seals may be used along the cable 340 to insulate the high-pressure chamber 150 from surrounding areas.

For example, as shown in FIG. 21, the cable 340 extends through a funnel 365 through the axial hole 345. A quad seal 366 may be located around the cable 340. In some instances, the quad seal 366 may be a standard off-the-shelf item. Below the quad seal 366, a spacer 368 may provide spacing between the quad seal 366 and a poly pack 370. An additional spacer 372 may space the poly pack 370 from the retainer 374. The retainer 374 may help retain the quad seal 366, spacers 368, and 372 and the poly pack 370 in place.

The cable 340 attaches to the piston 22 via a collet 376 which may be tightened by a nut 378. As may be appreciated by one of ordinary skill the art, tightening the nut 378 will tighten the collet 376 around the cable 340 which can cause the cable 340 to attached to the piston 22 as the collet 376 and/or nut 378 may be attached to the piston 346. While the illustrated embodiment shown in FIG. 21 uses a collet 376 and nut 378 to attach the cable 340 to the piston 22, other mechanisms or apparatus may also be used to attach the cable 340 to the piston 22.

Figure 18:
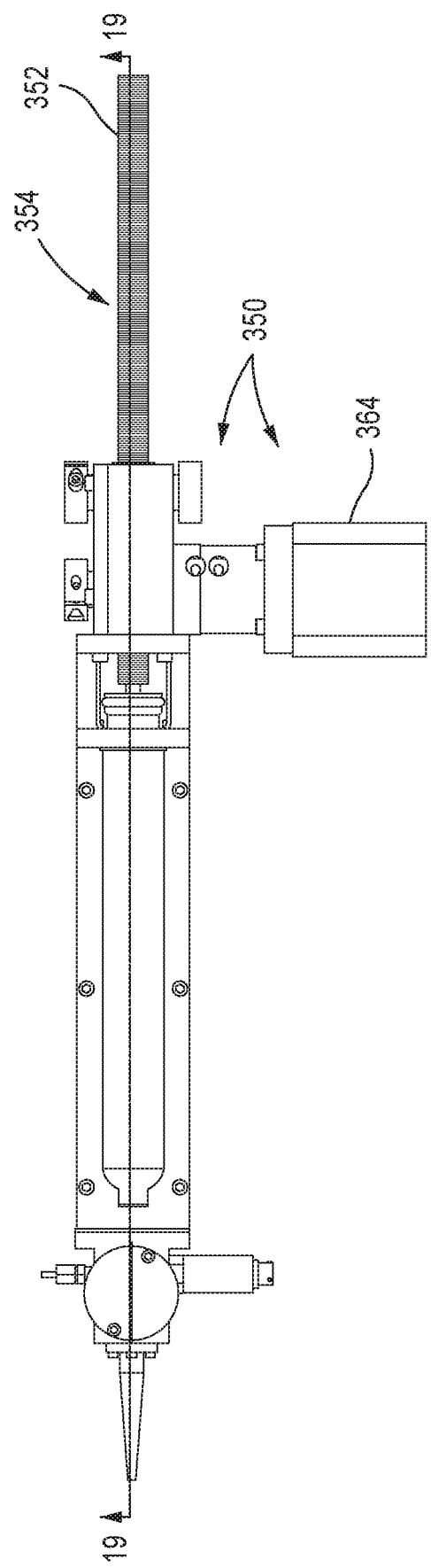
FIG. 18 is a partial, top view of a portion of a dispenser in accordance with the disclosure.
Figure 19:
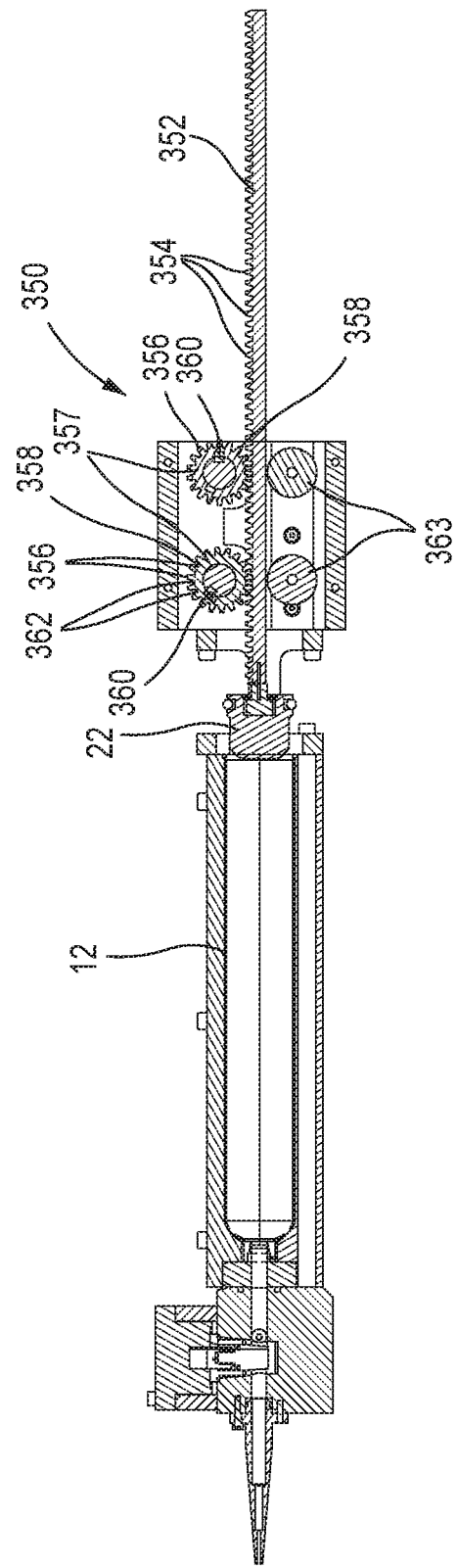
FIG. 19 is a partial, cross-cross sectional view of a portion of a dispenser in accordance with the disclosure.
Figure 20:
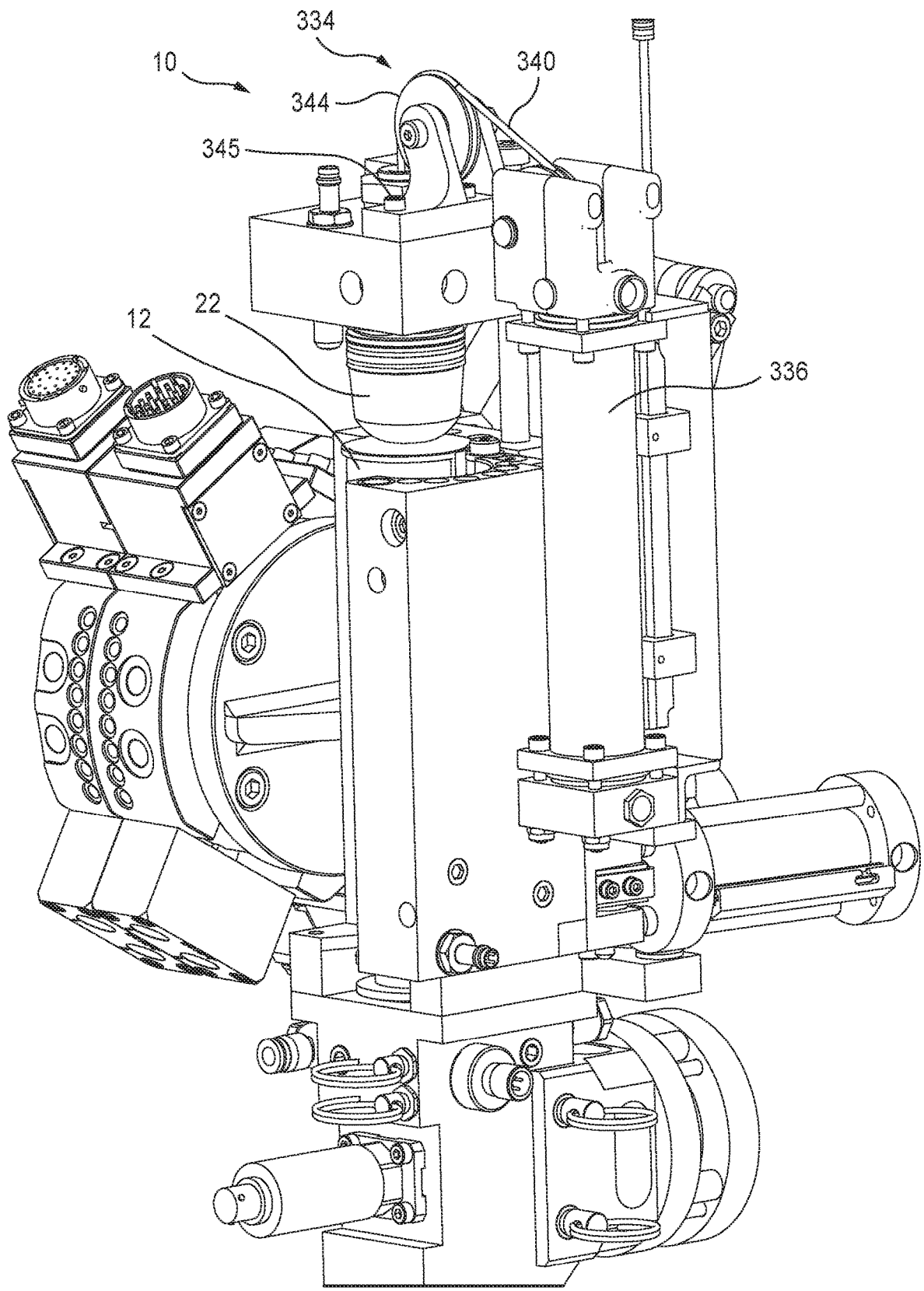
FIG. 20 is a partial, perspective view of a portion of a brush end effector assembly in accordance with the disclosure.

FIGS. 18 and 19 illustrate an alternative embodiment where instead of using a cable mechanism 334 to move the piston 346 out of the cartridge 348, a rack and pinion system 350 is used.

As shown in FIGS. 18 and 19, a rack 352 includes teeth 354. The teeth 354 are configured to interact with teeth 356 located on pinions 357. The pinions 357 are mounted on powered shafts 358 and are held in place by keys 360 each located in keyway 362. The powered shafts 358 may be operatively connected to a servo-motor 364. The servo-motor 364 may be configured to monitor the location of the piston 22 by counting the rotations of the powered shafts 358, pinions 357 and/or location of the rack 352. In this manner the servo-motor 364 and/or an accompanying controller of the servo-motor 364 can operate the rack and pinion system 350 to keep the piston 22 in a desired position.

In addition to and/or instead of, the servo-motor 364 keeping track of where the piston 346 is as described above, the rack and pinion system 350 may also include sensors to detect where the piston 346 is though the sensors that may be operatively connected to a controller to control the rack and pinion system 350 similar to the cable mechanism 334 described above. In such instances, the controller may control the rotation of the powered shafts 358 by controlling a motor 364 configured to rotate the powered shafts 358. A discussion of a controller and sensor is found below with respect to FIGS. 30 and 31.

As shown in FIG. 19, idlers 363 may also be located under the rack 352 to provide an opposing force to the pinions 357 to reduce the likelihood of the rack 352 the deforming forming to an undesirable level and/or helping the rack 352 move the piston 22 in a desired manner.

Figure 22:
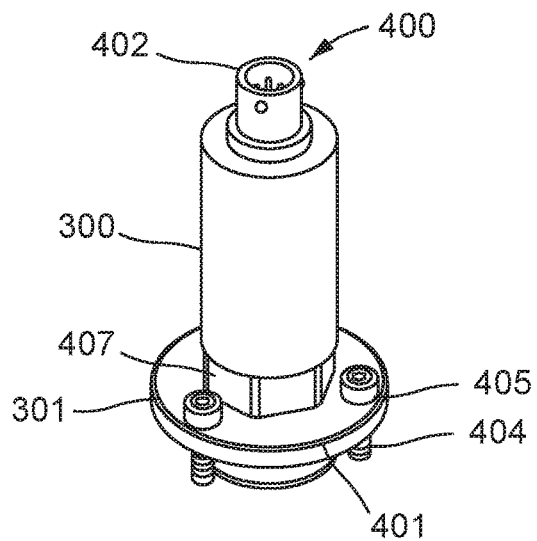
FIG. 22 is a perspective view of a pressure transducer used in a dispenser in accordance with the disclosure.
Figure 23:
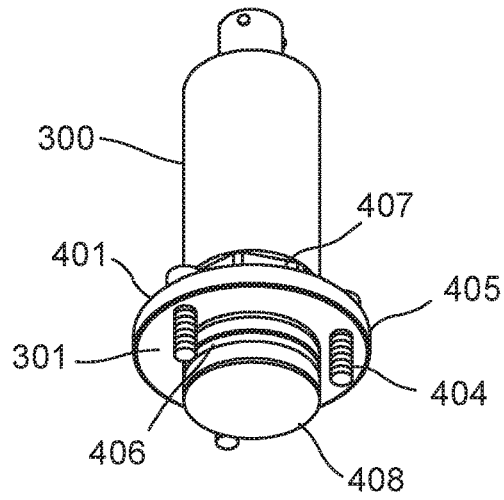
FIG. 23 is a perspective view of a pressure transducer used in a dispenser in accordance with the disclosure.
Figure 24:
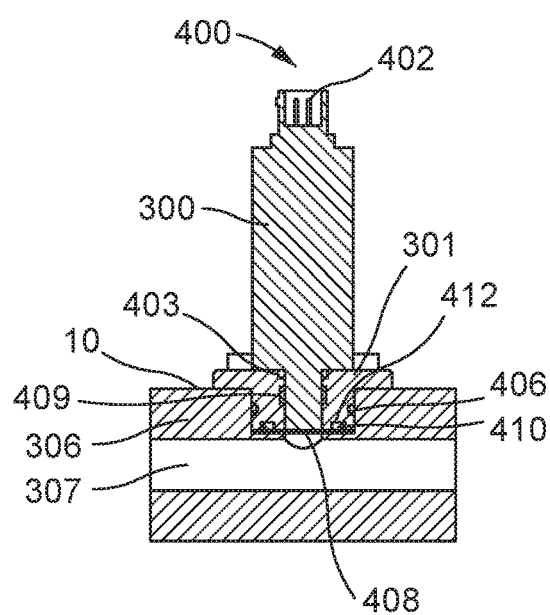
FIG. 24 is a cross sectional view of a pressure transducer used in a dispenser in accordance with the disclosure.

FIGS. 22-26 further show the pressure transducer 300 shown in FIG. 9 and described briefly above. The pressure transducer 300 is connected to an adapter 301. The adapter 301 facilitates connecting the pressure transducer 300 to the dispensing apparatus 10 as shown generally in FIGS. 6A-9A. As shown in FIGS. 22-24, the pressure transducer 300 is equipped with a connection interface 400 to connect to wire or cables for transmission of a signal associated with the pressure sensed by the pressure transducer 300. The connection interface 400 may include connecting pins 402.

The adapter 301 has a flange 401 equipped with fasteners 404 extending through fastener holes 405. The fasteners 404 will facilitate attaching the pressure transducer 300 to the dispensing apparatus 10 via the adapter 301 as shown in FIG. 24. The adapter 301 may include a resilient seal 406 (which in the embodiment shown in the FIGS. is in the form of an O-ring). The pressure transducer 300 may also be equipped with connection structure 407 to assist in attaching a tool to the pressure transducer 300 to turn the pressure transducer 300 to install, adjust, or remove the pressure transducer 300. In the embodiment shown, the connection structure 407 includes flats 407. However, it should be understood that the connection structure 407, may take many forms including, but not limited to screwdriver connecting grooves (standard, and Phillips), a hex recess or another shaped recess.

As shown in FIG. 24, the pressure transducer 300 attaches to the adapter 301 via threads 409. In some embodiments, the pressure transducer 300 may attach in other ways such as a press fit, a snap fit, with a fastener, or another other suitable arrangement. A resilient seal or gasket 403 may be located between the pressure transducer 300 and the adapter 301. In the embodiment shown, the gasket 403 is an O-ring.

The adapter 301 facilitates the attachment of the pressure transducer 300 to the dispensing apparatus 10. The dispenser 10 fits to the tube 306. In other embodiments, the adapter 301 may attach to structures other than a dispensing apparatus 10, such as the tube or housing 306 via fasteners 404. The fasteners 404 may be threaded bolts that screw into the tube or housing 306 as shown or may be other types of fasteners. In other embodiments, the adapter 301 may attach to the tube or housing 306 by screwing to the tube or body 306.

Adapter 301 may be made of a material that will not negatively react to a fluid flowing through the interior passageway 307. In embodiments where the fluid is an adhesive, the adapter 301 may be made of acetyl or any other suitable substance which will resist adhering to an adhesive flowing through the interior passageway 307.

It may be desirable to keep a fluid that may flow through the interior passageway 307 of the tube 306 from directly contacting the pressure transducer 300. The pressure transducer 300 may be made of a substance to which the fluid flowing through the interior passageway 307 may adhere. In order to avoid the fluid from adhering to, gumming up, or otherwise negatively interacting with the pressure transducer 300, a barrier 408 separates the pressure transducer 300 and the interior passageway 307 (and by extension to fluid in the interior passageway 307). To further isolate the pressure transducer 300 from the interior passageway 307, a resilient seal or gasket 406 (in the form of an O-ring 406 in FIGS. 22-23) is located between the adapter 301 and the tube or housing 306.

The barrier 408 is resilient and thin, which aides in allowing the barrier 408 to flex and communicate to the pressure transducer 300, which will output a signal or pressure indicative of a pressure associated with the interior passageway 307 of the tube 306. The barrier 408 may be made of fluorocarbon rubber or another material that does not negatively react to or adhere to the fluid or adhesive in the interior passageway 307.

In one example, the barrier 408 is about ⅟₃₂ of an inch thick. In other embodiments, the barrier 408 may have different thicknesses. It will be appreciated that the dimensions and material comprising the barrier 408 should be selected so that the barrier 408 will be able to flex to communicate a meaningful signal to the pressure transducer 300 indicative of a pressure within the interior passageway 307.

In order to further isolate the pressure transducer 300 from any fluid in the interior passageway 307, a resilient seal or gasket 410 may be located between the barrier 408 and the pressure transducer 300. In the embodiment shown in FIG. 24, the seal 410 is an O-ring 410 residing in a groove 412 in the pressure transducer 300. It is compressed in the groove 412 against the barrier 408.

Figure 25:
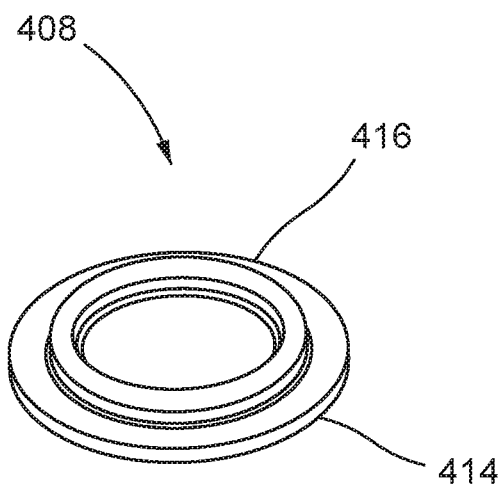
FIG. 25 is an isometric view of another embodiment of a barrier for a pressure transducer in accordance with the disclosure.
Figure 26:
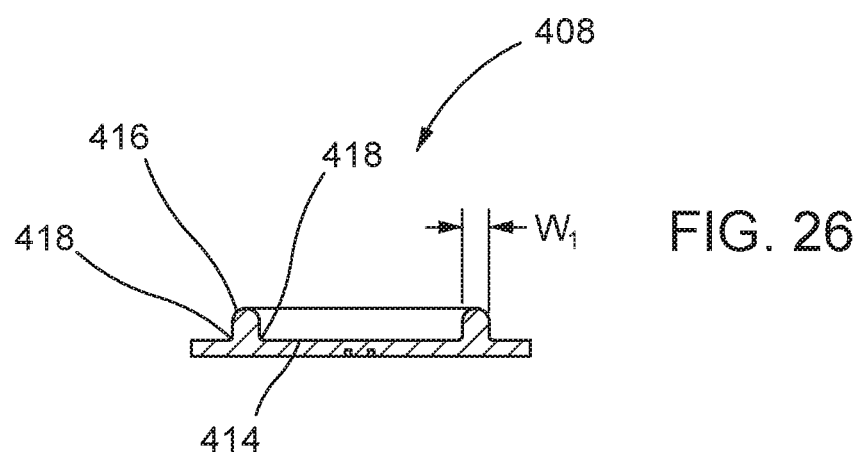
FIG. 26 is a cross sectional view of the barrier of FIG. 25.

In another embodiment of the barrier 408 shown in FIGS. 25 and 26, the barrier 408 has a flat disk portion 414 similar to the barrier 408 described above and an integrated sealing portion 416. Embodiments that use a barrier 408 having a flat disk portion 414 and a sealing portion 416 may not use the seal 410 as the sealing portion 416 will accomplish the same or a similar function.

The sealing portion 416 may have filets 418 and the width dimension W1 of the sealing member may be selected to provide a desired amount of sealing. Whether the embodiment of a barrier 408 and a seal 410 or an embodiment of a barrier 408 having an integrated flat disk portion 414 and sealing portion 416 is used, the seal 410 or sealing portion 416 will be located between the barrier 408 or flat disk portion 414 and pressure transducer 300 and encompasses a portion of the pressure transducer 300.

Figure 27:
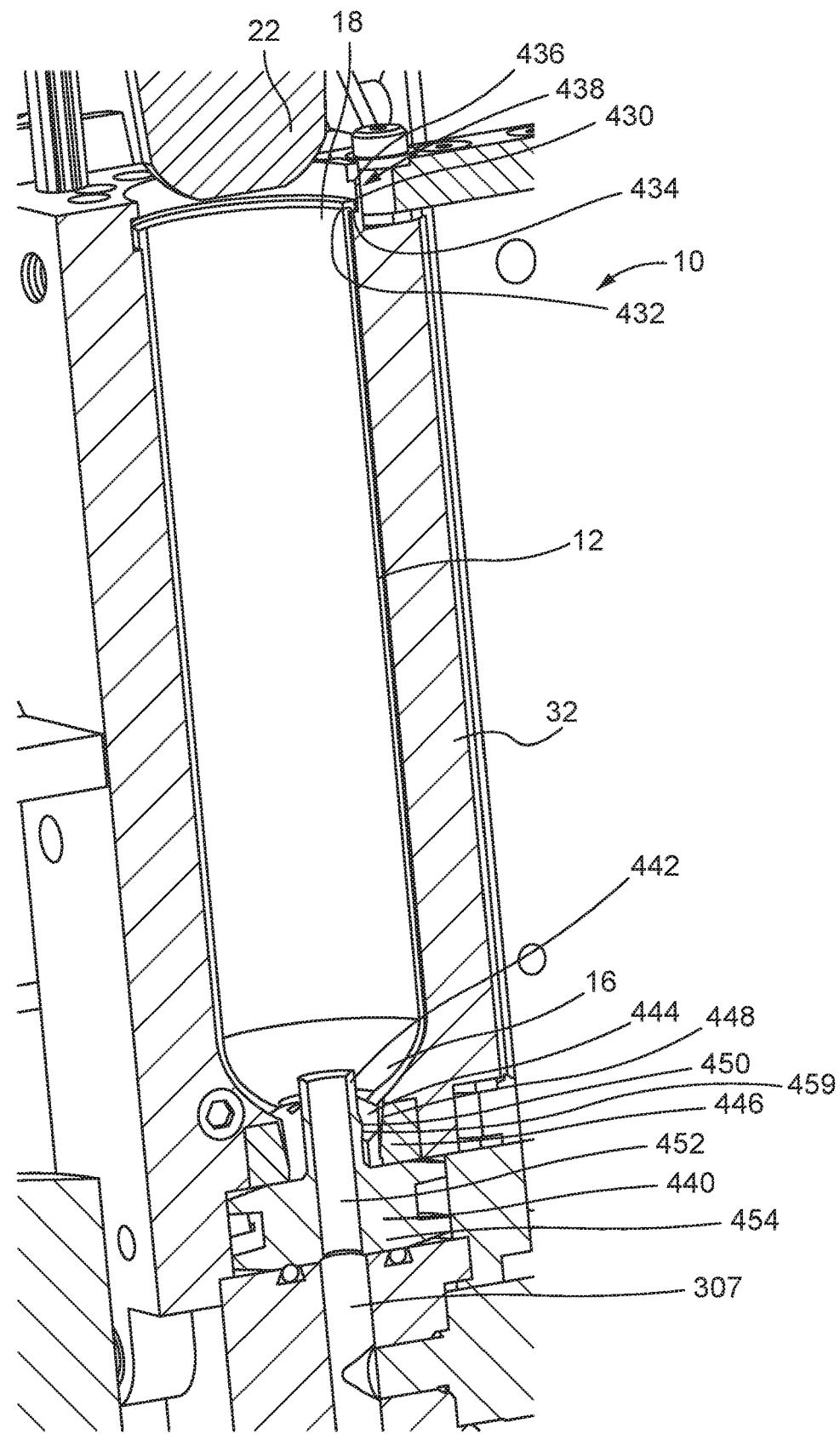
FIG. 27 is a partial, cross sectional view of a cartridge in a dispenser in accordance with the disclosure.
Figure 28:
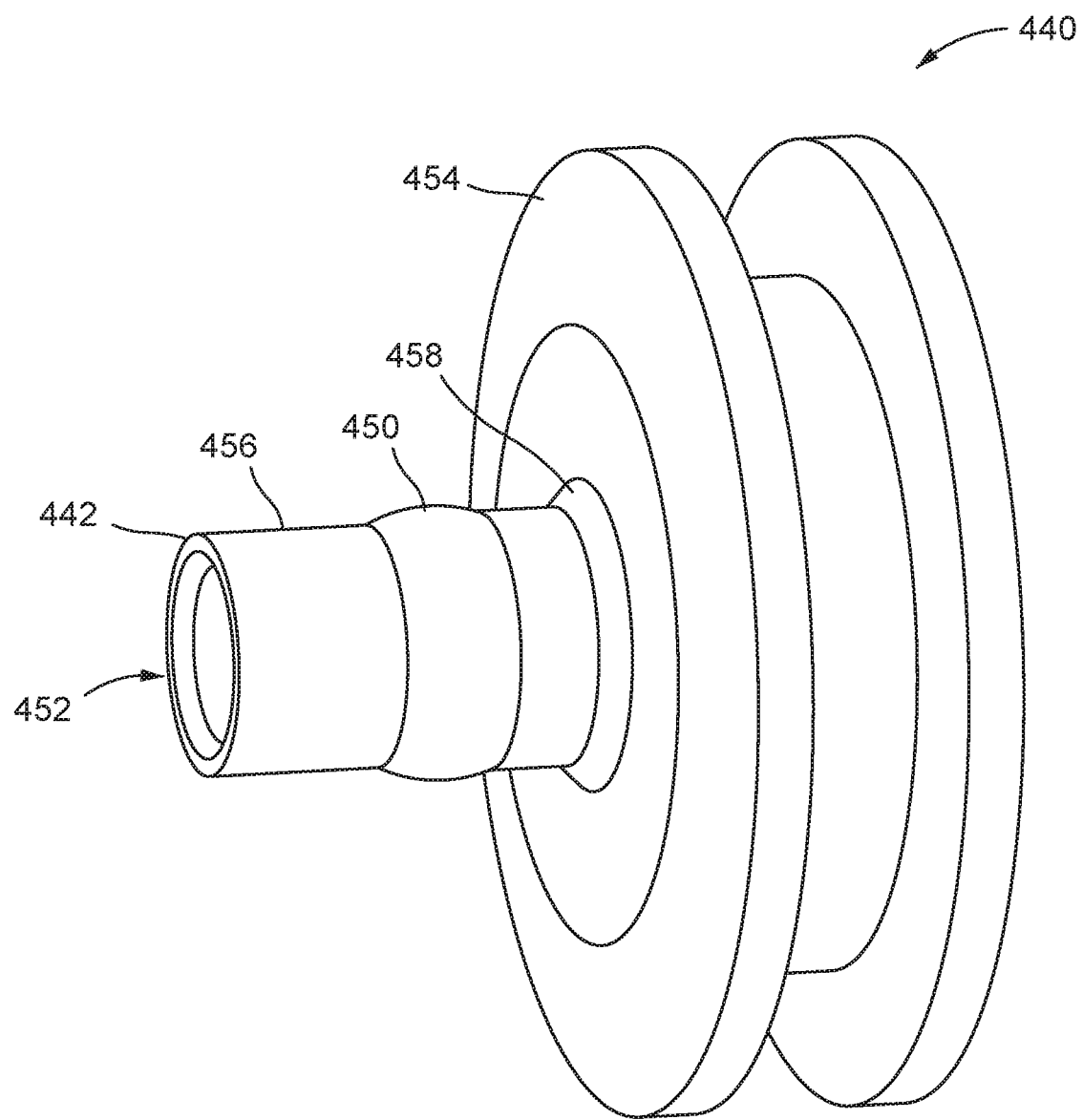
FIG. 28 is an isometric view of a cartridge mating member in accordance with the disclosure.

FIGS. 27 and 28 show a system for retaining the cartridge 12 within the dispenser 10. The cartridge 12 has a flange 430 that defines a flange stop surface 432. The flange stop surface 432 will butt against the distal stop surface 434 defined by the clam shell halves 32 to limit the travel of the cartridge 12 in a distal direction. The flange 430 is located in a flange groove 438 defined by the clam shell halves 32. A proximal stop surface 436 defined by the clam shell halves 32 will engage the flange 430 to limit the axial travel of the cartridge in the proximate direction. As such, the flange groove 438 is defined in part by the distal stop surface 434 and the proximal stop surface 436.

The cartridge 12 connects with a cartridge mating member 440. The cartridge mating member 440 has a projection 442. A projection receiver 444 located in the distal end 16 of the cartridge 12 fits over the projection 442 to attach the cartridge 12 to the cartridge mating member 440 in a sealed manner. The projection receiver 444 on the cartridge 12 can slip over the projection 442 when the cartridge 12 is pushed on to the cartridge mating member 440. The projection receiver 444 flexes to fit over the projection 442.

The flexure of the projection receiver 444 is limited by a retaining ring 446. A space 448 between the retaining ring 446 and the projection receiver 444 indicates the amount the projection receiver 444 may flex before it is stopped by the retaining ring 446. The projection 442 is used to connect the cartridge 12 to the dispenser 10 and provide fluid communication between the cartridge 12 and the interior passageway 307 in a sealed manner.

As shown in FIGS. 27 and 28, the projection receiver 444 has a retaining band 450 on the projection 442. An interior passageway 452 of the cartridge mating member 440 provides fluid communication between the cartridge 12 and the interior passageway 307 through the projection 442 and the body 454 of the cartridge mating member 440.

FIG. 28 is a perspective view of the cartridge mating member 440 showing the body 454, the projection 442 and the retaining ring 446 on the exterior surface 456 of the projection 442. The interior passageway 452 is seen along with a fillet 458 between the projection 443 and the body 454.

It will be appreciated that while moving the projection receiver 444 over the projection 442 may cause some flexure of the projection receiver 444, moving the projection receiver 444 over the retaining band 450 will cause the greatest flexure of the projection receiver 444. The retaining band 450 may be equipped with smooth surfaces to facilitate flexure and movement of the projection receiver 444 over the retaining band 450. In some embodiments, the projection receiver 444 may have a retaining band relief area 459 that has a slightly larger interior diameter that the interior diameter of the rest of the projection receiver 444. The retaining band relief area 459 may cause the projection receiver 444 to flex back toward its non-flexed or less-flexed position when the retaining band 450 is aligned with the retaining band relief area 459. This creates a bias toward the projection receiver 444 to maintain the retaining band relief area 459 aligned with the retaining band 450.

In some instances when the piston 22 or plunger 22 enters the cartridge 12 and moves through the cartridge 12 to push the fluid out of the cartridge 12, it may be difficult to then move the piston 22 proximally back out of the cartridge 12. This difficulty may be caused by the fact that a vacuum may form on the distal end 461 of the piston 22 as a result of moving the piston 22 distally and not having any fluid return to the cartridge 12.

Figure 29:
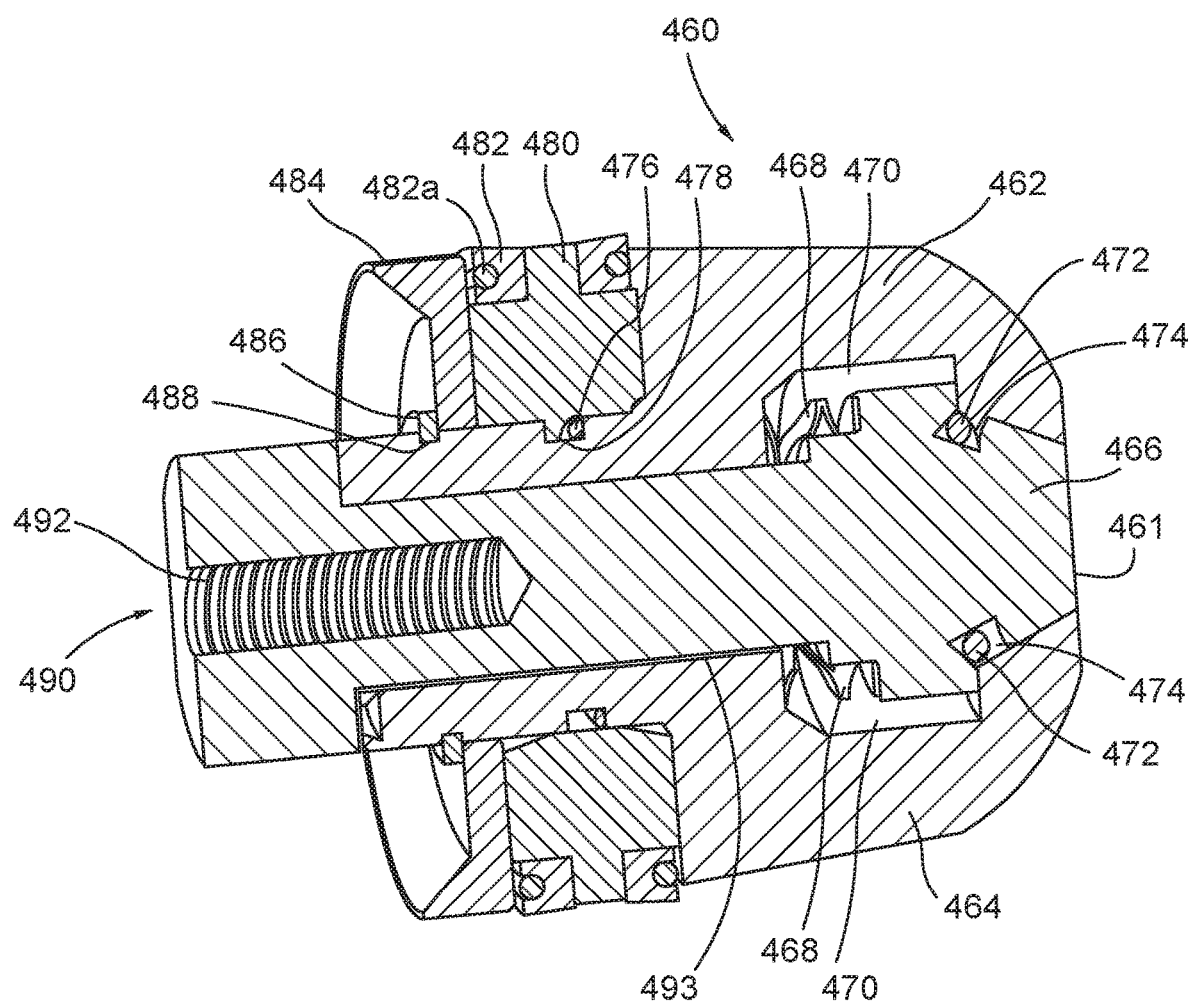
FIG. 29 is a cross sectional view of a vacuum relieving plunger/piston in accordance with the disclosure.

In order to relive this potential issue, a vacuum pressure reducing piston 460 (which may also be referred to as a plunger) may be used. The vacuum pressure reducing piston 460 may be made of a first piston part 462, a second piston part 464 and a retracting piston part 466. A spring 468 biases the retracting piston part 466 to the distal positon as shown in FIG. 29. The spring resides in cavity 470 formed, at least in part, by the first 462 and second 464 piston parts. A seal 472 may reside in a seal groove 474 in the retracting piston part 466. The seal 472 may be a resilient seal, such as an O-ring. A second seal 476 may reside next to a projection 478 on a spacer 480. A retaining ring 482 located adjacent to the back portion 484 of the piston 460 keeps the first piston part 462, the second piston part 464, and the retracting piston part 466 together. A third seal 482*a* resides next to the retaining ring 482. The second seal 476 and the third seal 482*a* aid to keep the cavity 470 sealed. A restraining ring 486 located in a restraining ring groove 488 helps keep the back portion 484 of the piston 460 and the retaining ring 482 in place.

The piston 460 has an attaching structure in the form of an attaching hole 490. The attaching hole 490 is threaded to allow a cable 340, as shown in FIG. 21 (or other structure used in other embodiments such as a rod or other suitable structure), attached to the piston 460 to move the piston 460 proximately back out of the cartridge 12.

When there is a vacuum pressure acting on the distal end 16 of the piston 460 and cable 340 or retracing rod pulls the piston 460 at a force greater than the spring force of the spring 468, the spring 468 will compress and allow the retracting piston part 466 move proximately with respect to the first 462 and second 464 piston parts. The seal 472 will be displaced as it moves into the cavity 470 and will no longer perform a sealing function. Air will be able to move along the relieve passage 493 to the distal end 461 of the piston 460 and thereby relieve the vacuum. Once the vacuum is relieved to a point or threshold below the force of the spring 468, the spring 468 will move the first 462 and second 464 piston parts relative to the retraction piston part 464 to the initial position shown in FIG. 29. The seal 472 with also move out of the cavity 470 back to a sealing position.

Figure 30:
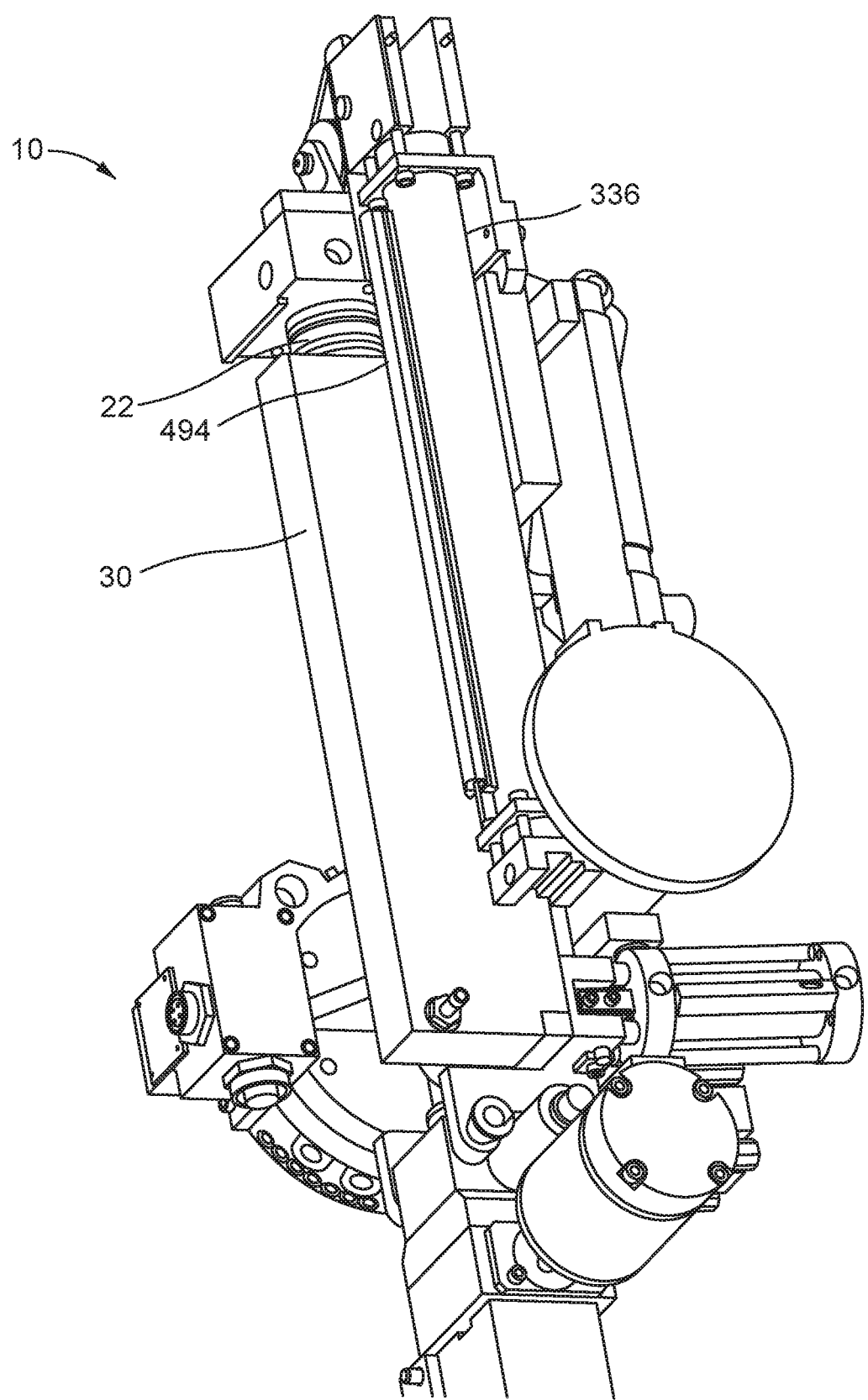
FIG. 30 is a partial, perspective view of a dispenser including a sensor in accordance with the present disclosure.

In some embodiments of the dispenser 10 shown in FIG. 30, the position of a piston 22 or 460 (not shown) in the cable cylinder 336 may be tracked or sensed by a sensor 494. The sensor 494 may be a magnetic sensor 494 and can track the position of a magnetic piston in the cable cylinder 336. Alternatively or in addition, a magnetic sensor 494 may track the position of the piston 22, 460 in the cartridge holder 30 when the piston 22, 460 is a magnetic piston 22, 460.

Figure 31:
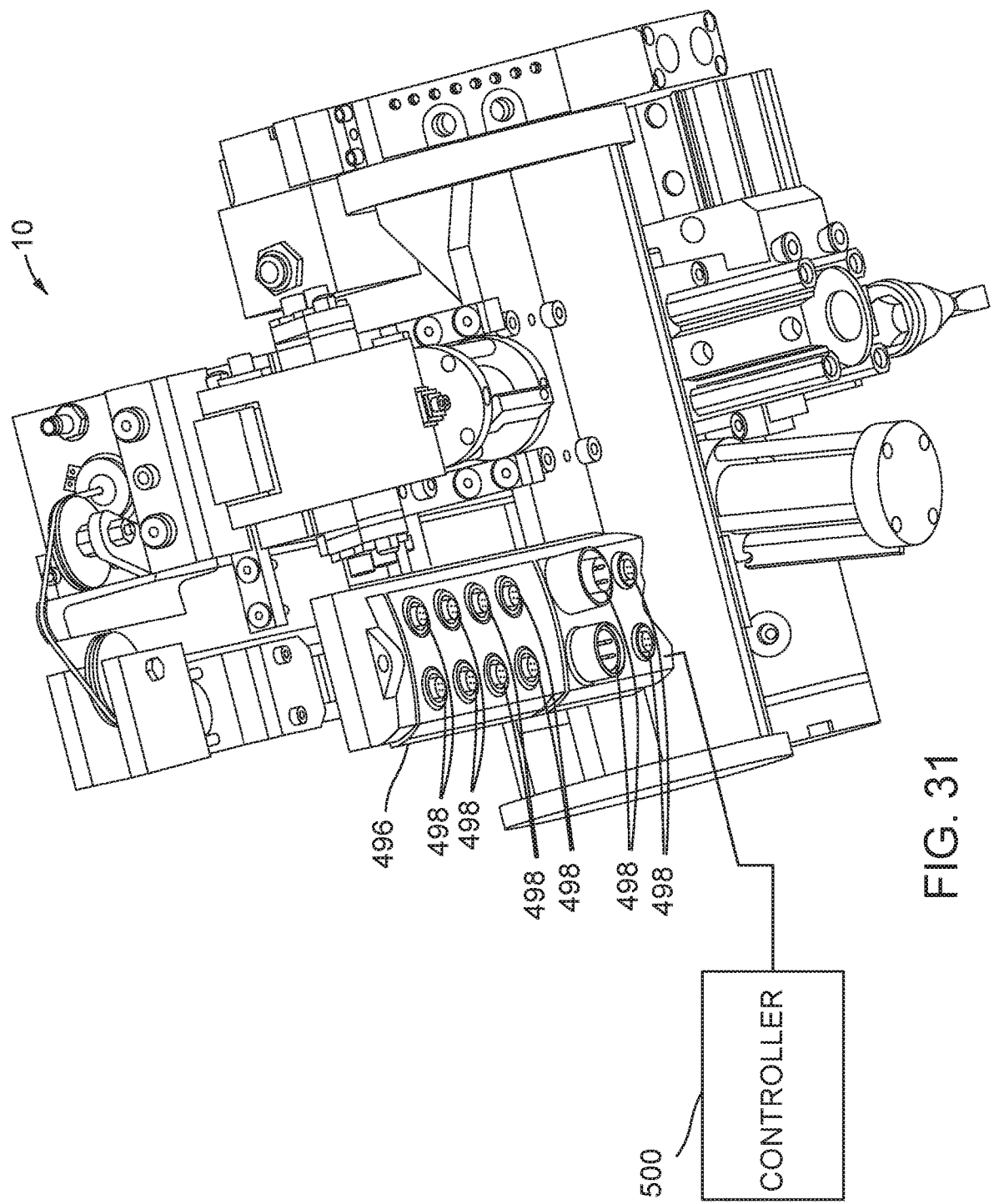
FIG. 31 is a perspective view of a dispenser having a local controller operatively connected to a remote controller for a dispenser in accordance with the present disclosure.

In some embodiments of the dispenser 10 shown in FIG. 31, the dispenser 10 may be controlled by a controller which may be a local controller 496 or, in other embodiments, there may be a remote controller 500 that may be be directly connected to various elements of the dispenser 10 or via that local controller 496 which may act as a relay. In some embodiments, the controllers 496, 500 may have wired or wireless connections. The local controller 496 may have input/output terminals 498 for receiving input such as piston position from the sensor 494, motor information from the motor 317 and outputs such as control signals for the motor 317, ball valve assembly 302, serve motor 364 or any other feature of the dispenser 10.

In some embodiments, the cable cylinder 336 may be controlled by the controller 496 or 500. In some embodiments, the controller 496 or 500 (see FIG. 6A) may be operatively connected to various sensors 494 which can detect the position of the piston 22 within the cartridge 12. When sensor 494 has detected that the piston 22 has achieved a particular position within the cartridge 12, the controller 496 or 500 may actuate the cable cylinder 336 to remove the piston 346. In some embodiments, the controller 496 or 500 may be a microcontroller operatively connected to the sensors and configured control the cable cylinder 336.

While the present disclosure has been illustrated by the description of specific embodiments thereof, and while the embodiments have been described in considerable detail, it is not intended to restrict or in any way limit the scope of the appended claims to such detail. The various features discussed herein may be used alone or in any combination. Additional advantages and modifications will readily appear to those skilled in the art. The claims are therefore not limited to the specific details, representative apparatus and methods and illustrative examples shown and described.

What is claimed is:

1. An apparatus for dispensing fluid from a cartridge having a distal end, a proximal end, and defining a longitudinal axis between the distal end and the proximal end, the apparatus comprising:
   a cartridge holder including a stationary base clamshell member and a moveable clamshell member for receiving the cartridge in a cartridge holding space, the stationary base and moveable clamshell members connected by a hinge such that the moveable clamshell member rotates toward and away from the stationary base clamshell member about an axis of rotation that is parallel to the longitudinal axis of the cartridge to allow the cartridge to be received in and removed from the cartridge holding space;
   a powered clamshell actuator coupled to the moveable clamshell member and configured to automatically move the moveable clamshell member between an open position for loading and unloading the cartridge and a closed, sealed position for dispensing fluid from the cartridge; and
   a dispense section including a discharge passage and a discharge outlet, the discharge passage communicating with the distal end of the cartridge for receiving fluid when the cartridge is received between the stationary base and moveable clamshell members, and directing the fluid to the discharge outlet during a dispense operation.

2. The apparatus of claim 1, further comprising:
   a first seal surrounding the discharge passage, the first seal engaging the distal end of the cartridge when the cartridge is clamped within the cartridge holder.

3. The apparatus of claim 2, wherein the cartridge holder further comprises a proximal end and a distal end, the first seal being positioned proximate the distal end of the cartridge holder.

4. The apparatus of claim 3, wherein the first seal further comprises a face seal configured to engage and seal against a surface at the distal end of the cartridge.

5. The apparatus of claim 1, further comprising:
   a cartridge ejector operatively coupled to the cartridge holder, and configured to eject the cartridge from the cartridge holding space.

6. The apparatus of claim 1, further comprising a clamping and sealing mechanism comprising a linkage assembly that moves to an over-center orientation in a clamped position.

7. The apparatus of claim 6, wherein the clamping and sealing mechanism is adjustable to accommodate fluid cartridges of different lengths.

8. The apparatus of claim 6, further comprising:
   a clamp actuator coupled to the clamping and sealing mechanism and operative to move the clamping and sealing mechanism between the clamped and unclamped positions.

9. The apparatus of claim 1, wherein the clamshell actuator is mounted under the cartridge holder and comprises a reciprocating rod coupled to the moveable clamshell member to automatically move the moveable clamshell member between the open position and the closed position.

10. The apparatus of claim 1, wherein the clamshell actuator is powered by a pneumatic cylinder configured to automatically move the moveable clamshell member between the open position and the closed position.

11. The apparatus of claim 1, wherein the fluid comprises a polysulfide, a urethane, an epoxy, an adhesive, or a silicone.

12. The apparatus of claim 1, wherein the proximal end of the cartridge is sealed.

13. The apparatus of claim 1, wherein the dispense section further comprises a dispense valve configured to be actuated between an open position for dispensing the fluid and a closed position for stopping the dispensing of the fluid.

* * * * *